United States Patent
Sudo et al.

(10) Patent No.: US 7,400,447 B2
(45) Date of Patent: Jul. 15, 2008

(54) STEREOSCOPIC IMAGE DISPLAY DEVICE

(75) Inventors: Toshiyuki Sudo, Tochigi (JP); Hiroshi Nishihara, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 219 days.

(21) Appl. No.: 10/931,670

(22) Filed: Sep. 1, 2004

(65) Prior Publication Data
US 2005/0073577 A1    Apr. 7, 2005

(30) Foreign Application Priority Data
Sep. 3, 2003  (JP) ............................. 2003-311450
Apr. 16, 2004  (JP) ............................. 2004-121449

(51) Int. Cl.
*G02B 27/22*  (2006.01)
(52) U.S. Cl. .................. 359/463; 359/462; 359/464
(58) Field of Classification Search ................ 359/462, 359/463, 464; 348/54, 56, 51; 345/7, 8, 345/9; 353/7
See application file for complete search history.

(56) References Cited
U.S. PATENT DOCUMENTS 4,993,790 A * 2/1991 Vick ......................... 359/20
5,949,390 A   9/1999 Nomura et al.
6,864,862 B2 * 3/2005 Sato et al. ..................... 345/32
2003/0137730 A1 * 7/2003 Fridman et al .............. 359/462

FOREIGN PATENT DOCUMENTS

JP      8-331605    12/1996
JP      9-15549     1/1997

* cited by examiner

*Primary Examiner*—Audrey Y Chang
(74) *Attorney, Agent, or Firm*—Morgan & Finnegan, L.L.P.

(57) ABSTRACT

An object of the invention is to provide a stereoscopic image display device, which does not generate a non-display region when an observer observes each parallax image despite being a stereoscopic image display device for displaying a multi-visual point image, and has little reduction of the image quality.

The stereoscopic image display device of the present invention has an image display means for displaying the synthesized image obtained by synthesizing a plurality of parallax images, an aperture portion, a light-shielding portion, and horizontal directional control means for giving a directivity toward each of the desired directions to the image information light including the information on the parallax image radiated from the image display means, wherein longitudinal enlarging means for enlarging longitudinally only the light beam having passed the aperture of the horizontal directional control means in directions is disposed in front of the horizontal directional control means.

11 Claims, 60 Drawing Sheets

IMAGE OF a

REGION a'

HEIGHT OF THREE PIXELS

FIG. 65A
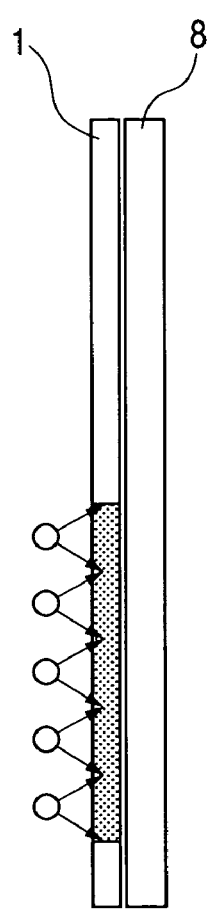
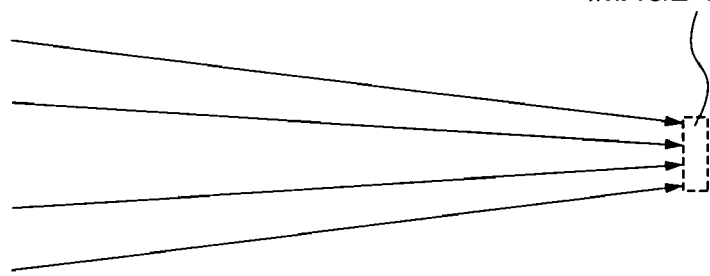
IMAGE OF 9-1
FIG. 65B
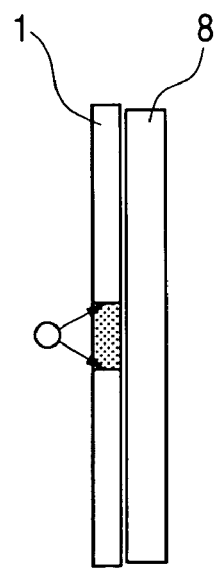
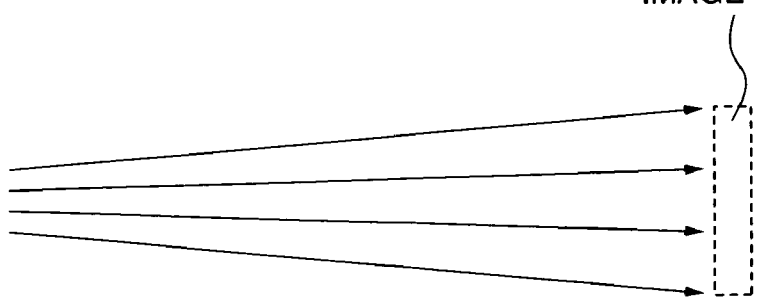
IMAGE OF 9-1

REGION (1)     REGION (2)

STEREOSCOPIC IMAGE DISPLAY DEVICE

BACKGROUND OF THE INVENTION

1. Field of the Invention

The present invention relates to a stereoscopic image display device, and in particular, it relates to a stereoscopic display device suitable for performing a stereoscopic image display in a television, a video, a computer monitor, a game machine and the like.

2. Related Background Art

From among stereoscopic image display devices known heretofore, there has been a stereoscopic image display device using a parallax barrier or a lenticular lens as a display device capable of a stereoscopic observation without using a special eyeglass.

According to these methods, a synthetic image obtained by a plurality of parallax images corresponding to a plurality of observing points, respectively is displayed on an image display screen, and an emitting direction of an image information light from each of the parallax images is controlled by the parallax barrier or the lenticular lens arranged in front of the image display screen so as to allow each of the parallax images to be emitted with a different directivity borne, thereby presenting each of the parallax images to different observational regions. An observer recognizes a stereoscopic image by a parallax borne by the parallax image by placing the left and right observing eyes on the different observing regions without using the special eyeglass.

In such a stereoscopic image display device, in case a plurality of parallax images are synthesized, it is a common practice that each of the parallax images is divided into a longitudinal stripe shape, and the longitudinal stripe including different parallax images is horizontally arranged periodically so as to synthesize a synthetic image, and moreover, the parallax barrier and the lenticular lens are also made into the longitudinal stripe shape.

On the other hand, disclosed-in Japanese Patent Application Laid-Open No. H08-331605 and Japanese Patent Application Laid-Open No. H09-15549 are methods of using a synthesized image, which further divide the above-described synthesized image of the longitudinal stripe shape into a horizontal direction, and performs an arrangement laterally shifted according to the position in a vertical direction. FIG. 74 is an explanatory drawing of a pixel arrangement in Japanese Patent Application Laid-Open No. H08-331605, and FIG. 75 is an explanatory drawing of a parallax barrier aperture portion arrangement in the publication.

In FIG. 74, an individual rectangular region marked with an alphabet and a number is an individual pixel, and the alphabet indicates a type of color filter corresponding to a pixel, and the numbers 21 to 24 indicate the parallax images corresponding to each of the first to fourth observing points.

In the meantime, FIG. 75 shows the arrangement of an aperture (white portion) of the parallax barrier and a light shielding portion (shaded portion). As shown in FIG. 74, the pixel representing each of the parallax images is arranged in a matrix shape, in correspondence to which the aperture of the parallax barrier is arranged in the matrix shape.

FIG. 76 shows how the parallax image corresponding to the first observer's eye looks like from among the parallax images observed in case of using the pixel arrangement of FIG. 74 and the parallax barrier of FIG. 75. As evident from FIG. 76, in case the arrangement of the matrix shape is used, it is possible that a pixel representing a parallax image is dispersed in a longitudinal direction and in a lateral direction. In case an ordinary longitudinal stripe arrangement is used, the arrangement is characterized in that, while the pixel displaying a certain parallax image generates only laterally reduction of an image quality continuously in a longitudinal direction, the reduction of the image quality is hardly remarkable by using the above-described arrangement of the matrix shape.

On the other hand, it is disclosed in Japanese Patent Application Laid-Open No. H09-15549 that a modified lenticular lens can be used in place of the above-described parallax barrier. FIG. 77 shows the modified lenticular lens disclosed in Japanese Patent Application Laid-Open No. H09-15549. FIG. 78 shows how the parallax image corresponding to the first observer's eye looks like from among the parallax images observed in case of using the pixel arrangement of FIG. 74 and the modified lenticular lens of FIG. 77. As evident from FIG. 78, in case the arrangement of the matrix shape and the modified lenticular lens are used, the pixel displaying a parallax image is observed dispersed in a longitudinal direction and a lateral direction, and at the same time, each pixel is displayed enlarged in a lateral direction.

However, even when the above-described pixel arrangement of the matrix shape is used, as evident from FIG. 76, in case the parallax barrier is used, a region, which becomes a non-display region that is an umbra when observed from a certain observing position, largely emerges. That is, similarly to the conventional ordinary parallax barrier, in case the stereoscopic image display observable from the above-described four observing points is performed, the number of the pixels displaying a certain parallax image becomes one fourth. A ratio of display region is reduced in proportion to the number of observing points, and the non-display region is enlarged, and therefore, there arises a problem that brightness seems to be reduced for the observer's eye when the number of observing points is increased. Further, in case a color display is performed, a black region between the pixels displaying different colors is increased, and therefore, a color displayed by mixed colors is shifted to a blacker side than its original color, and there arises a problem that a correct display of a color becomes difficult.

Further, in case the modified lenticular lens is used, a ratio of non-display region becomes small compared to a case where the parallax barrier is used, but each pixel is widened in a lateral direction only so that a difference of resolution between the longitudinal direction and the lateral direction becomes large, and an apparent decrease of resolution becomes intensified.

An object of the present invention is to solve the above-described problems and provide a stereoscopic image display device, which does not generate a non-display region when an observer observes each of parallax images despite the device being a stereoscopic image display device for displaying a multi-observing point image.

SUMMARY OF THE INVENTION

To solve the above-described problems, a stereoscopic image display device according to the present invention has image display means for displaying a synthetic image obtained by synthesizing a plurality of parallax images, the stereoscopic image display device having an aperture and a shaded portion, and including horizontal directional control means having an optical power in a horizontal direction for independently presenting a plurality of parallax images to each of different places of observational position by giving a directivity in a desired direction to each of image information lights including information on the parallax images radiated from the image display means, wherein longitudinal dispersion means for dispersing longitudinally only a light beam passed through the aperture of the horizontal directional control means is arranged in front of the horizontal directional control means.

Further, the stereoscopic image display device according to the present invention has image display means for displaying a synthetic image obtained by synthesizing a plurality of parallax images, the stereoscopic image display device having an aperture and a shaded portion, and including horizontal directional control means having an optical power in a horizontal direction for independently presenting a plurality of parallax images to each of different places of observational position by giving a directivity in a desired direction to each of image information lights including information on the parallax images radiated from the image display means, wherein longitudinal enlarging means for giving a vertical optical power to the image information light is provided in front of the horizontal directional control means.

BRIEF DESCRIPTION OF THE DRAWINGS

FIGS. 65A and 65B are top and side views showing the state. of the image reconstruction by the holographic optical element using the point light source array;

DESCRIPTION OF THE PREFERRED EMBODIMENTS

Figure 1:
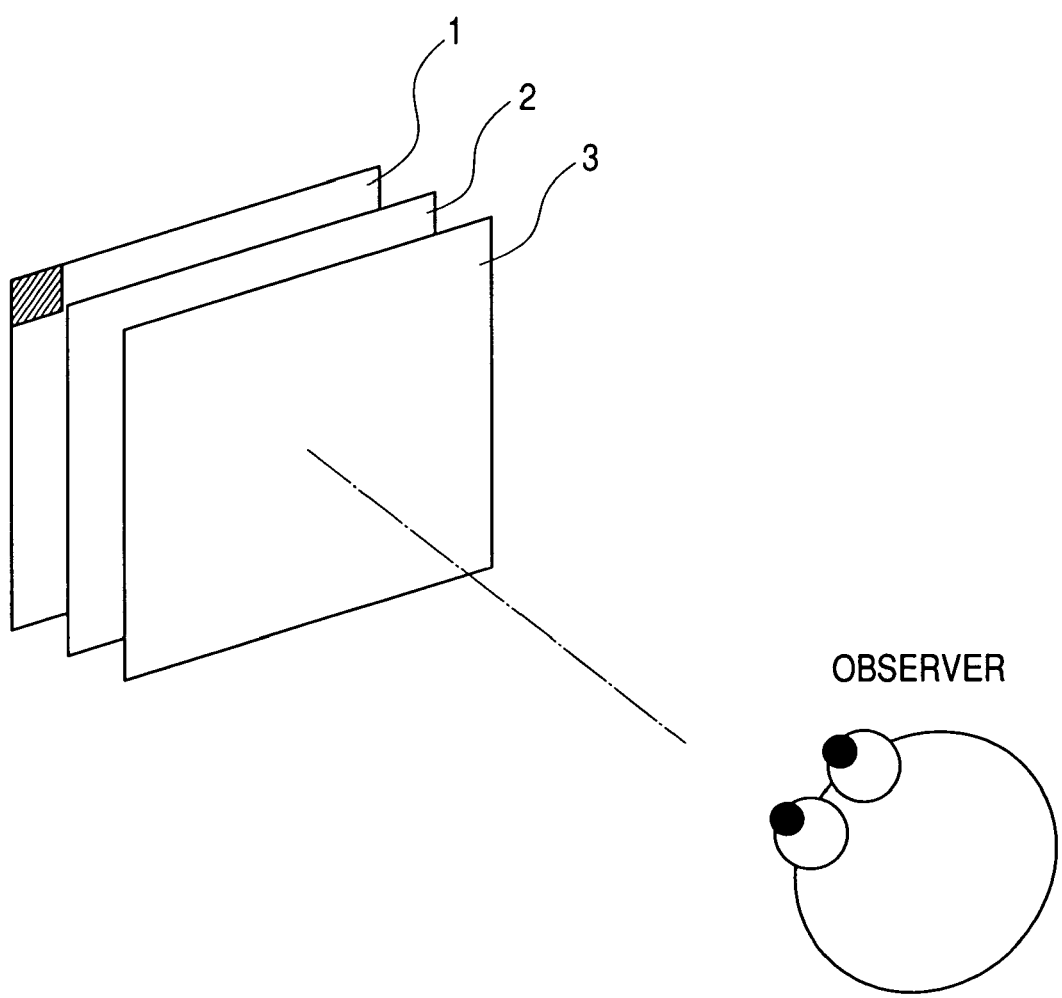
FIG. 1 is a perspective view explaining the outline of a stereoscopic image display device according to a first embodiment of the present invention.

The present embodiment will be described in detail. A first stereoscopic image display device of the present embodiment is a stereoscopic image display device, including: image display means for displaying a synthetic image obtained by synthesizing a plurality of parallax images by the pixel, and for displaying the synthetic image periodically arranged so that the pixels displaying each of the parallax images do not abut on each other longitudinally and laterally; and horizontal directional control means which is arranged at a predetermined distance spaced from the image display means and has an aperture portion and a shaded portion for giving horizontal directionality so that an image information light from each of the parallax images included in the synthetic image displayed in the image display means is independently presented to each of different places of the observational position; wherein the image information light from the aperture, vertically adjacent to the horizontal directional control means in front of the horizontal directional control means, is arranged at a position not superposed and a longitudinal enlarging means is provided for enlarging a longitudinal view angle by giving longitudinal optical power to the light beam passed through the aperture of the horizontal directional control means. Here, the apertures of the horizontal directional control means correspond to the pixel arrangement of the image display means, and are arranged shifted laterally by a predetermined amount for each aperture horizontal column.

Further, between the image display means and the longitudinal enlarging means, there is provided a cylindrical lens array having a meridian axis in a horizontal direction for enlarging the information display light from each pixel of the image display means and projecting it onto the longitudinal enlarging means. In addition, the cylindrical lens array means is provided between the horizontal directional control means and the longitudinal enlarging means. Further, the cylindrical lens array is provided between the image display means and the horizontal directional control means.

Further, it is inserted into the aperture of the horizontal directional control means that the cylindrical lens having a horizontal meridian axis for enlarging the information display light from each pixel of the image display means and projecting it onto the longitudinal enlarging means.

Further, the cylindrical lens array forms an image of the image information light emitted from each region of the image display means on the longitudinal enlarging means as a real image magnified by a predetermined magnification.

Further, the height and width of each aperture of the horizontal directional control means are the same as or not greater than the height and width of each region displaying the parallax image of the image display means.

Further, there is provided optical connecting means for allowing each region of the image display means to optically correspond to the corresponding region of the horizontal directional control means. Here, the optical connecting means is a light shielding wall for shielding the beam to prevent the beams emitted from each region of the image display means from entering the upper and the lower regions of the corresponding horizontal directional control means. Further, the optical connecting means is a cylindrical lens array comprising cylindrical lens for converging the beams discharged from each region of the image display means into the corresponding regions of the horizontal directional control means. Further, the optical connecting means is a light selection filter for selecting the beam only from the regions corresponding to each region of the horizontal directional control means among the beams emitted from each region of the image display means. Further, the optical connecting means is directional illuminating means having such directivity as passing though each corresponding region of the image display means and the horizontal directional control means. Further, the optical connecting means is configured so that each region of the image display means emits the beam having directivity with respect to the region of the horizontal directional control means.

Further, a second stereoscopic image display device of the present embodiment includes: transmission type image display means for displaying the synthetic image obtained by synthesizing a plurality of parallax images by the pixel and periodically arranged so that the pixels for displaying each of the parallax images do not abut against each other longitudinally and laterally; a light source for illuminating the image display means from the back face, and for generating a plurality of light beams incident on each horizontal pixel column of the image display means with a vertically predetermined angle of divergence; and horizontal directional control means, which is disposed at a predetermined distance spaced from the image display means, and gives a horizontal directivity so that the image information light from each parallax image included in the synthetic image displayed in the image display means is independently presented to each of different places of the observational position, wherein the second stereoscopic image display device includes a longitudinal enlarging means, disposed in front of the horizontal directional control means and in a position where the image information light from the apertures vertically adjacent to the horizontal directional control means doesn't superposed, for enlarging a longitudinal view angle by giving optical power longitudinally to the light beam having passed through the aperture of the horizontal directional control means.

Here, the light source is a vertically combined light source constituted by linear light sources corresponding to each horizontal pixel column of the image display means. Further, the light source generates a plurality of light beams converged and emitted by lenticular lenses composed of cylindrical lenses having ameridian axis in horizontal direction corresponding to each horizontal pixel column of the image display means.

Further, the longitudinal enlarging means consists of a longitudinal light diffusion plate which diffuses the light only in the longitudinal direction. Further, the longitudinal enlarging means is a lenticular lens consisting of cylindrical lenses having a meridian axis in horizontal direction which longitudinally converges the information display light having passed through the horizontal directional control means toward an observational position.

Further, a third stereoscopic image display device of the present embodiment includes: an image display means for displaying a synthetic image which is obtained by synthesizing a predetermined number of not less than three of parallax images by the pixel and in which pixels displaying each parallax image are arranged laterally at a predetermined period, barrier means which is arranged at a predetermined distance spaced from the image display means and has. an aperture portion having a width to allow the information display light from the pixels corresponding to a plurality of parallax images less than the predetermined number to pass through with respect to the horizontal direction, and horizontal directional control means having cylindrical lenses for giving a horizontal optical power to the information display light having passed through the aperture portion.

Here, in the synthetic image displayed in the image display means, the pixels displaying each of the parallax images do not abut against one another between the pixels columns adjacent longitudinally. Further, the width of the aperture of the barrier means corresponds to pixels in which the number of the pixels is given by division of the predetermined number by an integer.

The examples of the present embodiment will be described below specifically with reference to the drawings.

First Embodiment

FIG. 1 is a perspective view explaining the outline of a stereoscopic image display device according to the first embodiment of the present invention. Image display means 1 displays a synthetic image obtained by synthesizing a parallax image. As the image display means 1, an ordinary image display means such as a liquid crystal display and a plasma display and the like can be used. Further, if limited to the reconstruction of a static stereoscopic image, a photograph and a printed matter can be also used. Horizontal directional control means 2 has an optical power in a horizontal direction, and can independently present a plurality of parallax images to each of different directions by giving a directivity in each of desired directions to the image information light including information on each parallax images radiated from the image display means 1. A parallax barrier or a lenticular lens can be used as the horizontal directional control means 2. Longitudinal enlarging means 3 has two functions. One function is to enlarge longitudinally and project a pixel of image on substantial screen as a substantial pixel, so that the height of the pixel of image is enlarged. And the other function is to enlarge the view angle longitudinally so that the substantial pixel can be observed from longitudinally wide angle. In other words, the latter function gives the substantial pixel sufficient longitudinally wide view angle so that the substantial pixel can be observed from longitudinally wide angle. By these configurations, an observer can observes a stereoscopic vision with naked eyes by observing away from the stereoscopic image display device by a predetermined distance, and it is possible to reduce a non-display region of parallax image or to substantially eliminate it.

Figure 2:
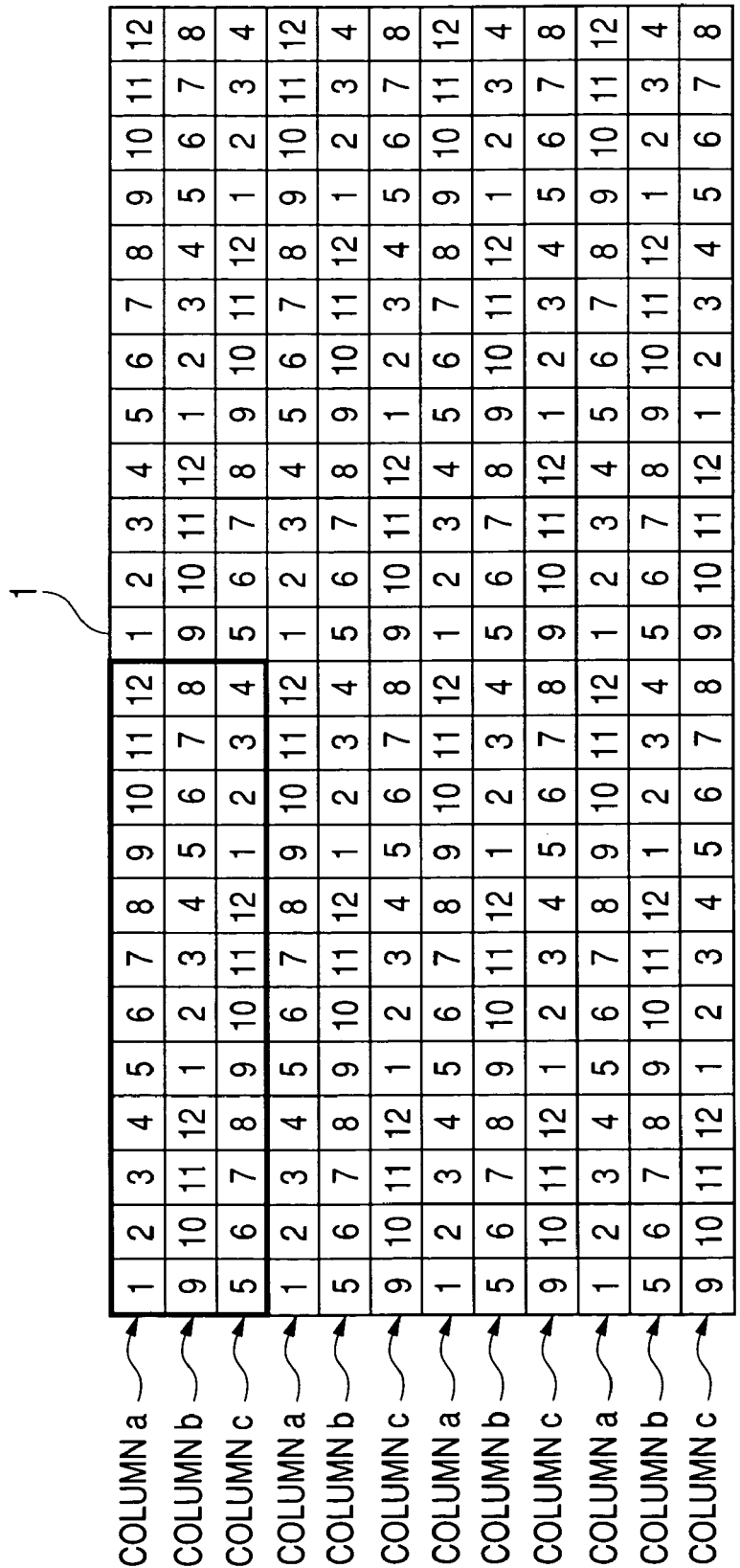
FIG. 2 is one example of an enlarged front view of a portion (shaded portion) of a display region of image display means 1.

FIG. 2 is an example of a front view enlarging a portion (shaded portion) of the display region of the image display means 1 shown in FIG. 1. The lattice in the drawing shows boundaries of picture elements of the image display means 1. And displaying the parallax images corresponding to the numbers allotted to each of every picture element, thereby displaying the synthetic image obtained by synthesizing the parallax images as a whole. As shown in FIG. 2, the synthetic image to be displayed is a synthetic image obtained by synthesizing a plurality of parallax images by the predetermined pixel, and the pixels for displaying each parallax image are periodically arranged so as not to abut against each other longitudinally and laterally. Such a pixel arrangement method is hereinafter referred to as a matrix pixel arrangement in contrast to the conventional parallax image synthesizing method in a manner of longitudinal striped shape arrangement. Note that while FIG. 2 shows the case where one pixel of the synthesized image is displayed in one picture element of the image display means, one pixel may be displayed in a plurality of adjacent picture element groups. Hereinafter, for the sake of simplicity, explanation will be done with an assumption that a region on the image display means where one pixel of the synthesized image is displayed be one pixel.

In the present embodiment, treating the region in FIG. 2 surrounded by a thick line as a minimum unit of pixel arrangement, the unit is periodically repeated across the whole region of the image display means 1. FIG. 2 shows an example of the pixel arrangement where a synthesized image comprising 12 types of parallax images is displayed as an example of the synthesized image. In FIG. 2, the pixel displaying the parallax images of 12 types is periodically arranged laterally in the whole of columns, and moreover, an array pattern changes for every column, and three columns from a to c different in array positions are included in the minimum unit.

Note that the pixel arrangements on the image display means 1 are not limited to those shown in FIG. 2, but it is possible to display the arbitrary number of parallax images, and an arbitrary array can be selected in association with the horizontal directional control means 2.

Further, as described above, in FIG. 2, while an allotment is made such that different parallax images are displayed for every one pixel, there is no need to be limited to this, but the allotment can be made in such a manner that different parallax images are displayed for every region comprising a plurality of adjacent picture elements. As one example, it is preferable to define adjacent RGB pixels as one region for a good color display.

As described later, since each pixel is enlarged longitudinally by a longitudinal enlarging means 3 at a projecting position away a predetermined distance from the horizontal directional control means 2, it is preferable that the pixel (region) displaying certain parallax images is arranged and spaced away from a suitable distance in the longitudinal direction on the image display means 1. For this purpose, as shown in FIG. 2, the pattern of an array of pixels (regions) changes for every column, and it is preferable that the matrix pixel arrangement is set up such that, upward, downward, leftward, and rightward in the vicinity of the pixel (region) displaying a certain parallax image, the pixel (region) displaying the other parallax image is arranged.

Figure 3:
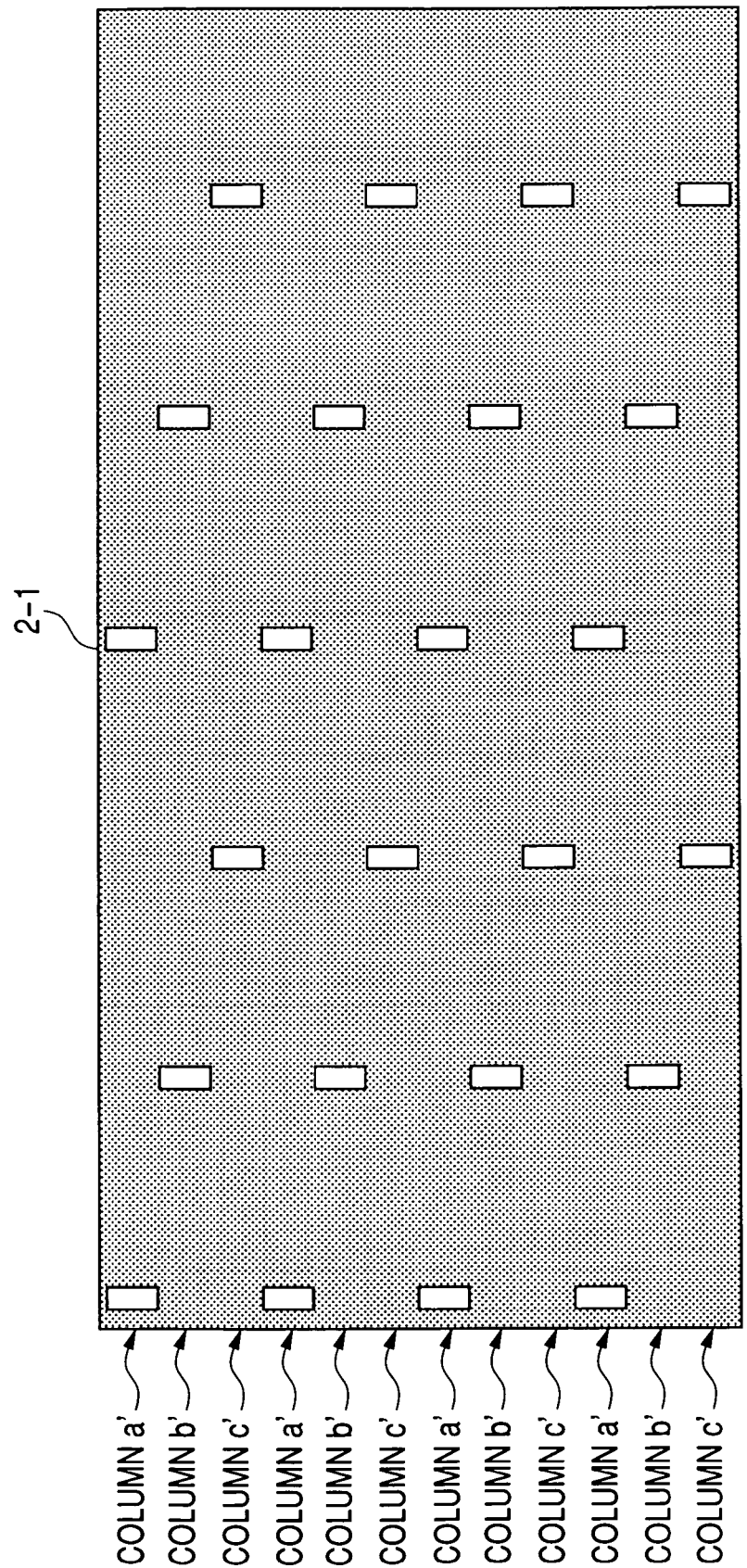
FIG. 3 is a view showing the position of an aperture in case of configuring horizontal directional control means 2 by a parallax barrier.

FIG. 3 is a view showing a position of an aperture in case of configuring the horizontal directional control means 2, by a parallax barrier 2-1. Particularly, FIG. 3 is an enlarged view of the parallax barrier 2-1 of the portion corresponding to the display region shown in FIG. 2. The parallax barrier 2-1 includes a' to c' columns corresponding to a to c columns of the image display means 1, respectively, and each of the apertures (hereinafter, referred to as slits) shown regularly in a white color, respectively, is provided within a shaded portion (black portion).

It is desirable to provide a slit corresponding to a set of pixel group displaying the parallax images 1 to 12 on the image display means 1. Further, in relation to the pixel arrangements in the a to c columns being shifted respectively, it is desirable that the lateral position of the slit is shifted in the case of the a' to c' columns. The position of each slit is decided in consideration of the position of each pixel on the image display means 1 and the positional relationship among the observer, the image display means 1, and the parallax barrier 2-1. The slits are periodically arranged in the same regularity across the whole region of the parallax barrier 2-1. Further, it is desirable that the width of the slit is made sufficiently small compared to the width of the pixel, so that the cross talks between the parallax images are prevented.

Figure 4:
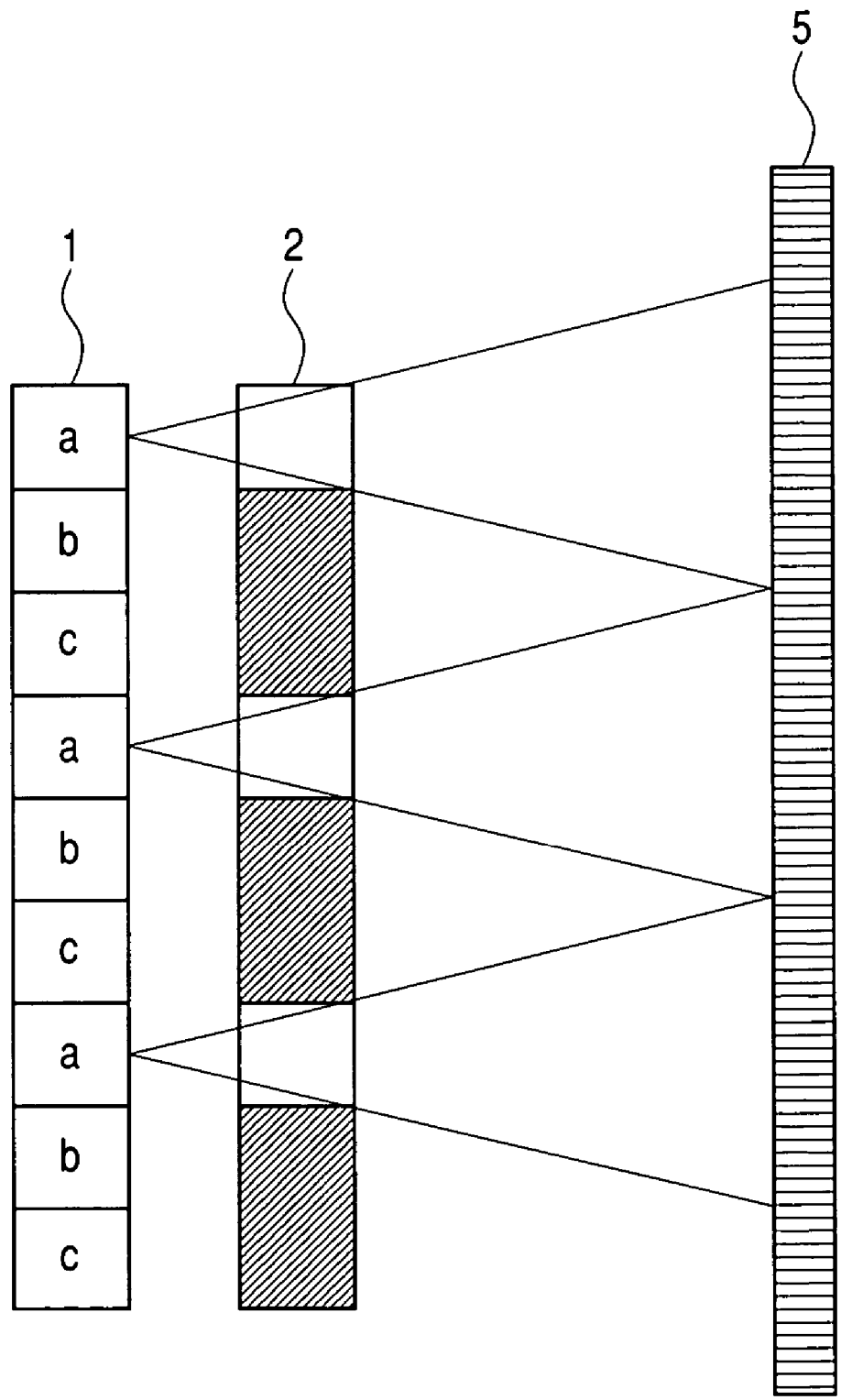
FIG. 4 is a view showing another configuration example on a longitudinal enlarging means 3.

FIG. 4 shows a configuration example in case of using a longitudinal diffusion plate 5 as the longitudinal enlarging means 3 in FIG. 1. FIG. 4 corresponds to a longitudinal section of the configuration shown in FIG. 1. The configuration of FIG. 4 shows a configuration where the longitudinal diffusion plate 5 is arranged at a predetermined position by utilizing the fact that the light radiated from the pixel has a longitudinal expanse by nature. At this time, it is desirable that the longitudinal diffusion plate 5 is disposed in front of the horizontal directional control means 2, and in a position where the image information light from the apertures vertically adjacent of the horizontal directional control means is arranged at a position not superposed. Particularly, as shown in the drawing, it is desirable that the image information light projected on the longitudinal diffusion plate 5 from each of the longitudinally adjacent apertures is in a state of not creating a gap. The longitudinal diffusion plate 5 diffuses the projected image information light only in upward and downward direction, which becomes a substantial display image when observed by the observer.

As shown in FIG. 4, by utilizing the expanse of the radiated light from the pixel, it is possible to show by the longitudinal diffusion plate 5 as if the pixel expanded in height, in comparison with the height (height of the pixel observed by the observer when there exists no longitudinal enlarging means 3) of the aperture of the horizontal directional control means 2, exists on the longitudinal diffusion plate 5. It is desirable that the position, on which the longitudinal diffusion plate 5 is arranged, is decided by the interval between the image display means 1 and the horizontal directional control means 2 and the longitudinal width of the aperture on the horizontal directional control means 2, and is at a position where the light beam from the apertures longitudinally adjacent is not mutually mixed.

The parallax barrier 2-1 may be used for the horizontal directional control means 2 in FIG. 4, a combination of a cylindrical lens array 2-2 and a mask 2-3, as described below, may also used. Further, by using a lateral lenticular lens, having a predetermined pitch and an optical power, which has a longitudinal optical power for the image information light and as the longitudinal enlarging means 3, even if the image information light is converged for the observer, the pixel enlarged longitudinally can be presented to the observer as the case using the longitudinal diffusion plate 5.

Figure 5:
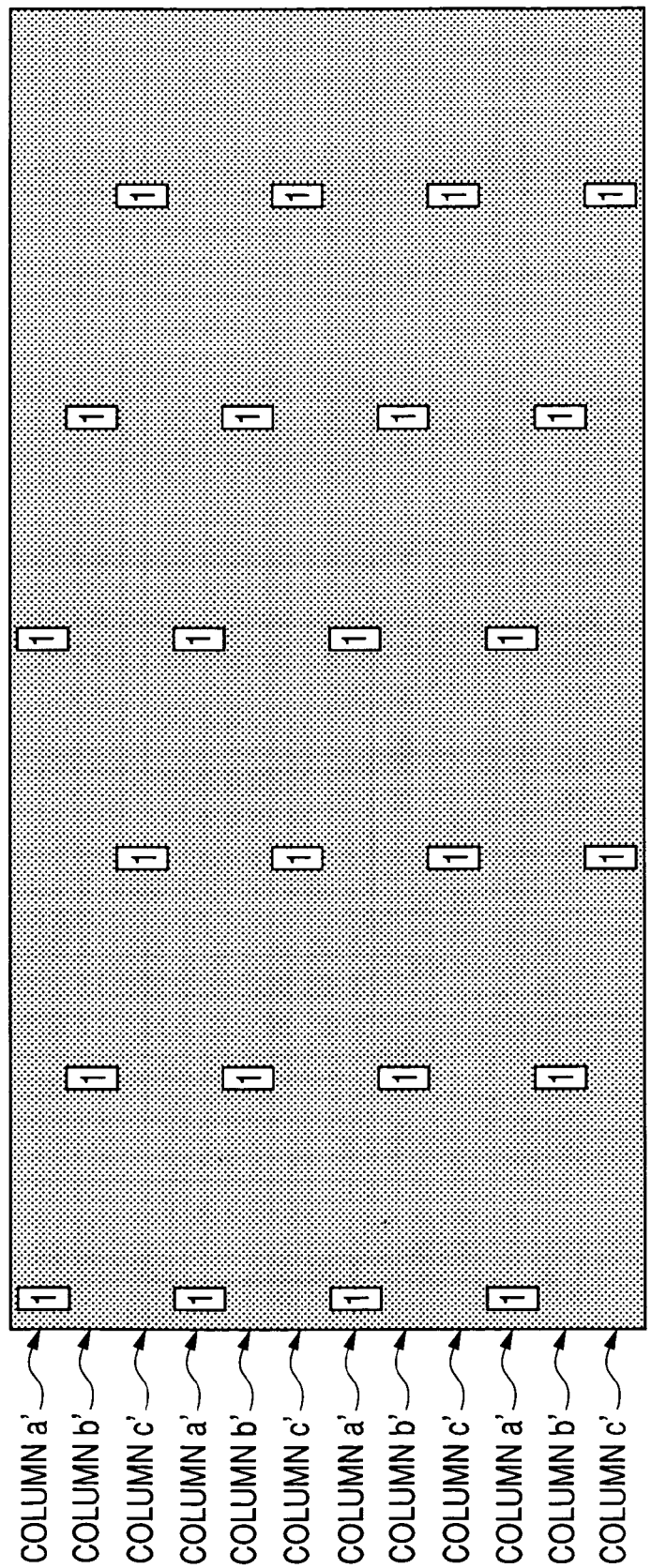
FIG. 5 is a view showing a state of a screen observed when there exists no longitudinal enlarging means 3.
Figure 6:
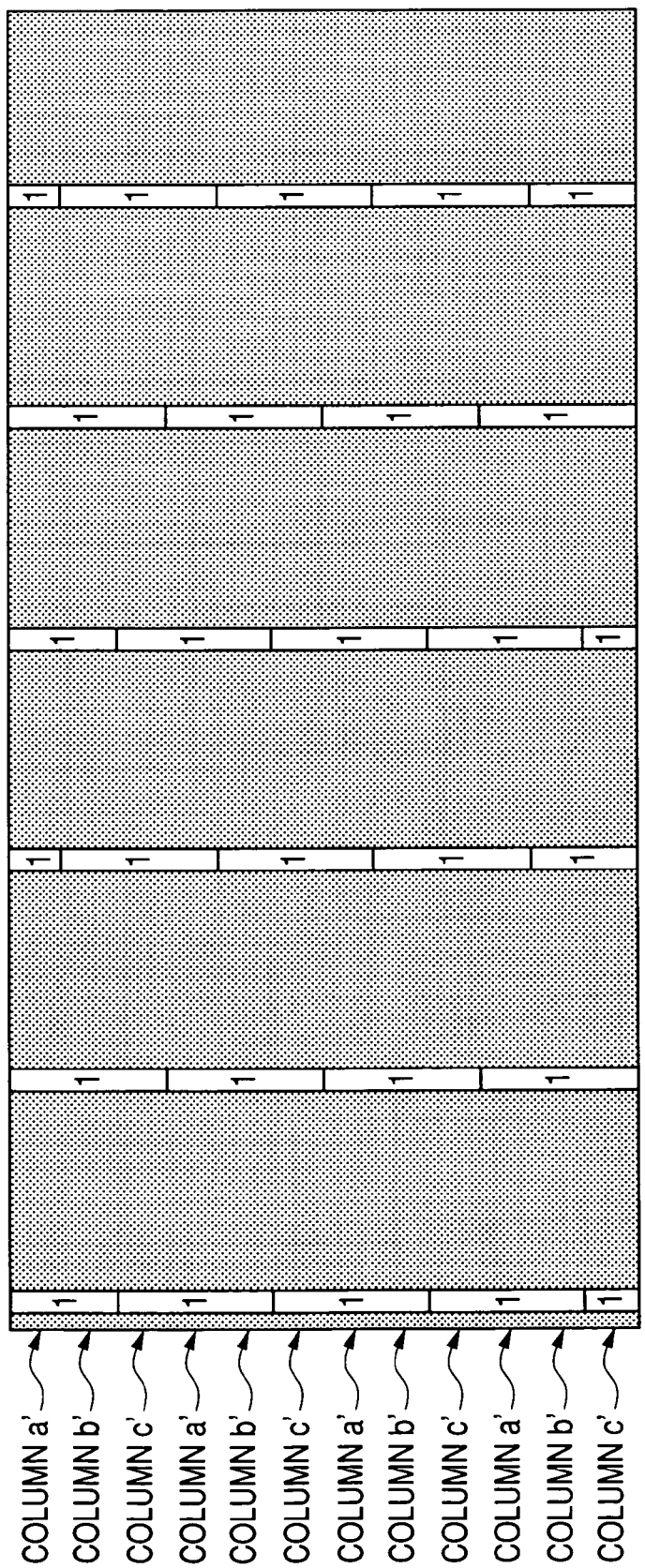
FIG. 6 is a view showing a state of the screen observed when there exists the longitudinal enlarging means 3.

FIGS. 5 and 6 are views for explaining the effect of the longitudinal enlarging means 3. In case of configuring the horizontal directional control means 2 by the parallax barrier 2-1, FIG. 5 shows a state of the screen observed in the case of no longitudinal enlarging means 3 and a combination of the image display means 1 and the horizontal directional control means 2 only. If there exists no longitudinal enlarging means 3, for example, the parallax image at an observing point 1 is observed as the longitudinally adjacent pixels are separated as the conventional stereoscopic image display device, since the apertures (slits) of the parallax barrier 2-1 shown in FIG. 3 become displayed pixels. On the other hand, FIG. 6 shows a state of the screen observed.in case the longitudinal enlarging means 3 is disposed at the subsequent stage of the horizontal directional control means 2. When the longitudinal enlarging means 3 is added, as shown in FIG. 6, individual pixels of the parallax image are observed being enlarged only in the height direction. As a result, each pixel exists continuously in the height direction, and a ratio of the display region to the whole screen increases from 1/12 to 1/4.

It is desirable that the magnification by the longitudinal enlarging means 3 is equal to the reciprocal of a longitudinal display ratio in case the longitudinal enlarging means 3 is not used. In the case of the present embodiment, since the longitudinal display ratio is 1/3 in case the longitudinal enlarging means 3 is not used, and therefore, it is desirable that the magnification of the longitudinal enlarging means 3 is 3. On the one hand, it is not necessarily 3, even if the magnification is less than 3, since an apparent longitudinal interval between pixels is reduced, an effect of enlarging the whole display ratio can be. obtained. On the other hand, in case the magnification becomes greater than 3, the longitudinally adjacent pixels are observed superposed, and therefore, the image becomes unclear, and this is not preferable. Even in case the longitudinal display ratio, when not using the longitudinal enlarging means 3, is not 1/3, the same holds true. As described above, according to the present embodiment, in the stereoscopic image display device which disperses the pixels for displaying particularly a certain parallax image in a matrix shape, the problem of the conventional. stereoscopic image display in that the higher the number of observing points is increased, the more the reduction of the image quality is remarkable, is amended, so that the stereoscopic image display device which makes the reduction of the image quality inconspicuous can be realized.

Figure 7:
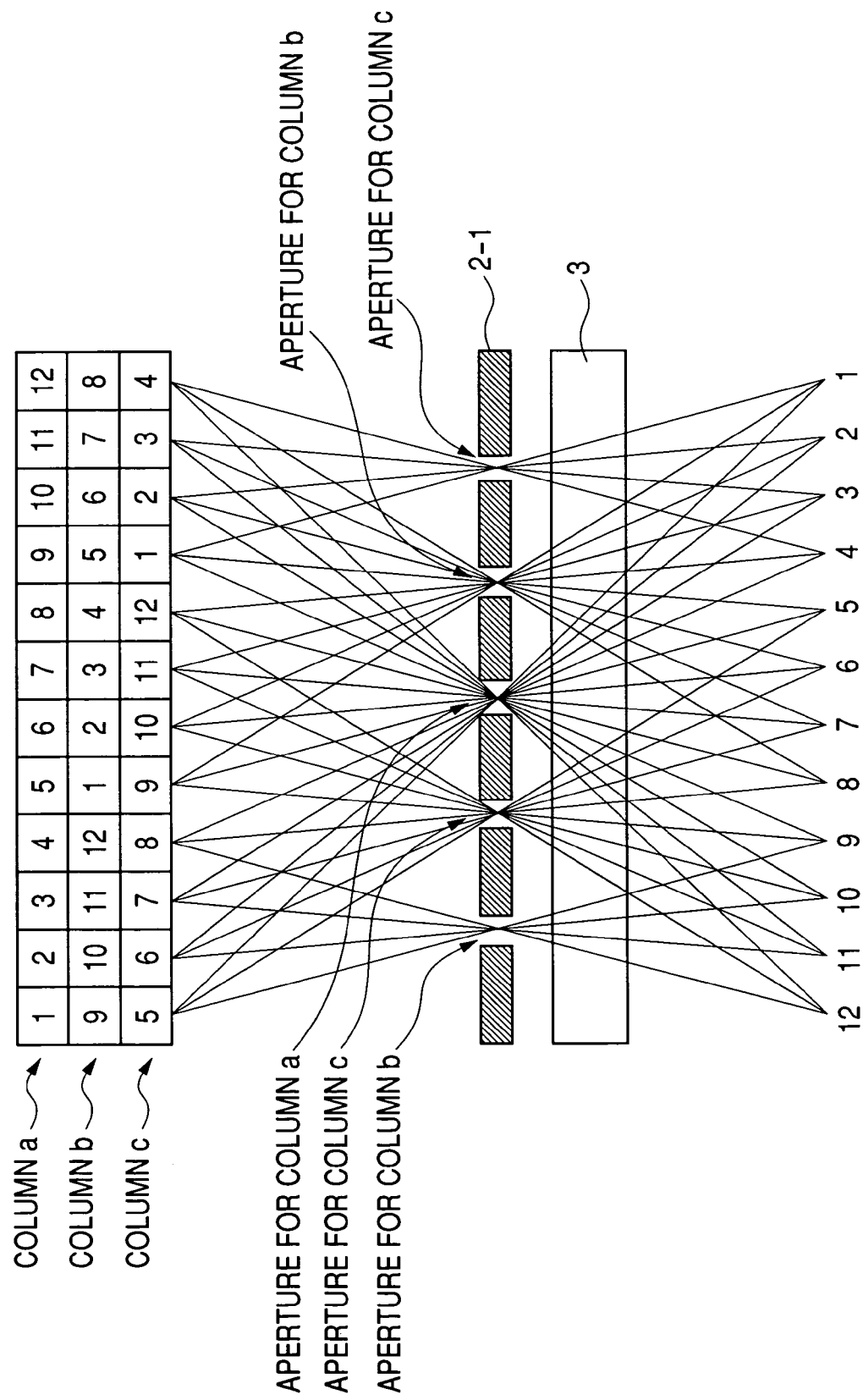
FIG. 7 is a top view showing the optical path of a beam radiated from each pixel in the stereoscopic image display device according to the first embodiment.

FIG. 7 is an example of the stereoscopic image display device according to the present embodiment shown in FIG. 1, and is a top view, viewed from the top of the configuration of the stereoscopic image display device, showing the optical path of the beam radiated from each pixel where the display shown in FIG. 6 is performed. For the sake of simplicity, as the pixel arrangement, the minimum unit including the columns a to c is shown as a front view. Further, as the slit of the parallax barrier 2-1, the apertures (a' to c') for the columns a to c are shown within the same surface. The intervals among each constituent elements are decided in such a manner that the beams from each pixel depict the light path as shown in FIG. 7.

By making the width of the parallax barrier 2-1 sufficiently small compared to the width of the pixel, directivity is generated in a traveling direction of the light passing through the slit, and as shown in FIG. 7, the light from each pixel independently travels along a straight direction connecting the pixel and a center of the slit. The light from the column a passes through the slit of the column a', the light from the pixel of the column b passes through the slit of the column b', and the light from the pixel of the column c passes though the slit of the column c', respectively, and travels in a direction of the observing points to be observed, respectively.

Although the horizontal positions of the slits of the above described columns a' to c' are mutually different, since the horizontal positions of the pixels on the image display means 1 are also differently arranged for each of columns a to c and therefore, as a result, a configuration is such that the light emitted from the pixel different in the column but equal in the observing point number (1 to 12) mutually travels to the same observing position. The summing up of such a relationship is shown in FIG. 7, from which it is clear that there exist slits in straight intersecting point positions connecting each pixel and the corresponding observing point. If the relationship as shown in FIG. 7 is satisfied, since the pixel having the observing point number n alone can be observed from the observing position corresponding to the observing point n (n is a natural number between 1 and 12), by observing the present device by positioning observer's both eyes on different observing points, respectively, a stereoscopic image can be recognized by both eyes stereoscopic vision. Moreover, since the number of observing points is 12, if the observer moves his head left and right, he can recognize a stereoscopic image having the parallax information comparable to the observing position from a wide range to a certain. extent.

Further, in FIG. 7, the longitudinal enlarging means 3 is disposed at a position where the beam having passed through the parallax barrier 2-1, which is the horizontal directional control means, enters. As described above, the beams directed to the observing points (1 to 12) corresponding to each parallax image are longitudinally enlarged, and the observer observes the pixels longitudinally enlarged on the longitudinal enlarging means 3.

Figure 8:
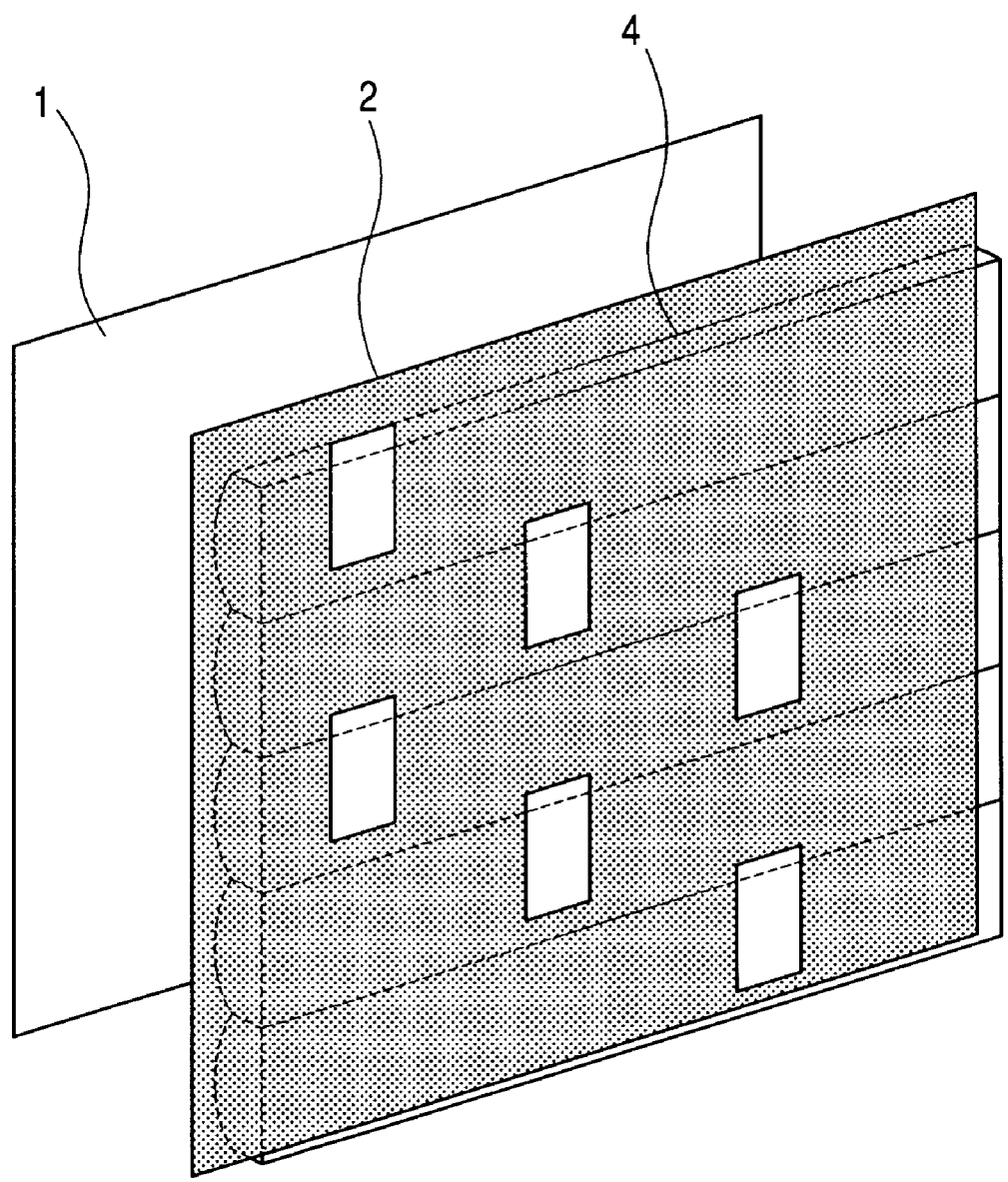
FIG. 8 is a schematic diagram showing one example of the configuration of the longitudinal enlarging means 3.

FIG. 8 is a schematic illustration showing a configuration in case of the cylindrical lens array 4 as an application using the longitudinal enlarging means 3. This cylindrical lens array 4 is characterized by giving a vertical optical power to the information display light provided with a horizontal directivity through the aperture of the horizontal directional control means 2. The expanse of the image information light projected on the longitudinal enlarging means 3 is enlarged by this cylindrical lens array 4, so that the distance between the horizontal directional control means 2 and the longitudinal enlarging means 3 is shortened, and at the same time, the optical relationship between both of them is made much clear, thereby presenting a clear image to the observer.

The cylindrical lens array 4 shown in FIG. 8 is configured by a plurality of cylindrical lens having the longitudinal pitch identical to the longitudinal pitch of a slit aperture of the parallax barrier 2-1. The direction of the meridian axis of the cylindrical lens at this time is parallel to the horizontal line. It is desirable that each cylindrical lens of the cylindrical lens array 4 is disposed in correspondence with each slit aperture of the parallax barrier 2-1, and is disposed such that the center in the height direction of each slit correspond to the meridian axis of the cylindrical lens.

Figure 9:
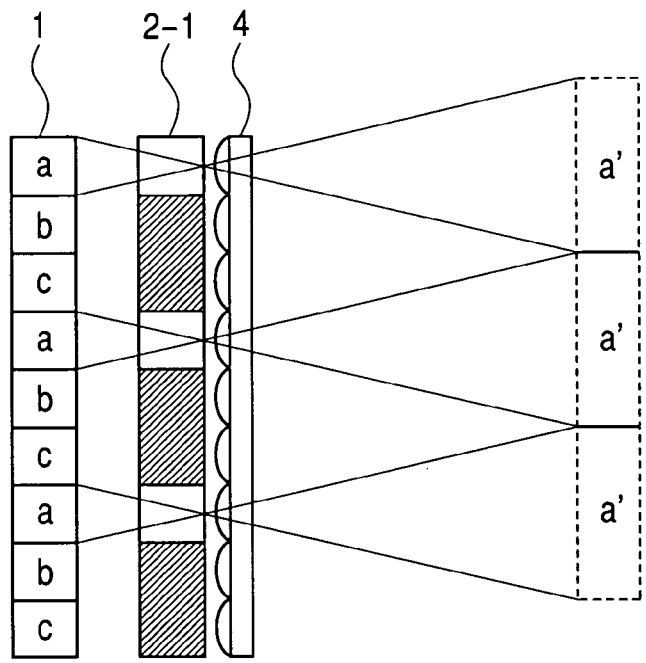
FIG. 9 is a view (a) showing the operation of the longitudinal enlarging means 3.
Figure 10:
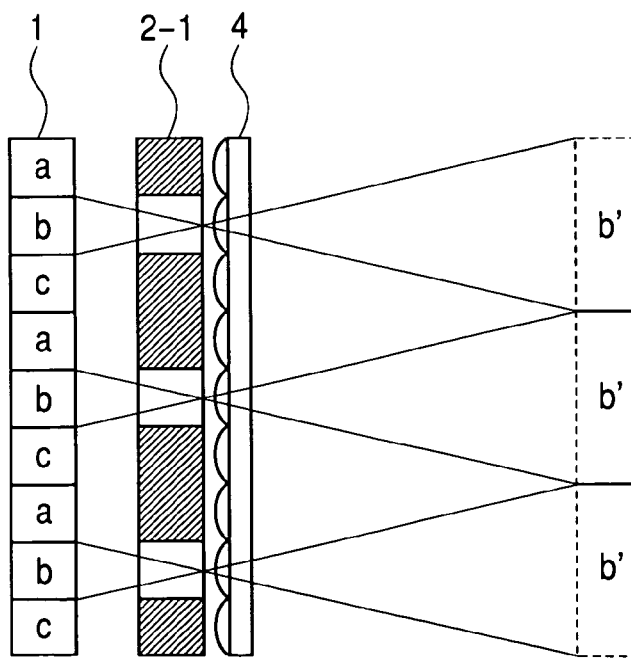
FIG. 10 is a view (b) showing the operation of the longitudinal enlarging means 3.
Figure 11:
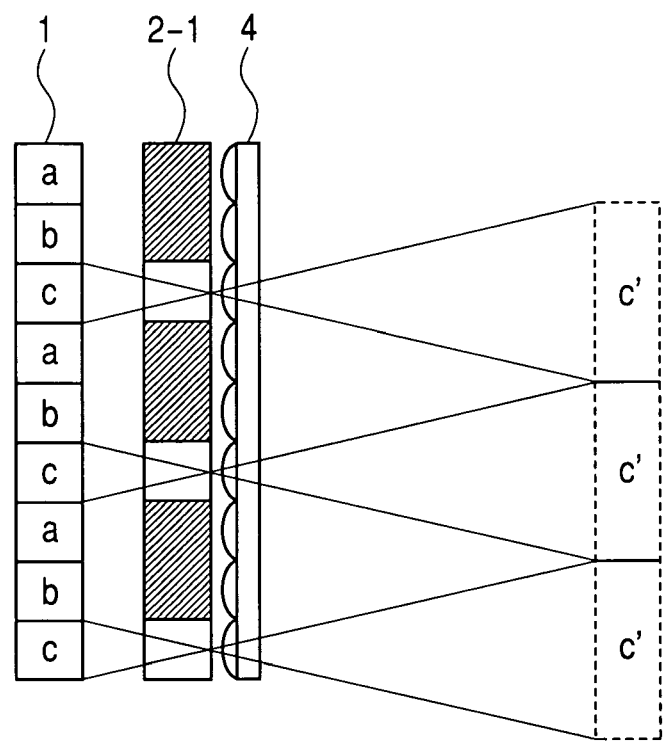
FIG. 11 is a view (c) showing the operation of the longitudinal enlarging means 3.

FIGS. 9 to 11 show the optical path of the information display light from each pixel in case of using the cylindrical lens array 4, respectively. FIGS. 9 to 11 show the configuration of a longitudinal section of the aperture portion for the columns a to c on the parallax barrier 2-1, respectively, and show the optical path of the beam emitted from the columns a to c on the image display means 1. The cylindrical lens array 4 has same longitudinal pitch as that of the. slit aperture of the parallax barrier 2-1. The meridian axis direction of the cylindrical lens at this time is a direction parallel to the horizontal line, and it is preferable that the meridian axis matches to a position corresponding to the longitudinally center of the slit aperture.

FIG. 9 is a view showing a state in which the beam from the pixel in the column a on the image display means 1 is magnified longitudinally and presented by the cylindrical lens array 4. The light emitted from the pixel in the column a passes through the slit aperture of the column a' of the parallax barrier 2-1, and enters the cylindrical lens 4 right behind the aperture. The cylindrical lens 4 has an optical power to magnify the pixel in the column a by three times and to form an image thereof at position a', and as a result, the pixel in the column a is magnified by three times in the height, direction only and is observed. The same thing is established for the pixels of the other columns. FIG. 10 shows a state in which the pixel in the column b is magnified by three times in the height direction only, and FIG. 11 shows a state in which the pixel in the column c is magnified by three times in the height direction only. It is desirable that the longitudinal enlarging means 3 is disposed at the positions a' to c'.

Figure 28:
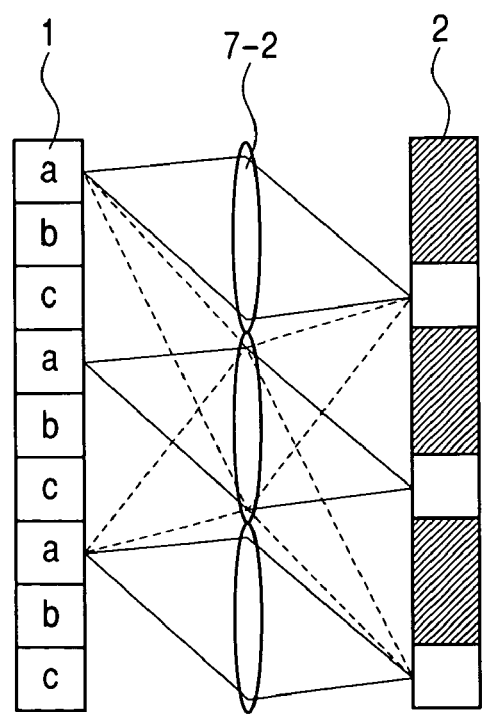
FIG. 28 is a view showing another example of the optical connecting means 7.

The cylindrical lens 4, as shown in FIG. 28 to be described below, may be disposed between the aperture of the parallax barrier 2-1 and the image display means 1, which can improve a using efficiency of the light. Further, a lens generating the same optical effect may be installed at the aperture of the parallax barrier 2-1. Further, in FIG. 8 and the like, while, by using the cylindrical lens 4 composing of convex cylindrical lenses, the information display light from the pixel of the image display means 1 is converged and diverged, the same effect can be obtained even by using the cylindrical lens 4 composing of concave cylindrical lenses.

Figure 12:
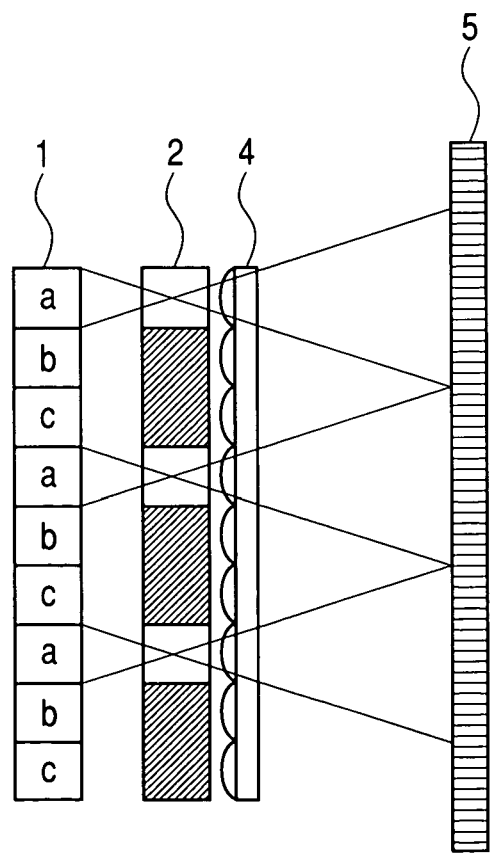
FIG. 12 is a view showing one example of a configuration for stably presenting an enlarged pixel image by the longitudinal enlarging means 3 to an observer.

FIG. 12 is a view showing a state of the arrangement of the longitudinal enlarging means 3 in case of using the cylindrical lens array 4. In FIGS. 8 and 9, for the sake of simplicity of drawing a figure, the longitudinal enlarging means 3 is omitted, however the longitudinal diffusion plate and the like which are the longitudinal enlarging means 3 are arranged within a region where the optically operated beams by the cylindrical lens array 4 are not longitudinally superposed.

Figure 13:
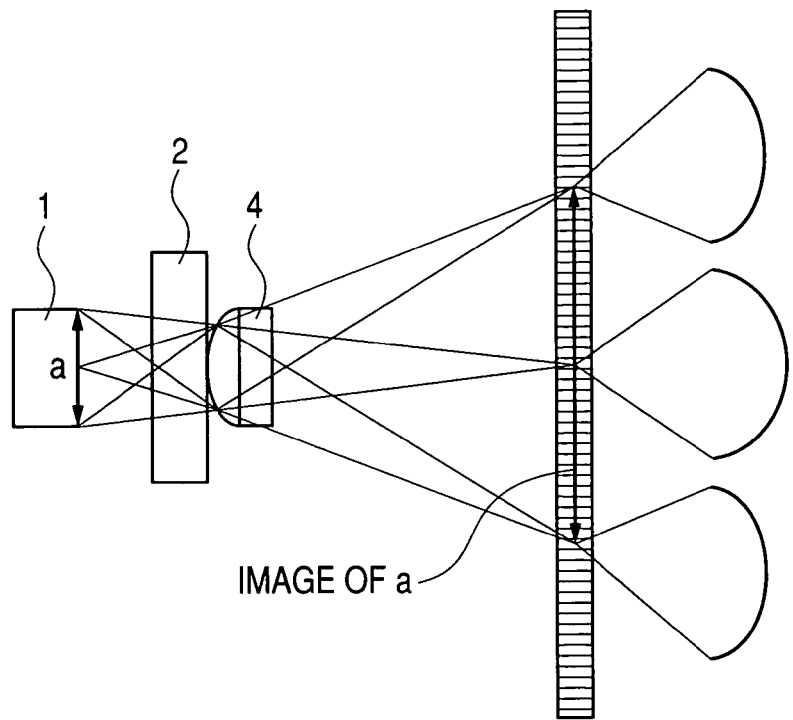
FIG. 13 is a view showing the behavior of a light when a longitudinal diffusion plate is arranged.

FIG. 13 is a view showing a behavior of the light within a longitudinal section in the configuration of FIG. 12. By the longitudinal diffusion plate 5 which is the longitudinal enlarging means 3, a radiant distribution of the light which contributes to the image formation of a image of the pixel a is enlarged. Consequently, when the observer faces the front of the screen and observes the above-described image, since the light from the vicinity of the image also travels toward the observer's eye, it is possible for the observer to stably recognize the whole image.

Figure 14:
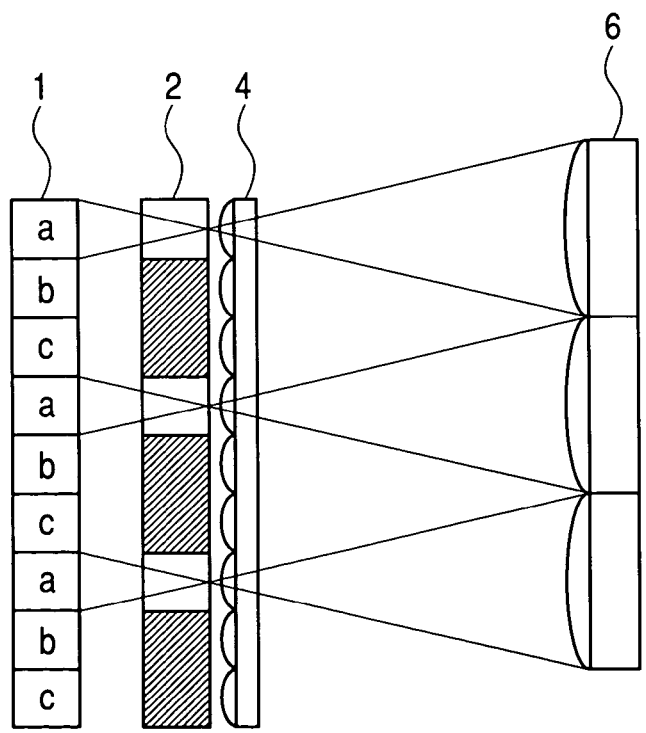
FIG. 14 is a view showing another example of the configuration for stably presenting the enlarged pixel image by the longitudinal enlarging means 3 to the observer.

The longitudinal enlarging means 3 can be configured by using an element generating a function such as a refraction, a diffraction, a reflection and the like in place of the longitudinal diffusion plate 5. FIG. 14 is another example of the configuration for stably presenting a pixel magnified by the longitudinal enlarging means 3 to the observer. In FIG. 14 shows a configuration example for stably presenting the pixel magnified by the longitudinal enlarging means 3 to the observer by using a cylindrical lens array 6 whose meridional axis direction is horizontal.

Figure 15:
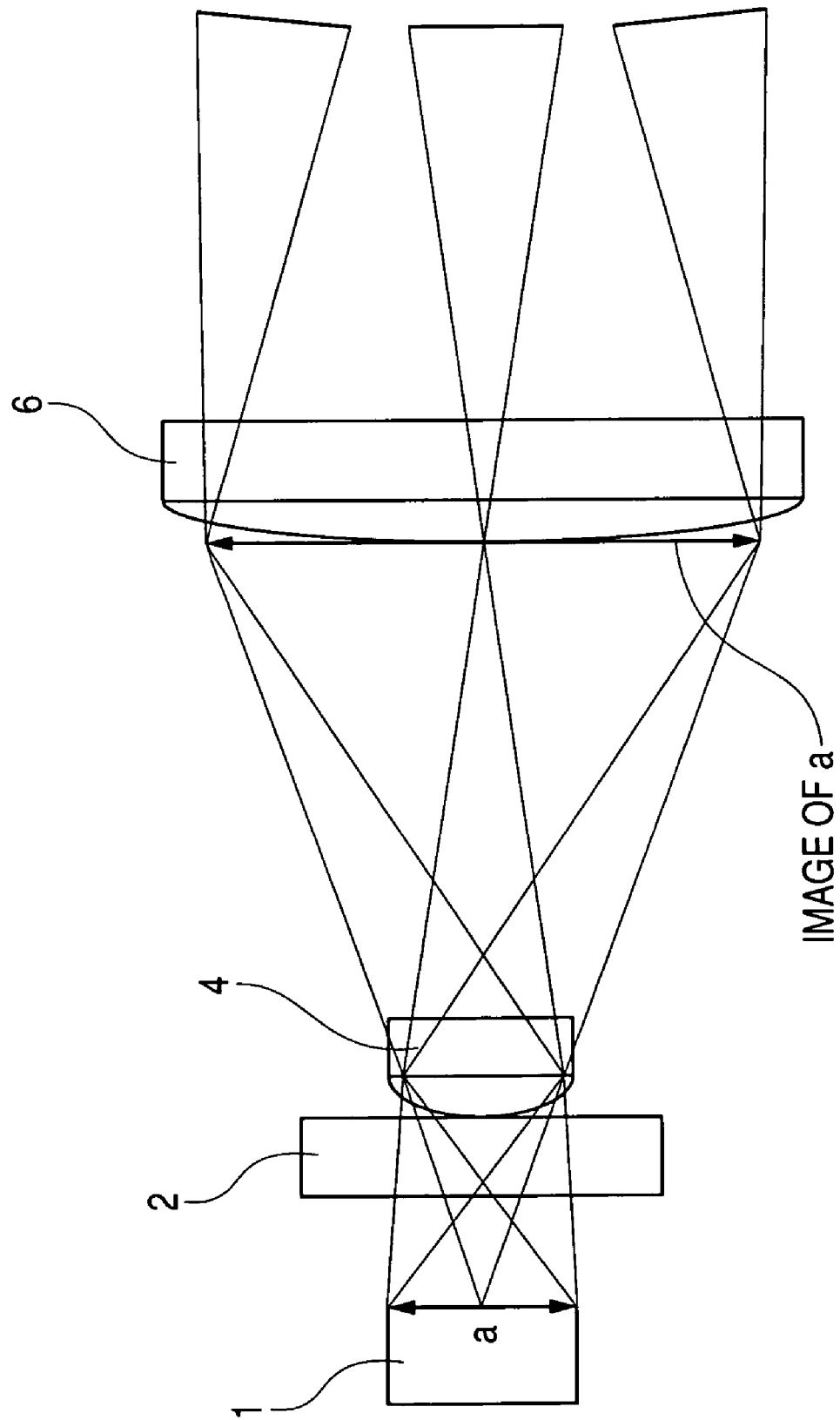
FIG. 15 is a view showing the behavior of the beam by the configuration of FIG. 14.

FIG. 15 is a view showing a behavior of the beam by the configuration of FIG. 14. Although the cylindrical lens array 6 differs from the longitudinal diffusion plate 5 on that the effect of expanding the radiant distribution of the light is small in the cylindrical lens array 6, as shown in FIG. 15, the cylindrical lens array 6 has an effect of collecting the light from the vicinity of the image toward the observer facing the front of the screen. Consequently, even by the configuration such as shown in FIG. 14, it is possible for the observer to recognize the whole image.

While, in FIGS. 13, 14 and 15, the cases where the cylindrical lens array 4 was used are described, its effect is the same also in the case where the longitudinal enlarging means 3 alone is used without using the cylindrical lens array 4.

Second Embodiment

In the first embodiment as described above, while the example of configuring the horizontal directional control means 2 by the parallax barrier 2-1 was described, it is possible to make the reduction of the image quality less conspicuous by the longitudinal enlarging means 3 in the case where a connection of the mask and the cylindrical lens array is used as the horizontal directional control means 2.

Figure 16:
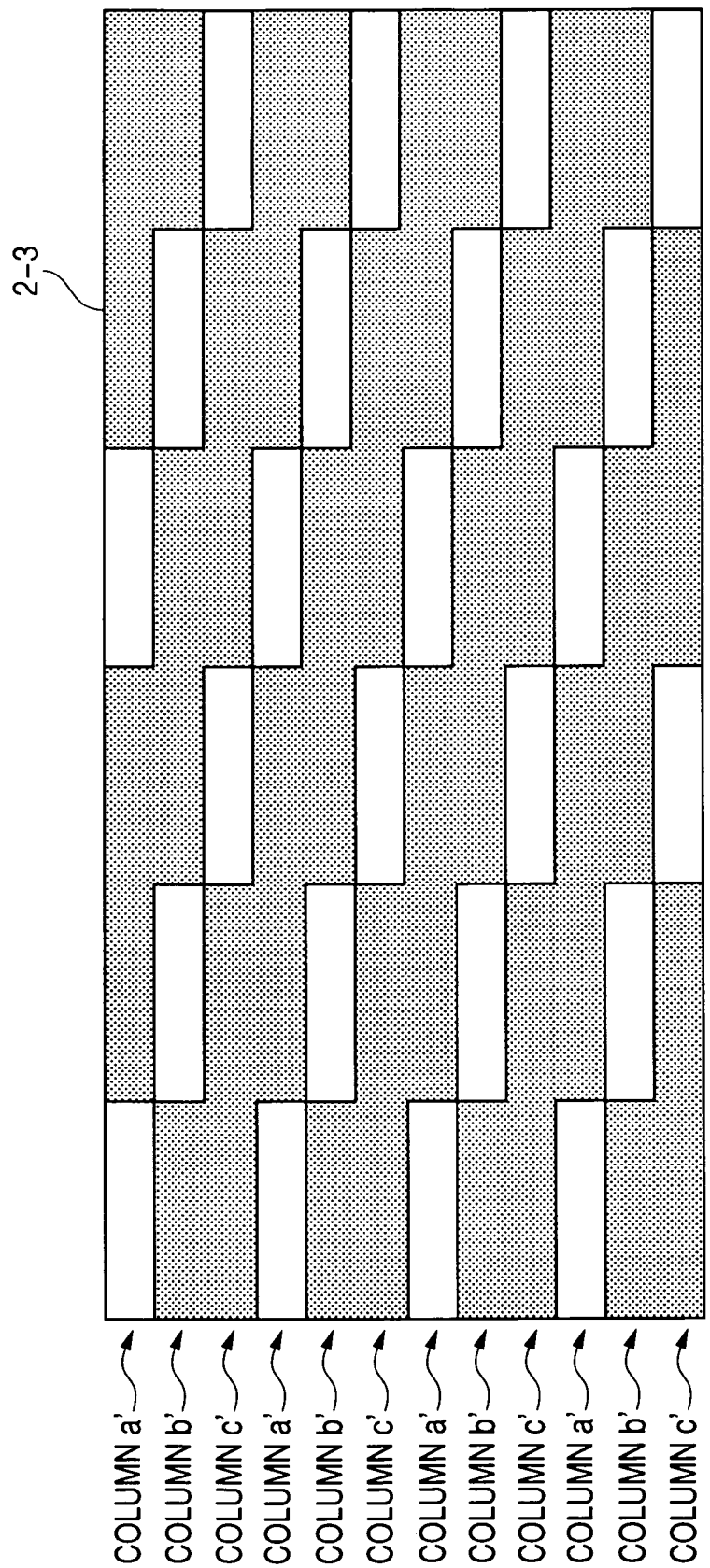
FIG. 16 is a view showing a mask 2-3 comprising a portion of horizontal directional control means 2 of the stereoscopic image display device according to a second embodiment.

FIG. 16 shows a mask 2-3 which is a barrier means composing a portion of the horizontal directional control means 2 of the present embodiment. The horizontal width of the slit portion of the mask 2-3 equals to the length of four pixels, and the vertical width equals to one pixel for the image display means 1 which has a pixel arrangement having 12-pixel horizontal period as shown in FIG. 2.

Figure 17:
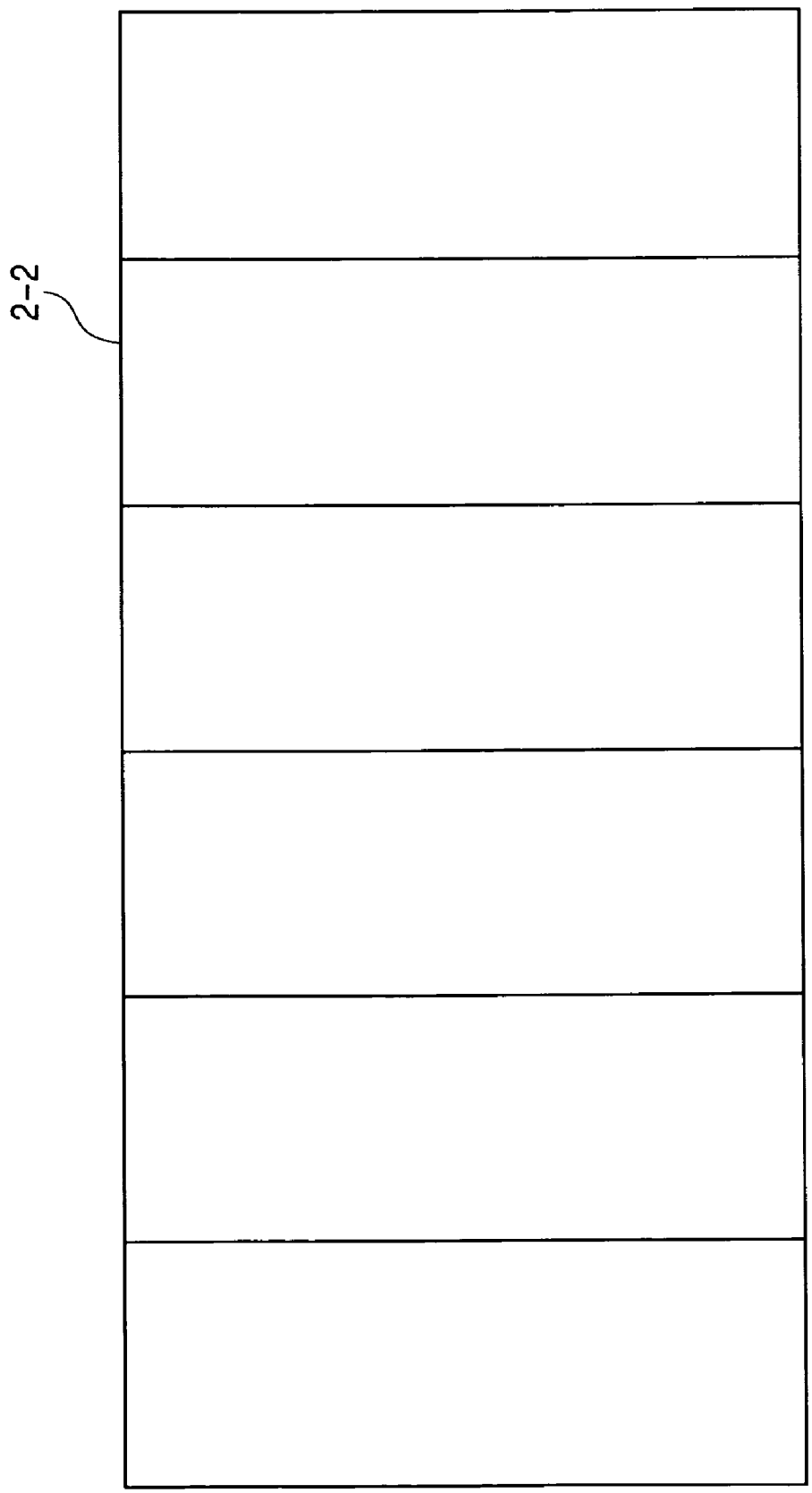
FIG. 17 is a view showing a cylindrical lens array 2-2 comprising a portion of horizontal directional control-means 2 of the stereoscopic image display device according to the second embodiment.

Further, FIG. 17 shows a cylindrical lens array 2-2 composing a portion of the horizontal directional control means 2 of the present embodiment. The cylindrical lens array 2-2 has convex cylindrical lenses, whose meridian axis is directed longitudinally, and periodically arranged in a horizontal direction, and the width of each cylindrical lens is identical to the width of the aperture portion of the mask 2-3, and the cylindrical lens is disposed in every aperture.

By connecting such a cylindrical lens array 2-2 and the mask 2-3 with the image display means 1, a stereoscopic image display device, with high usage efficiency of the light and also high horizontal directivity, can be configured without making reduction of an image quality conspicuous as described below.

Figure 18:
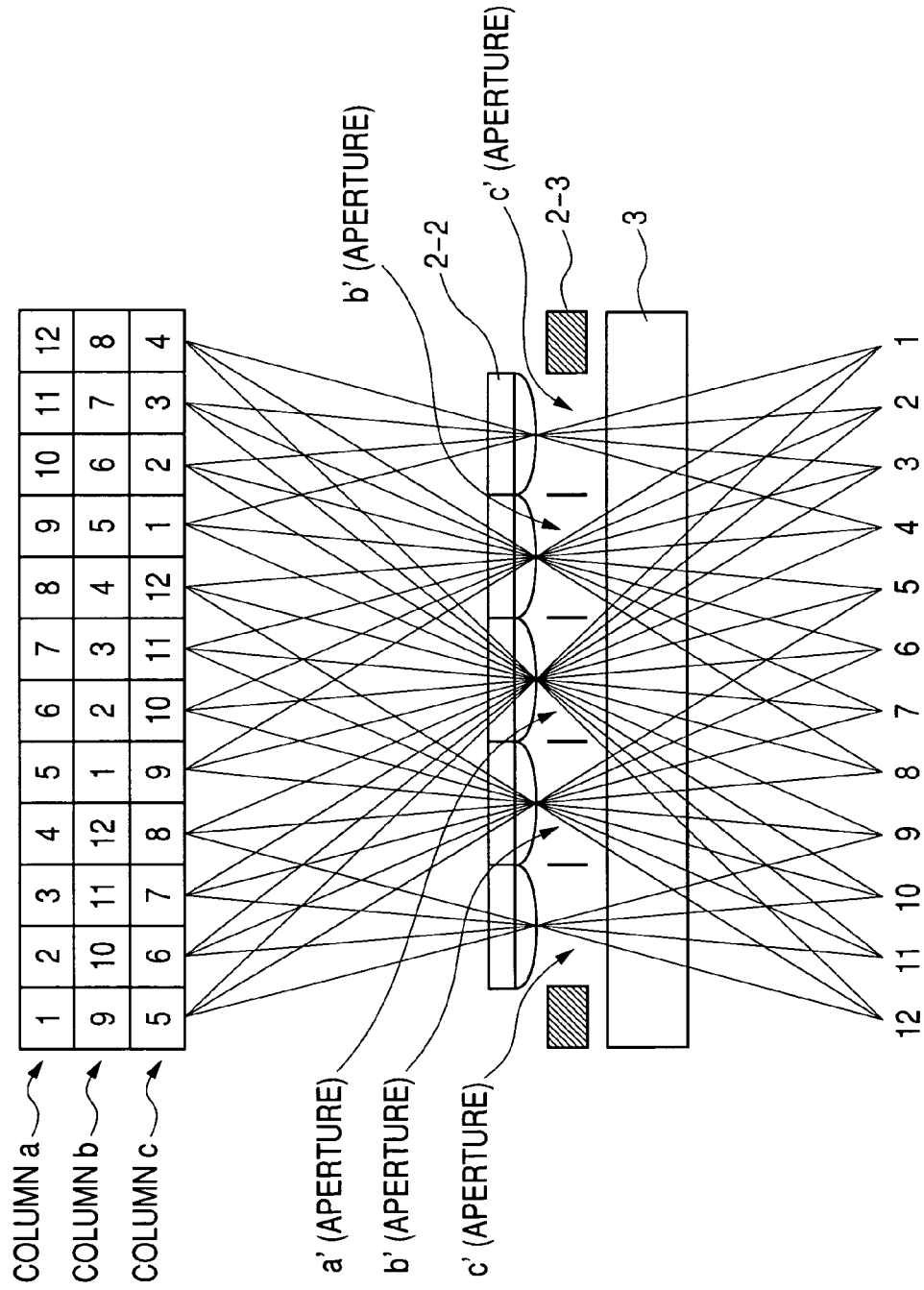
FIG. 18 is a view explaining the configuration of the stereoscopic display device according to the second embodiment and the behavior of light.

FIG. 18 is a view explaining a configuration seen from the above of the stereoscopic image display device according to a second embodiment and an optical path of the beam radiated from each pixel. The stereoscopic image display device according to the present embodiment is configured such that the cylindrical lens array 2-2 and the mask 2-3 are disposed in front of the image display means 1, and moreover, longitudinal enlarging means 3 is disposed in front thereof. For the sake of simplicity, as for the pixel arrangement, the minimum unit including columns a to c is shown as a front view. Further, as for the aperture of the mask 2-3, the apertures (a'to c') for the columns a to c are shown within the same plane. The interval between respective constituent elements and the optical power of the cylindrical lens configuring the cylindrical lens array 2-2 are decided such that the beams from each pixel depict the optical path as shown in FIG. 18.

By comparing FIG. 18 to FIG. 7, if the principal ray of each cylindrical lens is depicted, the behavior of the light in the present configuration is identical to the behavior of the light in case of using the parallax barrier 2-1 for the horizontal directional control means 2 shown in FIG. 8, and it is clear that a multi-visual point stereoscopic image display device can be configured even by the present configuration.

Figure 20:
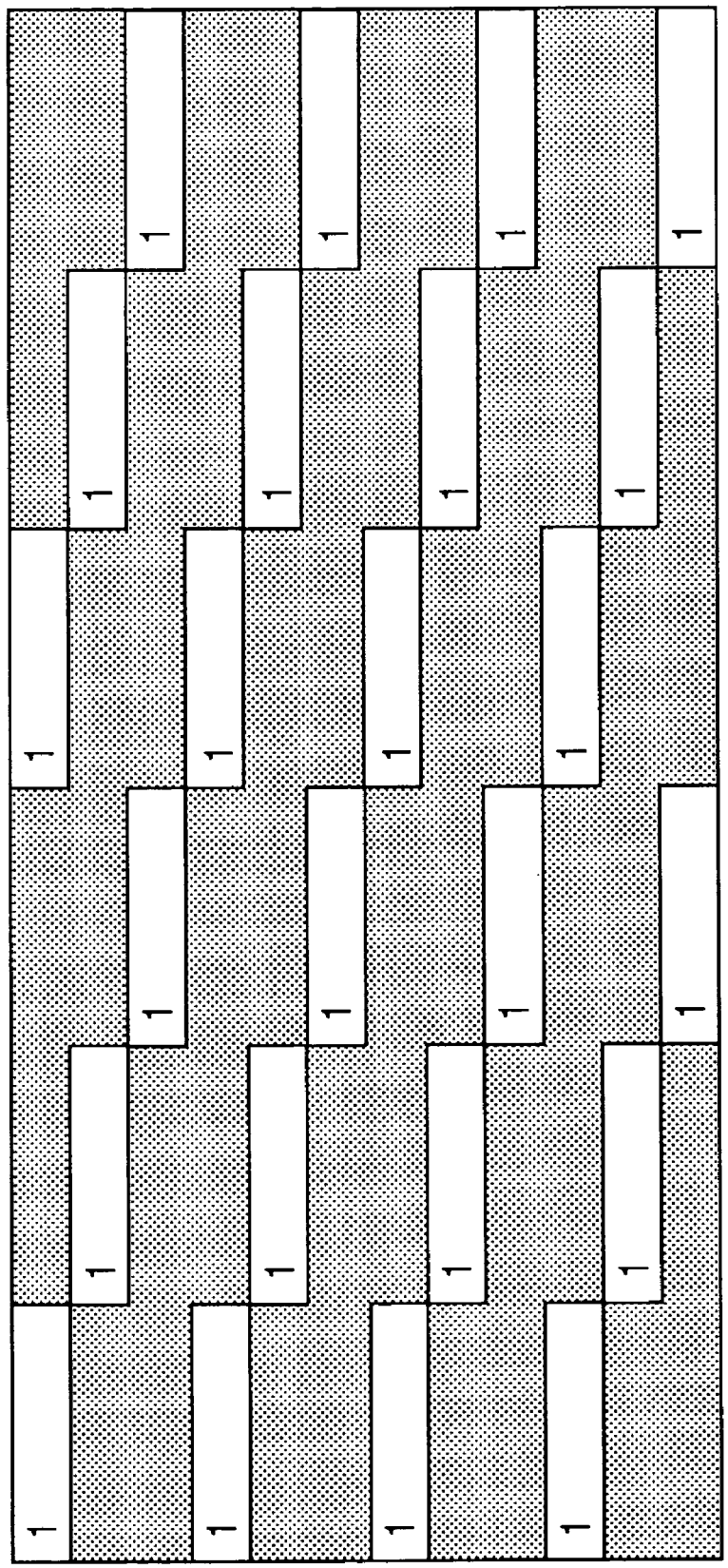
FIG. 20 is a view explaining the effect of one aspect of the stereoscopic image display device according to the second embodiment.
Figure 21:
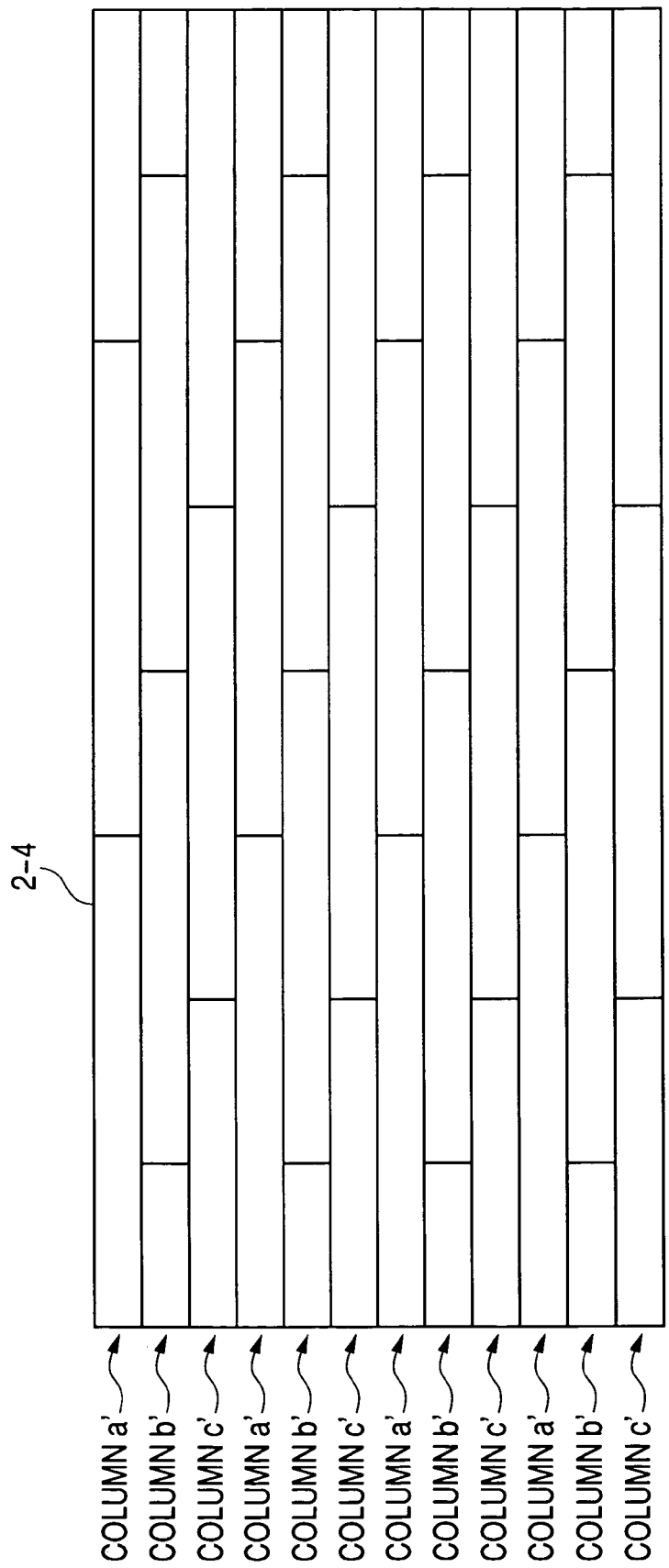
FIG. 21 is a view showing a cylindrical lens array which is one example of a conventional horizontal directional control means.
Figure 22:
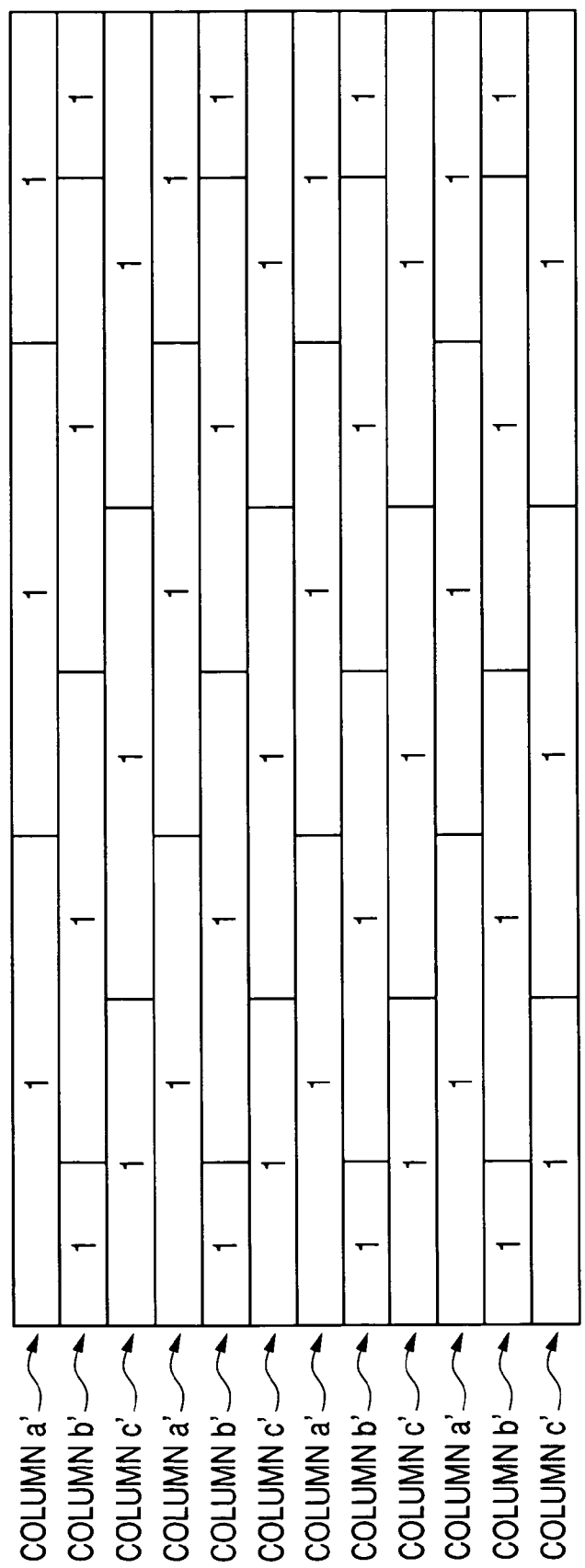
FIG. 22 is a view showing a state of the image recognized by an observer at an observing position of the stereoscopic image display device using the conventional cylindrical lens array as the horizontal directional control means.

FIG. 20 is a view showing a state of the screen observed by the configuration shown in FIG. 18. Further, for the sake of comparison, FIGS. 21 and 22 show a view showing the cylindrical lens array which is one example of a conventional horizontal directional control means and a state of the screen observed by an observer in case of using the cylindrical lens array. As shown in FIG. 21, the cylindrical lens array as the conventional horizontal directional control means has a width corresponding to one period portion of the pixel arrangement in the horizontal direction. As a result, as shown in FIG. 22, each pixel on the screen observed by the observer is magnified only in a lateral direction and observed, thus an unnatural image on the screen has been observed. This effect becomes much conspicuous because one period of the horizontal pixel arrangement is elongated when the number of parallax images to be displayed is increased.

In contrast to this, as shown in FIG. 20, according to the configuration shown in FIG. 18, a ratio of lateral magnification of each pixel at the observing time is restricted, and much more natural display becomes possible. In the configuration shown in FIG. 18, while an example of a synthetic image synthesized in a matrix shape is shown, it is also applicable to, for example, the synthesized image synthesized in a longitudinal stripe shape. Further, while FIG. 16 shows the case where the aperture width of the mask 2-3 is 1/integer number of one horizontal period of-the synthesized image (one third of 12 pixels), there is no need to be limited to this, but by providing an aperture with the width corresponding to a plurality of pixels fewer than the number of pixels of one horizontal period of the synthesized image, it is possible to gain the above described effect.

Depending on the configuration of the present embodiment, it is possible to enhance the usage efficiency and directivity of the light compared to the case of utilizing the parallax barrier 2-1. This is because, while the aperture (slit) of the parallax barrier 2-1 is required to reduce the horizontal width in order to generate directivity of the light, in the present embodiment, since the directivity of the light can be generated by the cylindrical lens array 2-2, the horizontal width of the mask 2-3 can be configured large, and compared to a mask 2-1, a overwhelmingly high aperture ratio can be realized. Moreover, since the light passing through the mask 2-3 can be converged into a desired position or made into a parallel beam by refraction of individual lens of the cylindrical lens-array 2-2, a higher directivity than the light passing through the slit portion of the parallax barrier 2-1 can be realized. This reduces the "crosstalk", where the images observed at adjacent visual points are mutually mixed, and contributes to enhance the quality of the stereoscopic image to be reconstructed.

Figure 23:
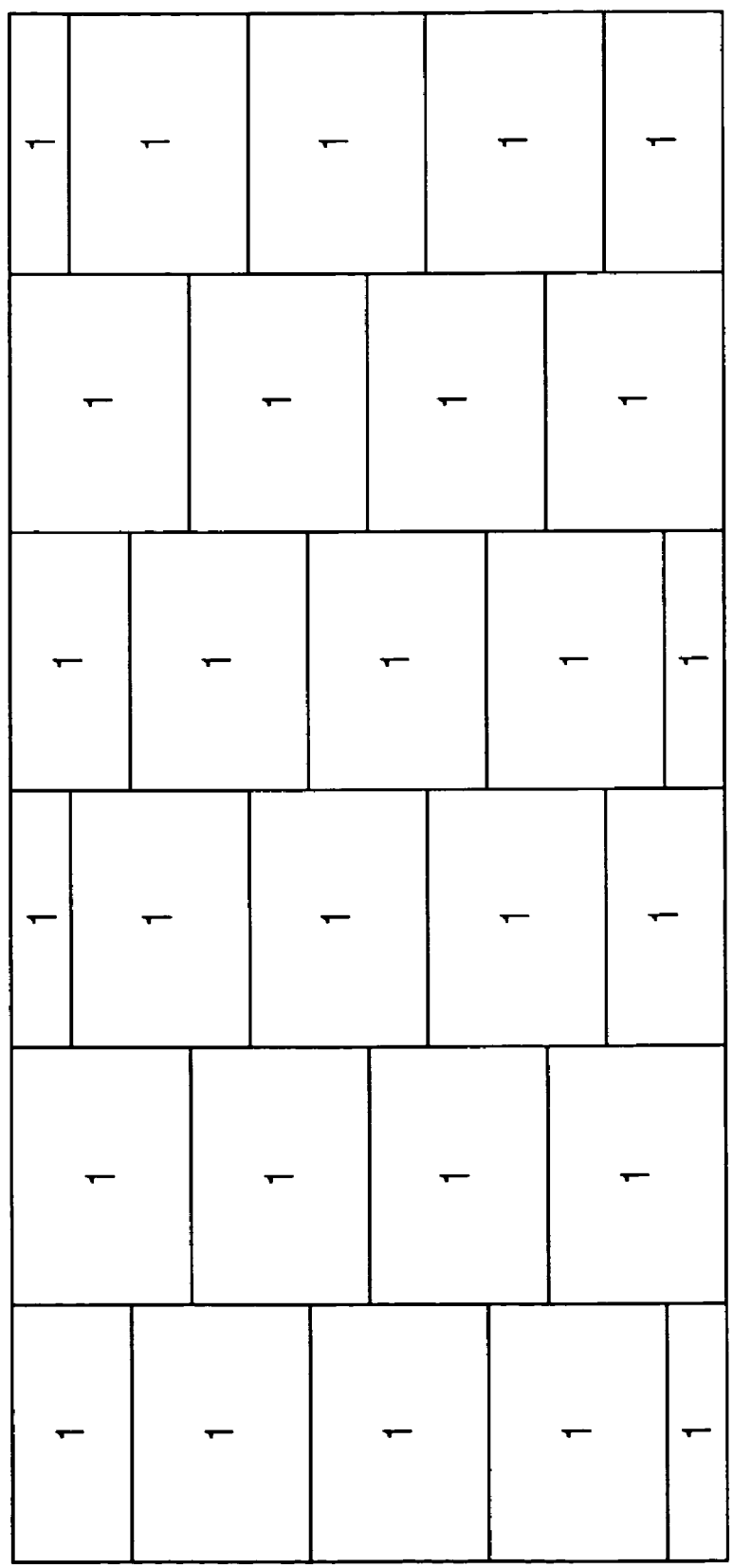
FIG. 23 is a view explaining the effect of another aspect of the stereoscopic image display device according to the second embodiment.

FIG. 23 is a view explaining the effect in case of enlarging the apparent height of the pixel to be observed compared to FIG. 20 by adopting the longitudinal enlarging means 3 to the configuration shown in FIG. 18. In the state of FIG. 20, while the apparent size of the each pixel is observed enlarged laterally four times by the effect of the cylindrical lens array 2-2, in case of using the longitudinal enlarging means 3 to enlarge three times longitudinally at a projecting position, the apparent height alone of the pixel is further enlarged three times, and the observer can observe a luminance distribution such as FIG. 23.

In the case of FIG. 23, the non-display region of the image is totally eliminated, and the ratio of the display region becomes 100%. The same holds true with the other visual points, despite displaying the synthesized image of the parallax images corresponding to 12 visual points in the image display means 1, it is possible to observe the parallax images only corresponding to each visual point without generating the non-display regions for all the visual points in the observing position.

A magnification at the projecting position by the longitudinal enlarging means 3 used in the present embodiment is not necessary 3, and even if it is less than 3, the effect of reducing the non-display region can be obtained. On the other hand, if it is more than 3, the beams between the pixels longitudinally adjacent are mixed, and therefore, it is not preferable.

Further, though the number (N) of parallax images of the synthesized image to be displayed in the image display means 1 is not limited to 12, to make the present invention easy to adopt, it is preferable that the number of parallax images is the number, N=L×M, wherein L and M represent the numbers of unit pixels to display each parallax image, (L and M are the integer equal to or greater than 1) so that the parallax image are arrangeable in a rectangular shape of L pieces longitudinally and M pieces laterally. In this case, it is preferable that the magnification of the longitudinal enlarging means 3 is taken as L times, and the pitch of the cylindrical lens array 2-2 and the width of the aperture of the mask 2-2 are taken as the length of M pixels.

It is preferable that the longitudinal enlarging means 3 used in the present embodiment is used in connection of the cylindrical lens array 4 composed of the.cylindrical lens with the meridian axis corresponding to each aperture of the mask 2-3 taken as running in the horizontal direction. At this time, the cylindrical lens array 2-2 vertically, having the meridian axis and composing a portion of the horizontal directional control means 2, can be integrated with the cylindrical lens array 4.

As described above, compared to the case where the parallax barrier 2-1 is used, in the case of the configuration using the-cylindrical lens array 2-2 and the mask 2-3, the non-display region can be eliminated, thereby enabling to perform a stereoscopic image display, which is extremely bright and has less crosstalk.

Further, compared to the case where a lenticular lens is used as a conventional horizontal directional control means 2 as described by using FIG. 22, since each pixel at an observing position is enlarged not only laterally, but both longitudinally and laterally, it is possible to make it more difficult to recognize the reduction of an image quality.

The configuration of the horizontal directional control means 2 having such an operation is not limited to the connection of the mask and the cylindrical lens array as described above, but the other connection may be adopted if it is the connection of an arbitrary horizontal directional control means and means for selecting an effective region of that horizontal directional control means, and a connection with the longitudinal enlarging means 3 which can achieve a state where an apparent pixel is preferable for the observer.

Figure 24:
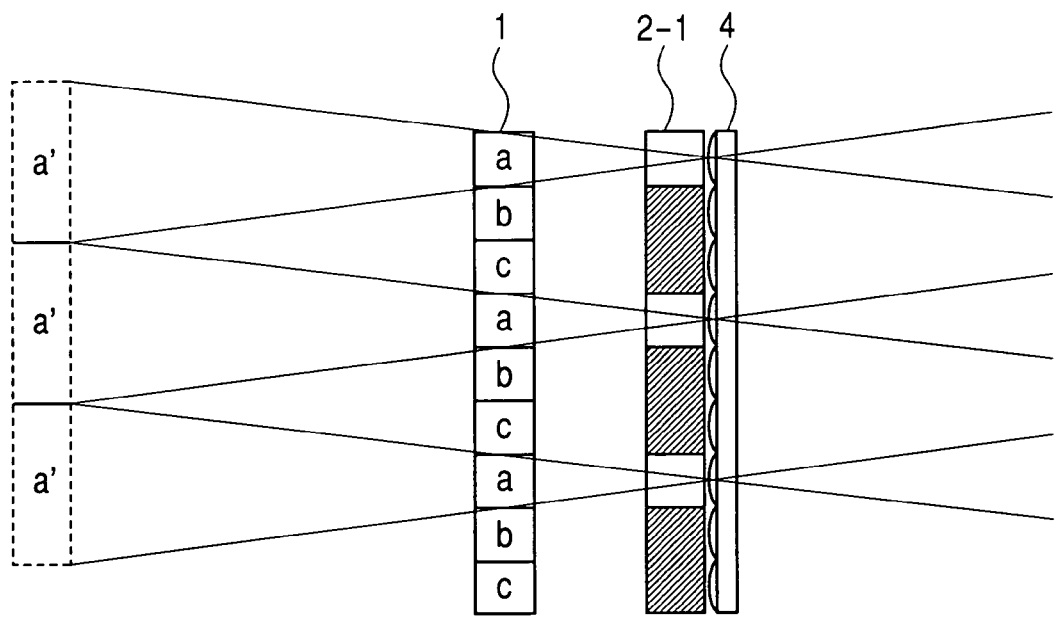
FIG. 24 is a view showing another usage example of the longitudinal enlarging means 3 in the stereoscopic image display device according to the second embodiment.

FIG. 24 is a view showing another usage example of the longitudinal enlarging means 3 of the stereoscopic image display device according to the second embodiment. In FIGS. 8 to 9, the cylindrical lens array 4, which is the longitudinal enlarging means 3, enlarges and forms an image of a real image of the pixel. In contrast to this, as shown in FIG. 24, a configuration is also possible such that a virtual image is enlarged and formed. By such a change, a degree of freedom for design can be enhanced without compromising the effect of the longitudinal enlarging means 3.

Third Embodiment

The present embodiment improves the stereoscopic image display device according to the above-described embodiment, and an embodiment for configuring a stereoscopic image display device having a better performance will be described.

Figure 26:
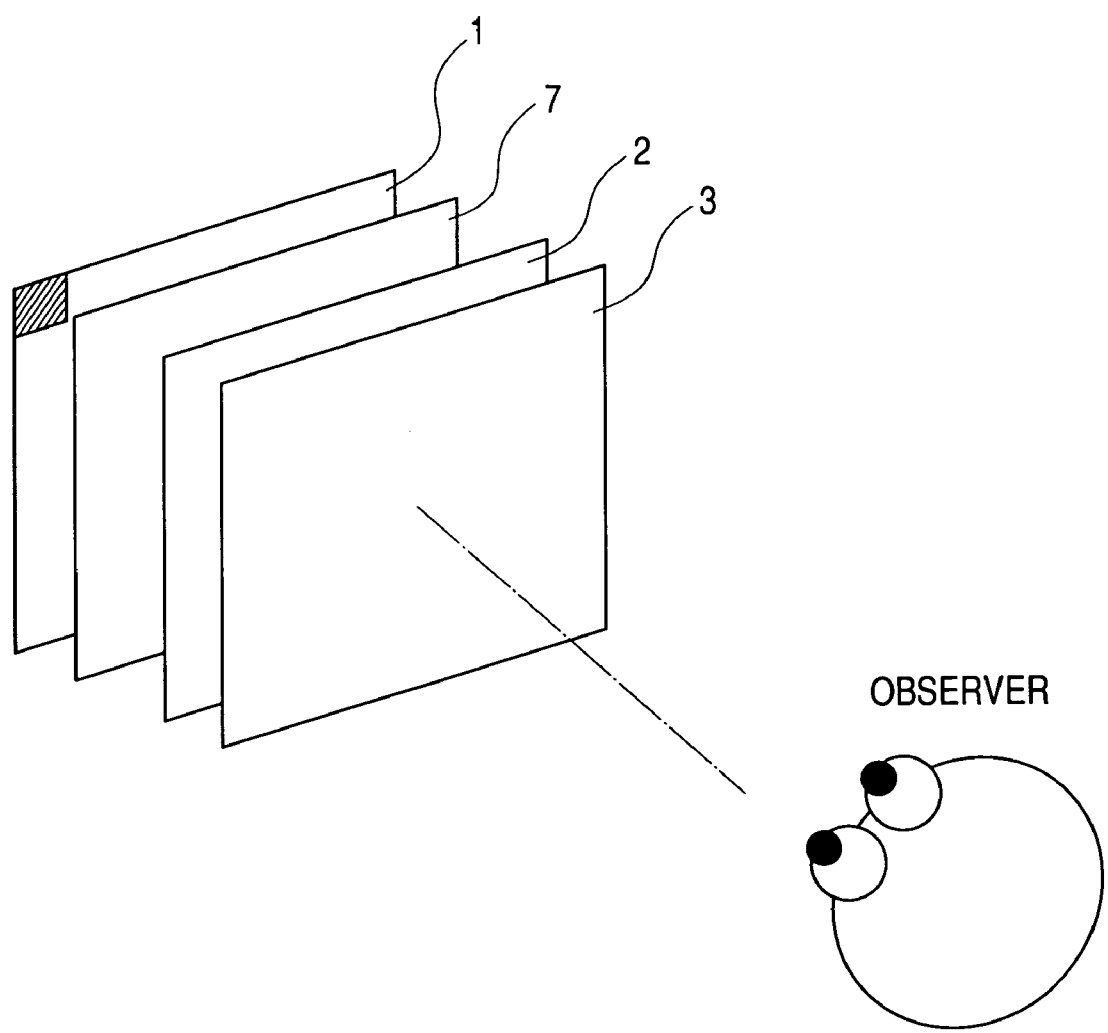
FIG. 26 is a perspective view explaining the outline of the stereoscopic image display device according to a third embodiment.

FIG. 26 is a perspective view explaining the outline of the stereoscopic image display device according to the present embodiment. In FIG. 26, in addition to the configuration shown in FIG. 1, the stereoscopic image display device is configured by inserting an optical connecting means 7 so as to optically make a correspondence between each column of the pixel and each region on the horizontal directional control means between image display means 1 and horizontal directional control means 2.

Figure 25:
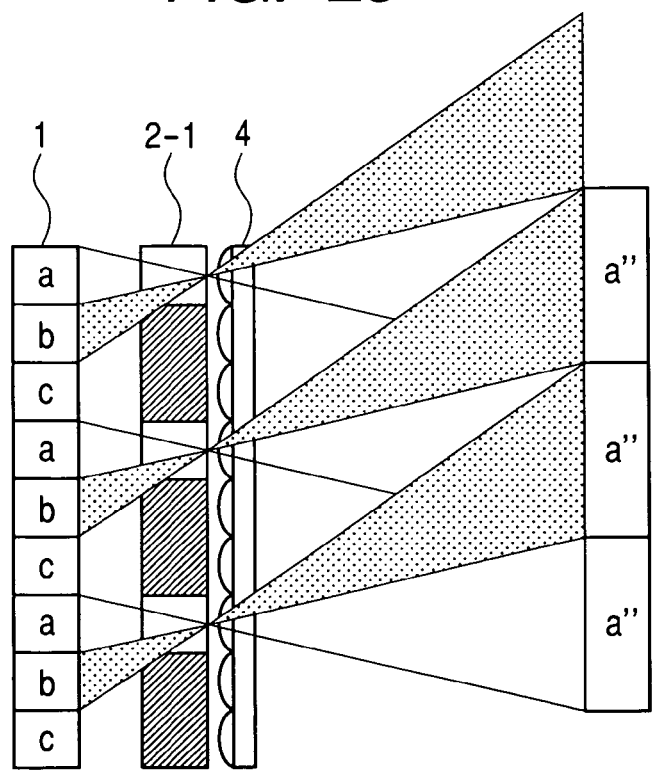
FIG. 25 is a view showing an example that the light from the pixel of the image display means 1 is incident on the region, which doesn't correspond to the light, of the horizontal directional control means 2.

FIG. 25 shows an example where the beam from the pixel on the image display means 1 enters a non-corresponding region of the horizontal directional control means 2. The beam radiated from a pixel a passes through the slit portion of the corresponding parallax barrier 2-1, and is longitudinally enlarged by the cylindrical lens array 4, and is formed as a real image in a region a". On the other hand, the beam from a pixel b, which exists in the column different from the column pixel a exists, can also pass through the slit portion of the parallax barrier 2-1 corresponding to the pixel a and this causes the crosstalk.

In contrast to this, by using the optical connecting means 7, it is possible to securely make the correspondence between each pixel on the image display means 1 and the region of the corresponding horizontal directional control means 2. Thereby, the crosstalk, generated by the beam from the pixel on the image display means 1 entering the non-corresponding region of the horizontal directional control means 2, can be effectively prevented.

While, in the drawing, the optical connecting means 7 is inserted between the image display means 1 and the horizontal directional control means 2, if the correspondence between each column of the pixel and each region on the horizontal directional control means can be optically made, the position of the optical connecting means 7 may be another position, and for example, this is possible by a method such as giving a directivity to the beam emanated from illumination means for illuminating the image display means 1 from the back surface thereof as described in the following embodiment.

Figure 27:
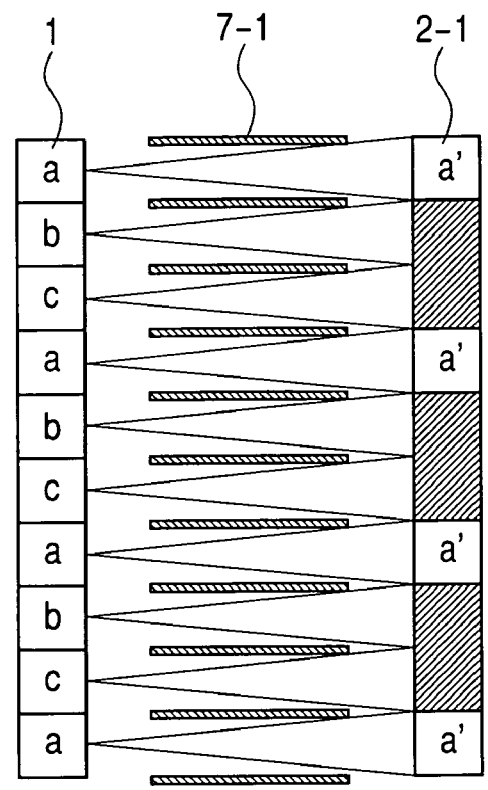
FIG. 27 is a view showing one example of optical connecting means 7.

FIG. 27 is a view 'showing an example of the optical connecting means 7. In FIG. 27, a louver 7-1 is used, which is arranged all in parallel at an identical height with a pitch of the pixel as the optical connecting means 7, and is a wall to shield the beam emitted from the pixel to enter the region of the non-corresponding horizontal directional control means 2. Since the louver 7-1, as shown in the drawing, has a role of limiting the light emitted from pixel of each column so as not to obliquely enter a region other than the corresponding region, the generation of the above-described crosstalk can be suppressed.

FIG. 28 is a view showing another example of the optical connecting means 7. As shown in FIG. 28, even by using the cylindrical lens array, an optical connecting between the column of the pixel on the image display means 1 and the region on the horizontal directional control means 2 can be similarly made. In FIG. 28 is shown a configuration example, where the cylindrical lens array 7-2 having an identical pitch with the length of three columns of the pixel and a meridian axis direction is horizontal is added to the embodiment using the slit shown in FIG. 3. The pixel and the aperture has an optically conjugate relationship by the cylindrical lens array 7-2, and if an aperture for each column is disposed at a image-forming position of the pixel of each column, the light from the pixel of each column surely passes through the corresponding aperture, thereby the generation of the crosstalk.can be suppressed. Further, the cylindrical lens array 7-2 can perform also a function of the cylindrical lens array 4 shown in FIG. 8

Figure 29:
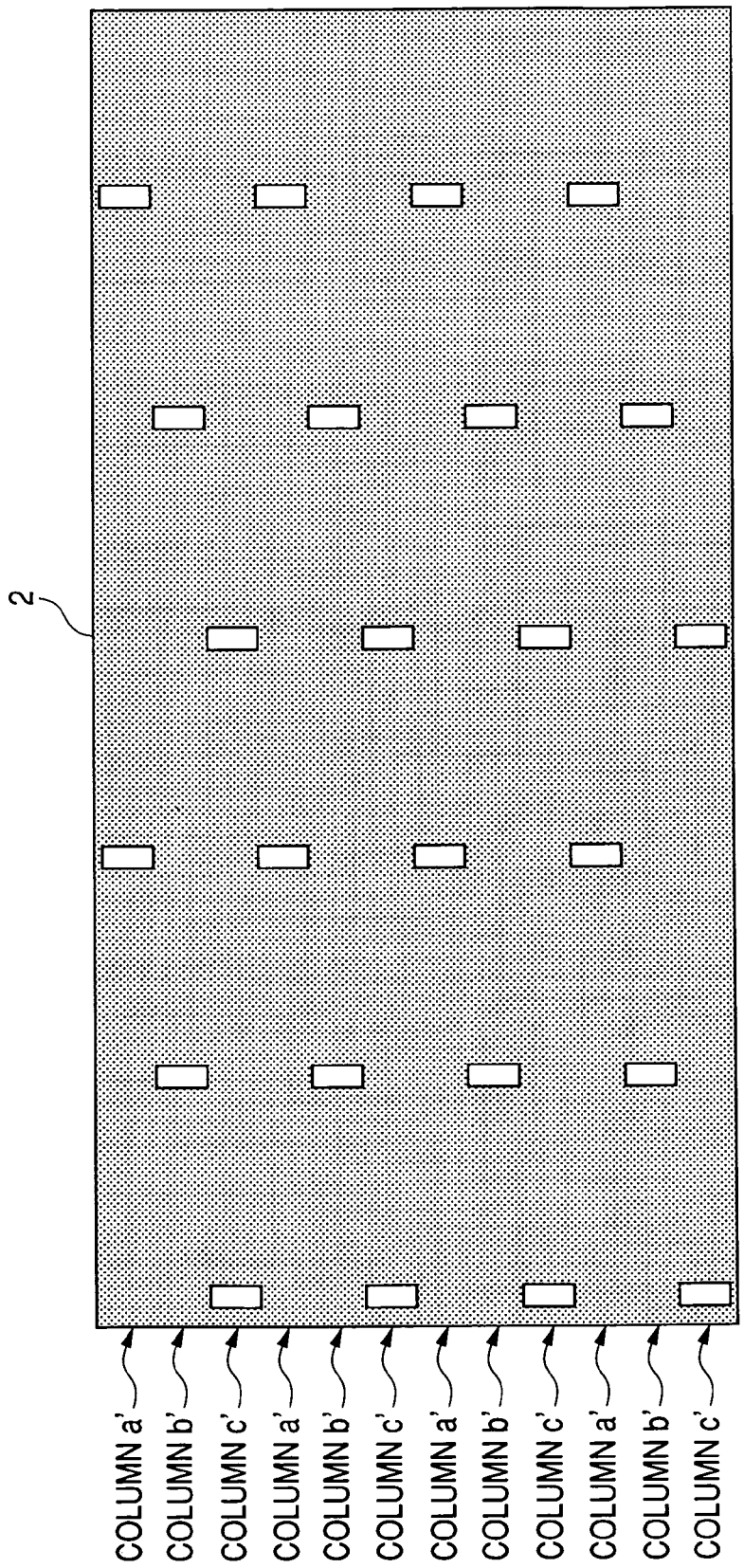
FIG. 29 is a view showing the horizontal directional control means 2 used in the configuration of FIG. 28.

FIG. 29 shows the horizontal directional control means 2 used in the configuration of FIG. 28. In the case of the configuration such as FIG. 28, since it is necessary to dispose the aperture in consideration of a vertical inverted image-formation, the aperture of the horizontal directional control means 2 corresponding to the image display means 1 which has a pixel arrangement such as shown in FIG. 2 has a configuration such as shown in FIG. 29.

While, even in the above-described configuration, there happens that the light from the pixel obliquely enters the cylindrical lens 7-2 other than the front surface, it is possible to allow the light to reach the aperture of the corresponding column of a column different from the primarily corresponding column by adjusting the image display means 1, the horizontal directional control means 2, and the optical power of the cylindrical lens 7-2 as shown in FIG. 28 by a dotted line. That is, for example, the beam emitted from a certain column a can be allowed to reach an aperture corresponding to the other column a located upper and lower adjacent the column a.

Figure 30:
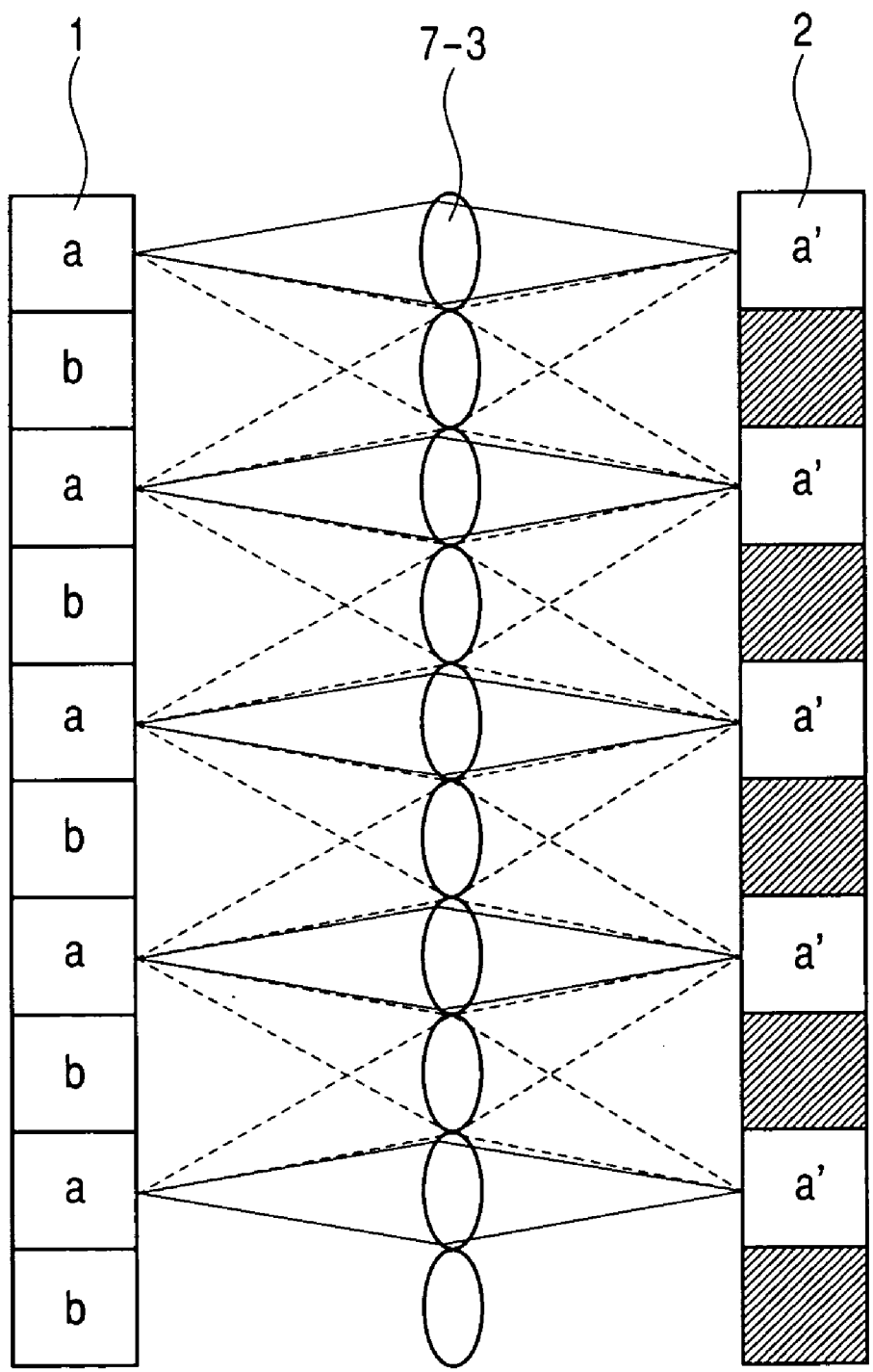
FIG. 30 is a view showing another example of the optical connecting means 7.

FIG. 30 is a view showing another example of the optical connecting means 7. As shown in FIG. 30, even if using the cylindrical lens array having a pitch identical to the height of the pixel, the column of the pixel and the column of the aperture can be optically connected, similarly. In FIG. 30 is shown a configuration example, where the cylindrical lens array 7-3 having a pitch identical with the height of the pixel with the meridian axis direction being horizontal is used. Even in this case, the pixel and the aperture are in a optically conjugate relationship by the cylindrical lens array 7-3, and if an aperture for each column is disposed at a image-forming position of the pixel of each column, the light from each column surely passes through the corresponding aperture, thereby the generation of the crosstalk can be suppressed.

Figures 31, 32:
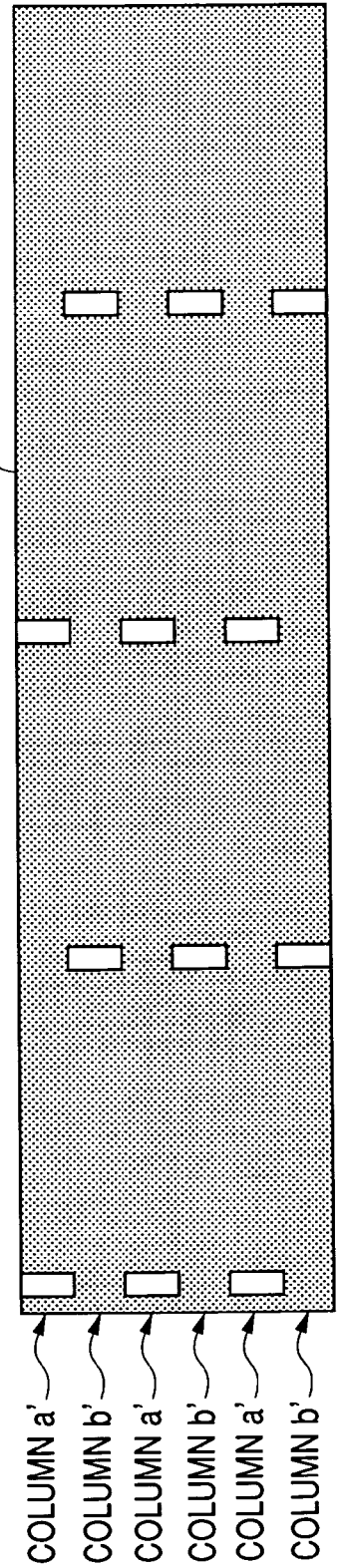
FIG. 31 is a front view of the pixel arrangement on the image display means 1 suitable of the configuration example of FIG. 30.
FIG. 32. is a front view of an aperture pattern of the horizontal directional control means 2 corresponding to the pixel arrangement of FIG. 31.

However, in order that the light, which obliquely enters the cylindrical lens longitudinally positioned and other than the cylindrical lens in front of the pixel, does not become a crosstalk component, the column configuration of the pixel is required to consist of two instead of three columns. FIG. 31 is a front view of the pixel arrangement on the image display means 1 suitable for the configuration of FIG. 30. A horizontal array pattern of the pixel depends on the longitudinal position within the screen, of which there exist two types.

FIG. 32 is a front view of the aperture pattern of the horizontal directional control means 2 corresponding to the pixel arrangement of FIG. 31. In FIG. 30, a solid line represents the light entering the front cylindrical lens from the pixel of the column a and a broken line represents the light obliquely entering the cylindrical lenses located adjacent upper and lower. It is clear that either of the lights enters the column a'. The same thing is established with the light from the pixel of the column b, and therefore, according to the present configuration, the column of the pixel and the column of the aperture are optically connected, thereby the generation of the crosstalk can be suppressed.

Figure 33:
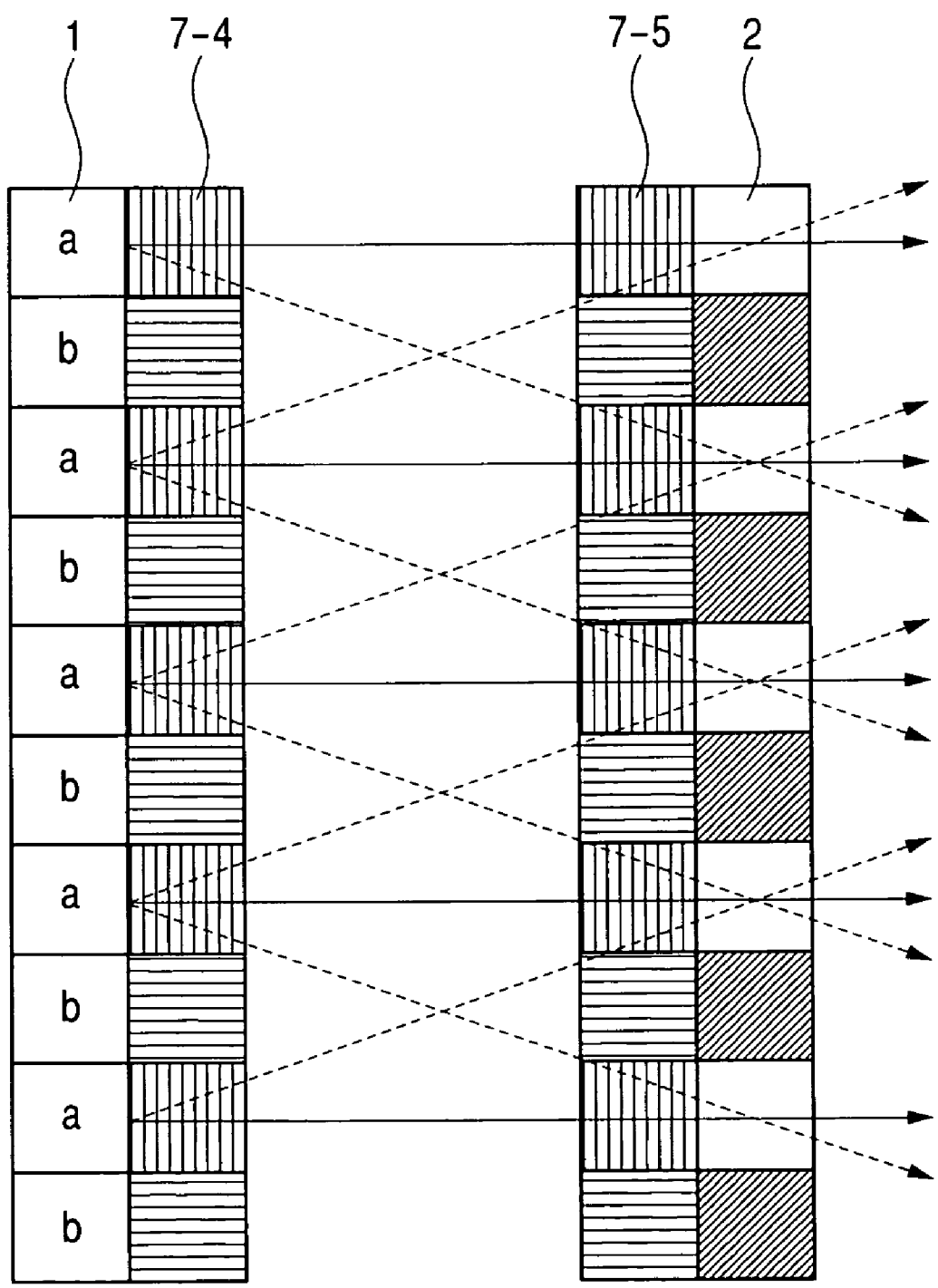
FIG. 33 is a view showing another example of the optical connecting means 7.

FIG. 33 is a view showing another example of the optical connecting means 7. As shown in FIG. 33, even if a light selection filter having a characteristic to transmit a light only in a certain state from lights in a plurality of states is used, the column of the pixel and the column of the aperture can be optically connected. In FIG. 33 is shown the case where the embodiment using the slit shown in FIG. 3 is arranged by adding the light selection filter arrays 7-4 and 7-5 periodically arranged with the pitch identical with the height of the pixel in the vicinity of the image display means 1 and in the vicinity of the horizontal directional control means 2, respectively. The region represented by vertical stripes in the drawing is configured by a filter portion which transmits a light in first state, and the region represented by lateral stripes in the drawing is configured by a filter portion which transmits a light in second state.

By exclusively setting the transmitivity of the two filter portions, the light, which passes through the filter having a state, can be prevented from passing through the filter having the other state.

Figures 34, 35:
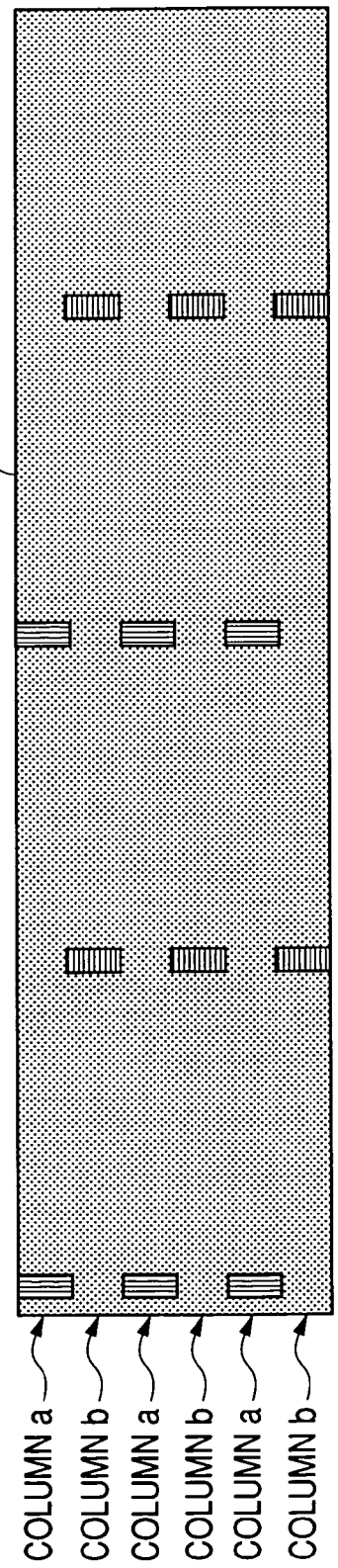
FIG. 34 is a connected front view of the image display means 1 and an optical selection filter array 7-4.
FIG. 35 is a connected front view of the horizontal directional control means 2 and an optical selection filter array 7-5.

FIG. 34 shows a view seen from front by connecting the image display means 1 and the light selection filter array 7-4. Further, FIG. 35 shows a view seen from front by connecting the horizontal directional control means 2 and the light selection filter array 7-5. There exist two types of horizontal pattern of the pixel, which is, here, classified into a column a and a column b. As evident from FIG. 33, the light from the column a transmits the aperture of the column a only by the light selection filter, and this is established regardless of a front incident or an oblique incident. Since the same thing holds true with the light from the pixel of the column b, according to the present embodiment, the column of the pixel and the column of the aperture are optically connected, thereby the generation of the crosstalk can be suppressed.

As the above described light selection filter arrays 7-4 and 7-5, it is preferable to use a deflecting plate. Further, the type of filter within the light selection filter array is not limited to two types, and in case of using a filter of n types (n is natural number), the pixel arrangement and the aperture array of n columns can be adopted. For example, the light selection filter array can be configured by using a filter of three primary colors RGB, thereby configuring the stereoscopic image display device using three column configuration of the image pattern and the aperture pattern.

Figure 36:
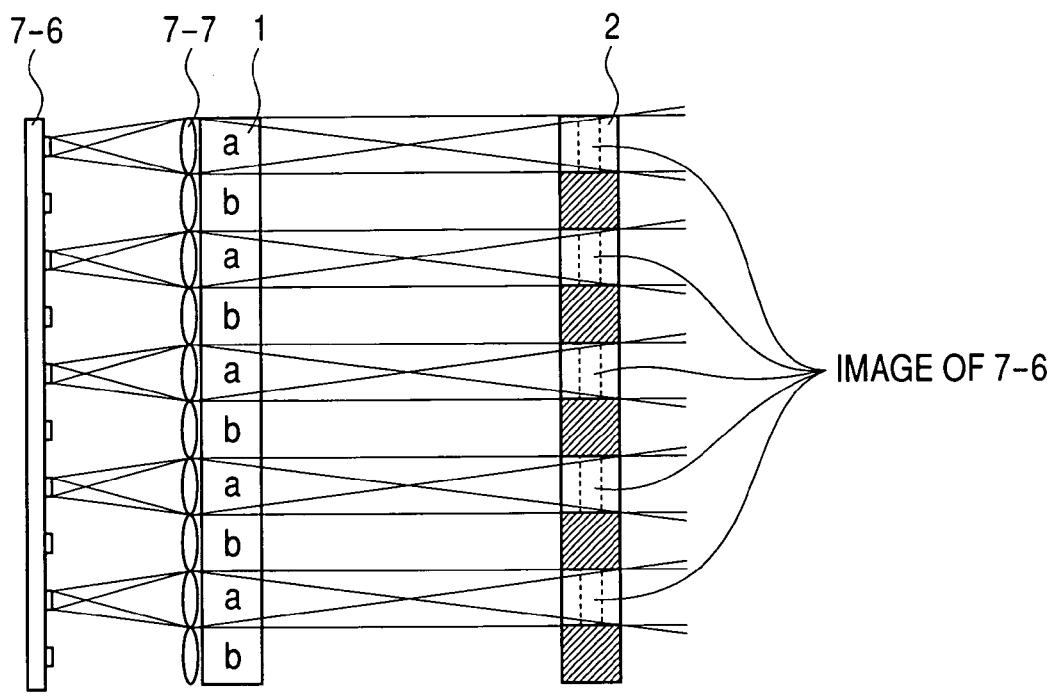
FIG. 36 is a view showing another example of the optical connecting means 7.

FIG. 36 is a view showing. another example of the optical connecting means 7. As shown in FIG. 36, even by using "directional image display light generating means" which gives a directivity to the image display light radiated from the image display means 1, the column of the pixel and the region on the horizontal directional control means 2 can be optically connected. FIG. 36 is a side view of the example where the present device is configured by using the directional image display light generating means. This configuration example is configured such that, by using the image display means 1 of transmission type, and by directivity of the illumination light for illuminating the image display means 1 from the back surface, the image display light passes through a desired region only on the horizontal directional control means 2.

In FIG. 36, the light emitted from a directional illumination light source array 7-6 has a strong directivity in the longitudinal direction in the drawing, and the light emitted from individual light sources independently enters each column of the pixel of the image display means 1. The illumination light independently entering each column is converged into a predetermined direction by the operation of the cylindrical lens array 7-7. Here, the position of the light source and the corresponding region on the horizontal directional control means 2 are in an optically conjugate relationship, and the light illuminating the pixel of each column surely passes through the corresponding region. Consequently, by the directional image display light generating means configured by the connection of the directional illumination light source array 7-6 and the cylindrical lens array 7-7, the column of the pixel and the predetermined region on the horizontal directional control means 2 are optically connected, thereby the generation of the crosstalk can be suppressed.

Figure 37:
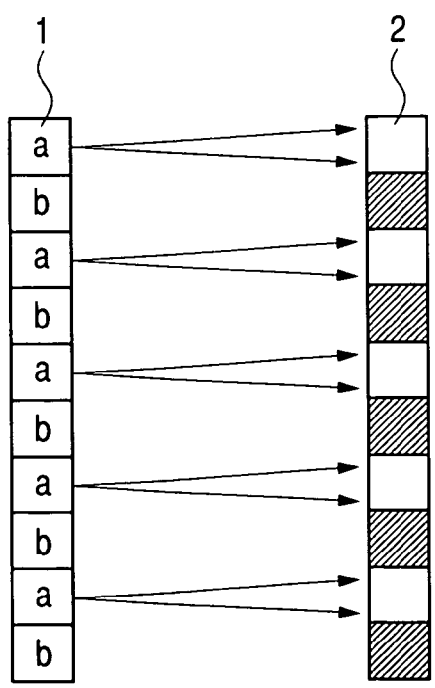
FIG. 37 is a view showing another example of the optical connecting means 7.

FIG. 37 is a view showing another example of the optical connecting means 7. As shown in FIG. 37, the optical connecting means same as FIG. 36 can be realized even by the configuration in which the directivity is given to the light radiated from the image display means 1 by itself. FIG. 37 is a side view of such a configuration example. The configuration is such that the light radiated from the pixel of the column a has strong directivity itself in the longitudinal direction in the drawing, and the light reaches the aperture only of the column a'. If the image display means 1 having such a characteristic is used, the column of the pixel and the column of the aperture are optically connected, thereby the generation of the crosstalk can be suppressed. For example, the above-described configuration can be realized in the case where the individual pixel is the light source having directivity in the radiation distribution such as a semiconductor laser or the like, or the optical element for generating the directivity of the display light is arranged in the vicinity of the pixel.

Figure 38:
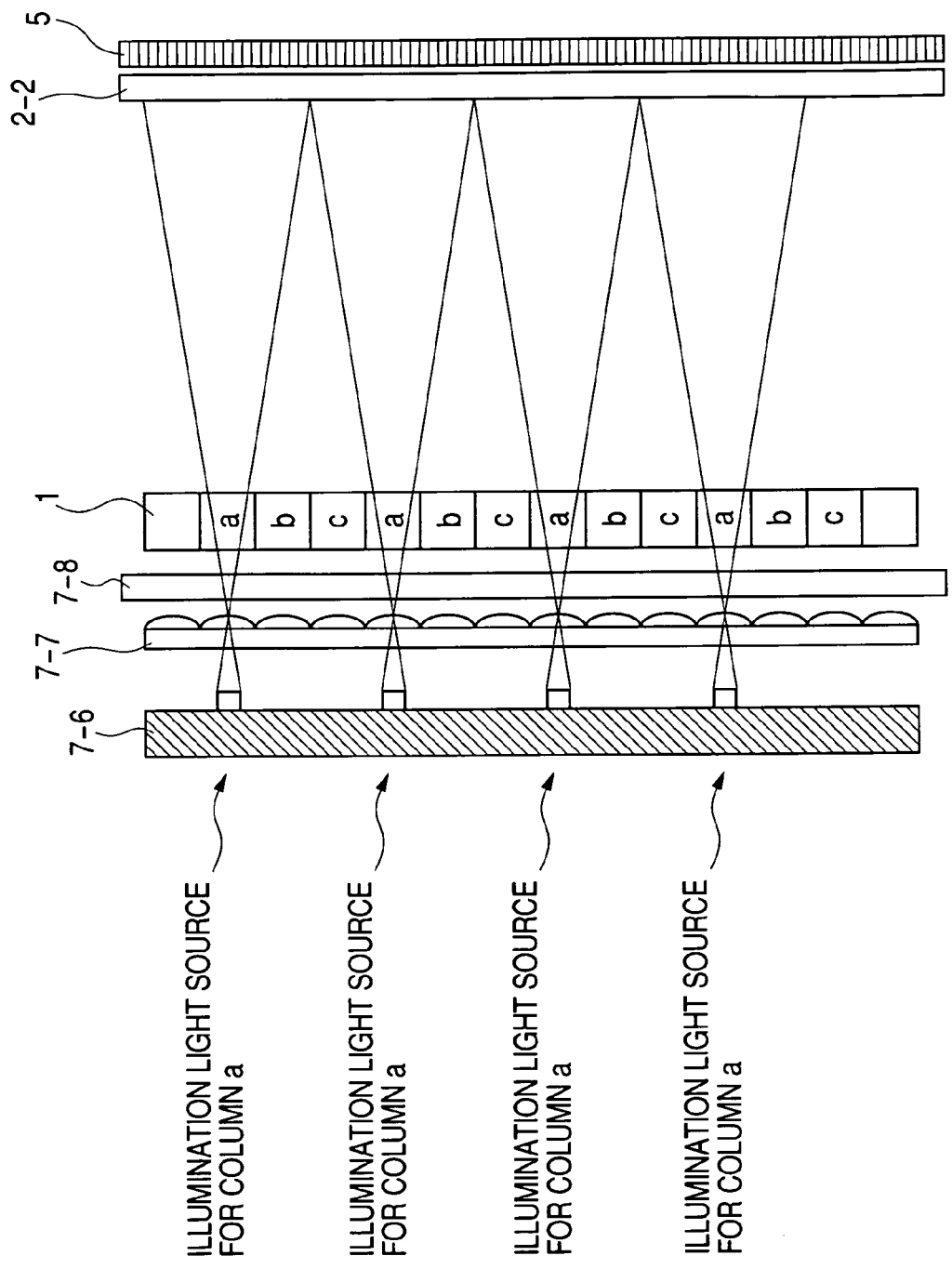
FIG. 38 is a side view of a device configuration example using directional image display light generating means.
Figure 39:
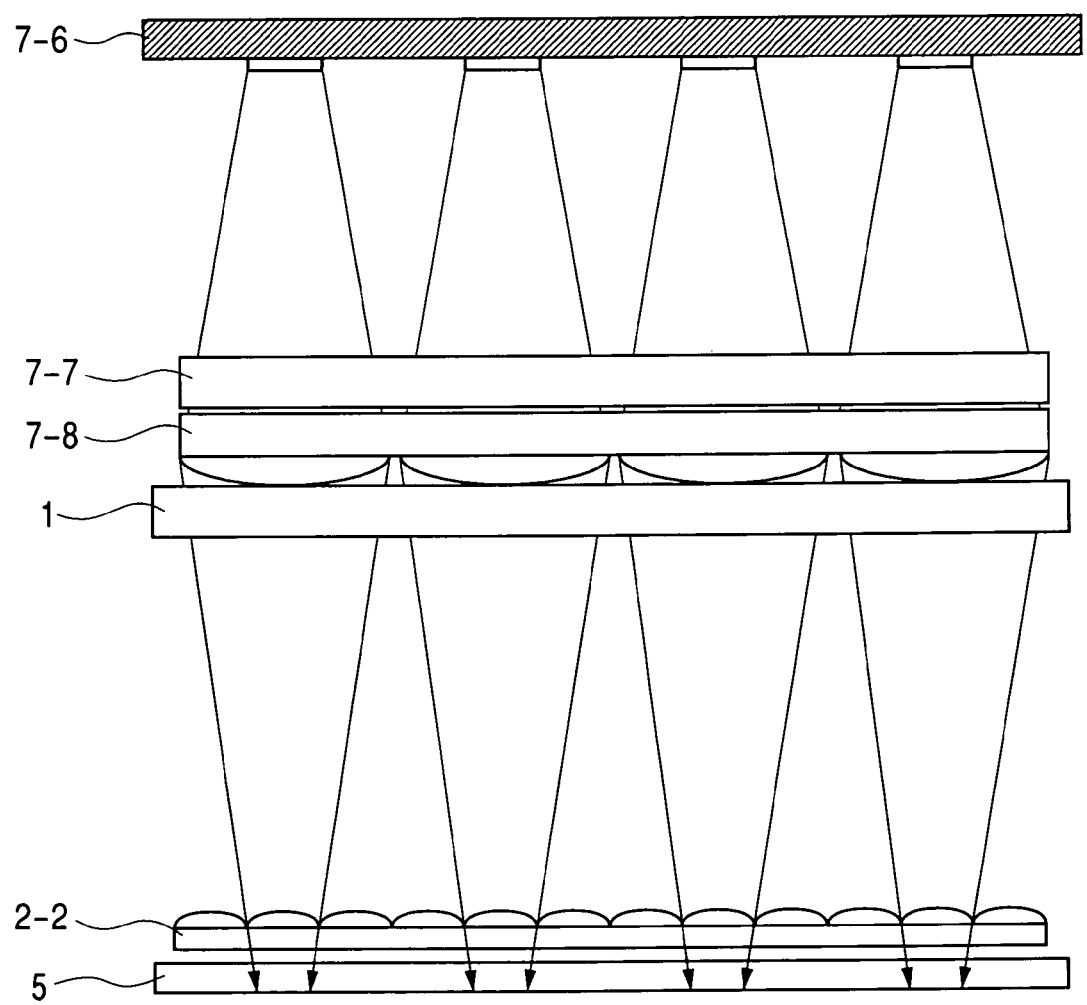
FIG. 39 a top view of the device configuration example using directional image display light generating means.

Now, if the directional image display light generating means is used, not only the above-described vertical optical connection, but also the horizontal optical connection can be realized. For example, it is possible to allow the directional image display light generating means to play a role of limiting the transmission region of the horizontal directional control means 2 as the mask 2-3 in FIG. 16. Further, by utilizing a characteristic of vertical optical connection, it is also possible to allow the directional image display light generating means to play a role of the longitudinal enlarging means 3. FIG. 38 is a side view of the device configuration example using the directional image display light generating means, which has these functions together, and FIG. 39 is its top view. Reference numeral 7-6 denotes the directional illumination light source array, 7-7 the cylindrical lens array for controlling the vertical directivity of the illumination light, and 7-8 the cylindrical lens array for controlling the horizontal directivity of the illumination light. The configuration of the horizontal directional control means 2 consists of the cylindrical lens array 2-2 only in which the direction of the meridian axis is vertical, in the vicinity of which a longitudinal diffusion plate 5 is disposed.

First, the behavior of a vertical component of the light will be described with reference to FIG. 38. Similarly to the configuration of FIG. 36, the light from the individual light source of the directional illumination light source array 7-6 independently illuminates each column of the pixel. The present configuration has, furthermore, an optical configuration so that the cylindrical lens array 7-7 enlarges and projects the individual light on the cylindrical lens array 2-2, and if the optical configuration is connected with the longitudinal diffusion plate 5, the observer can observe the pixel, of which the apparent height is enlarged. That is, by the directional illumination means configured by the connection of the directional illumination light source array 7-6 and the cylindrical lens array 7-7, it is possible to bear the role of the longitudinal enlarging means 3.

Next, the behavior of the horizontal component of the light will be described with reference to FIG. 39. The light source surface of the directional illumination light source array 7-6 and the cylindrical lens array 2-2 are in an optically conjugate relationship by the cylindrical lens 7-8. Particularly, the present configuration is configured such that the horizontal width of the image of the individual light source of the directional illumination light source array 7-6 formed on the cylindrical lens array 2-2 becomes equal to the width of the individual cylindrical lens of the cylindrical lens array 2-2, and moreover, these images are all formed so as to be collected into the region of a cylindrical lens, and therefore, the individual light source and the individual-element lens of the cylindrical lens array 2-2 are in an optically coupled state. Consequently, if the position of the light source is horizontally moved, it is possible to control which element lens of the cylindrical lens array 2-2 the image display light passes through.

Figure 40:
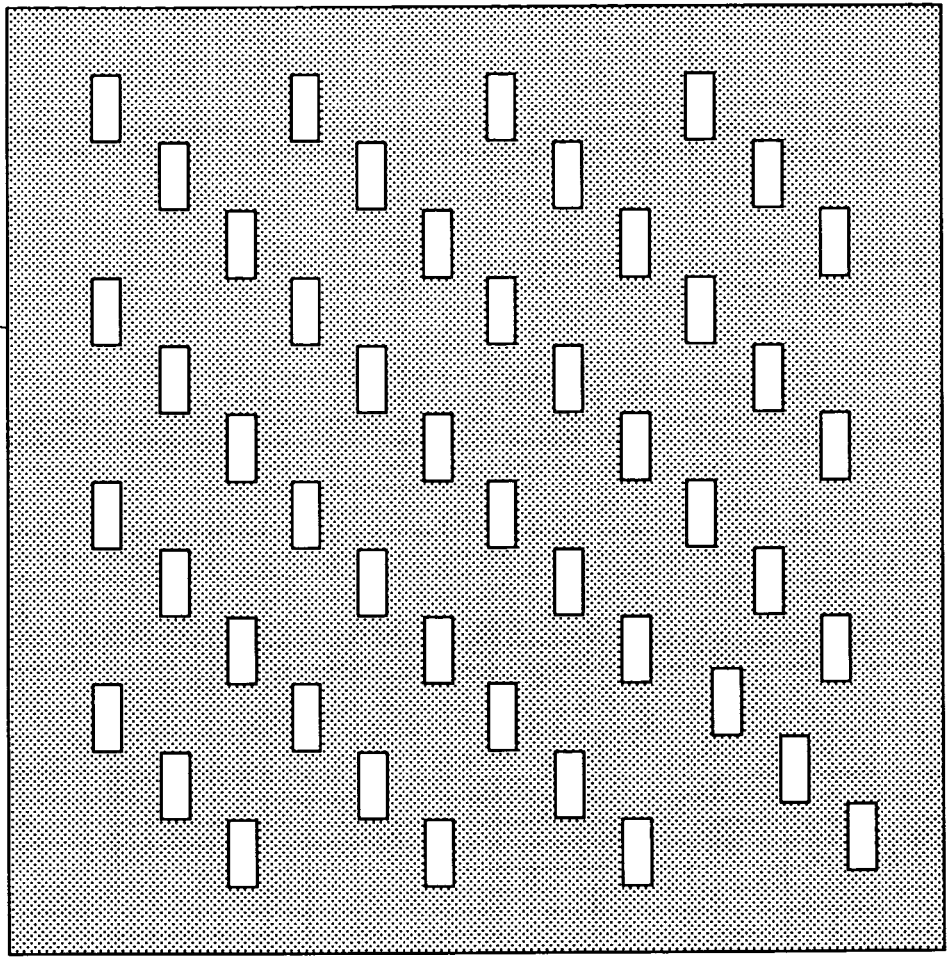
FIG. 40 is a front view of a directional illumination light source array.

FIG. 40 is a top view of the directional illumination light source array. If the directional illumination light source array shown in FIG. 40 is used, the light from the columns a to c can be all led independently to the corresponding cylindrical lens.

Figure 41:
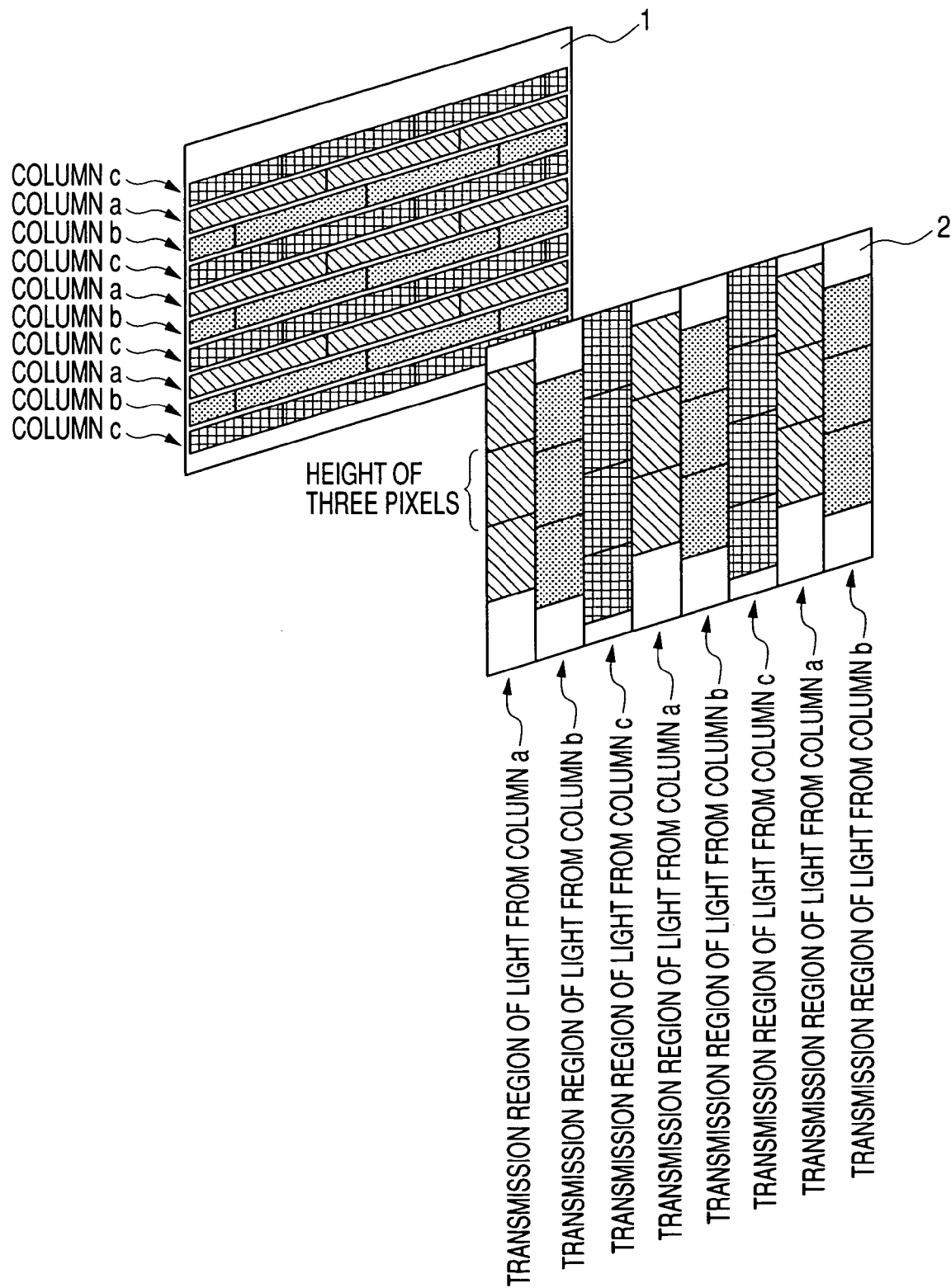
FIG. 41 is a view showing the behavior of the light in both vertical and horizontal directions in the device configuration example using the directional image display light generating means.

FIG. 41 is a drawing summing up the vertical and horizontal behaviors of the light described above. While the pixels of the image display means 1 are divided into three columns a to c depending on the longitudinal position, the image display light radiated from these three columns is converged and transmitted independently into the three divided regions, respectively, depending on its horizontal position. At this time, on the horizontal directional control means 2, the height of the projecting region of the image display light is enlarged by three times the original pixel height, and moreover, since the longitudinal diffusion plate 5 is arranged in the vicinity of the horizontal directional control means 2, the observer can observe the pixel, of which the apparent height is enlarged three times.

On the other hand, a horizontal optical connecting effect strictly connects the region on the image display means 1 and the region on the horizontal directional control means 2, and does not hinder the directional control of the horizontal directional control means 2. The horizontal component of the emitting direction of the light after having passed through a predetermined region of the horizontal directional control means, as shown. previously in FIGS. 8 and 18, is strictly and uniquely defined depending on the horizontal position of the pixel on the image display means 1, and therefore, it is possible to set up a configuration such that a desired parallax image can be observed from a desired visual point by considering which parallax image information is stored in which pixel. Consequently, according to the above-described configuration, the stereoscopic image display device having few crosstalk with the reduction of the image quality inconspicuous can be realized.

Figure 42:
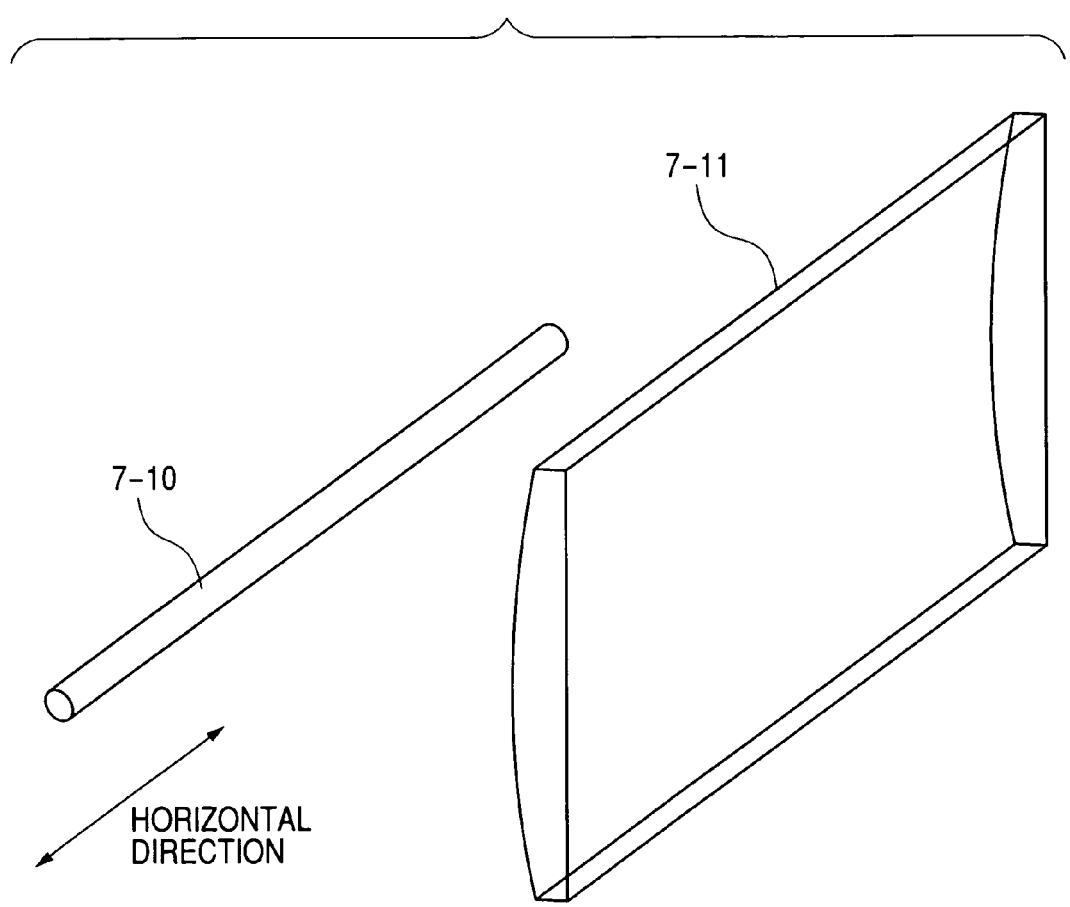
FIG. 42 is a view showing another example of directional illuminating means.

While the above-described FIGS. 36 to 40 use the light source array 7-6 to configure a desired directional illumination, even by using other methods, the directional illumination can be realized. FIG. 42 is an example of another direction illumination means. For example, by a connection of a linear light source 7-10 which is horizontally long as shown in FIG. 42 and a cylindrical lens 7-11 having an optical power only longitudinally, directional illumination means 7-9 capable of generating one dimensional collimate light of which the vertical component is parallel can be configured. By using this, the present invention can be carried out.

Figure 43:
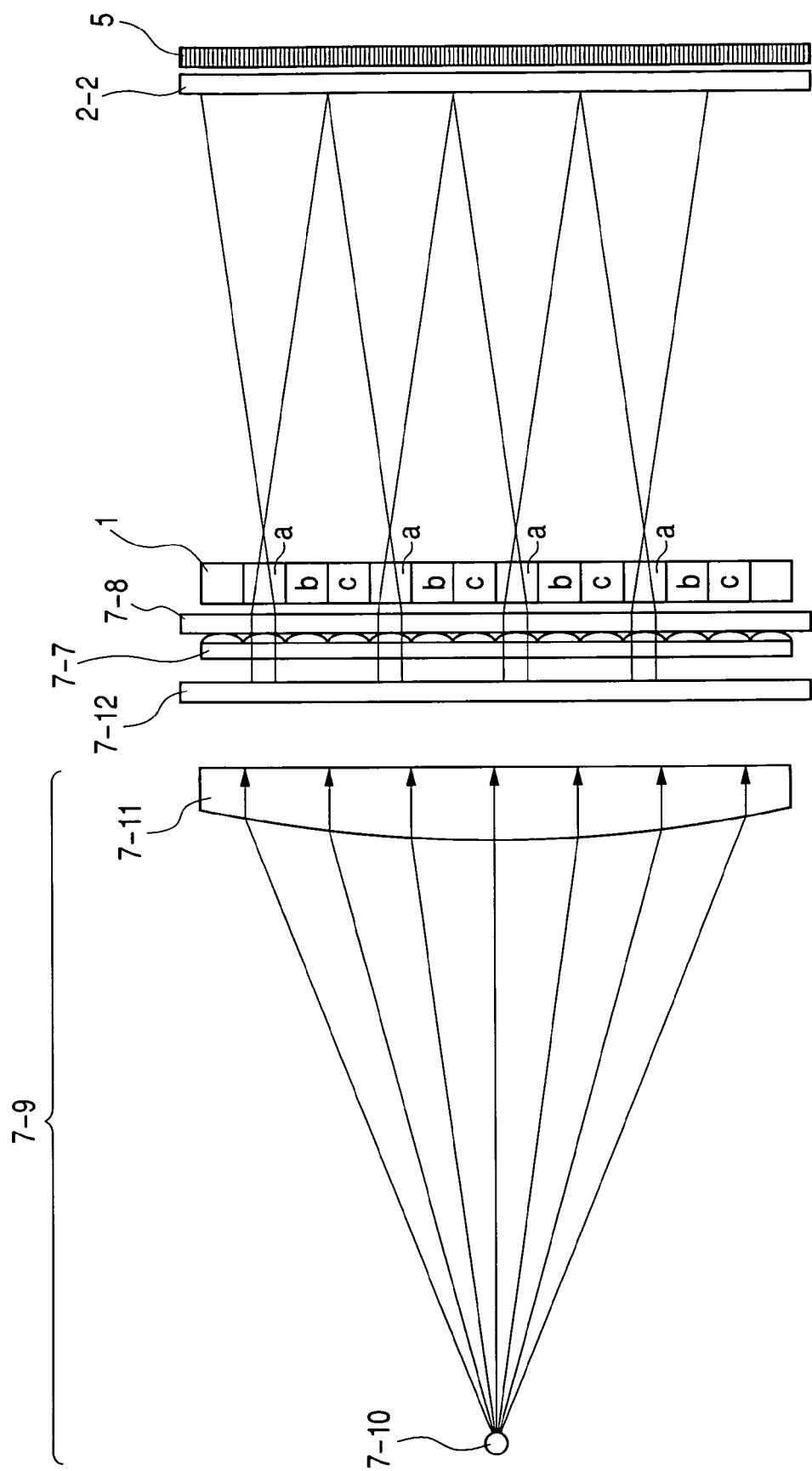
FIG. 43 is an explanatory drawing in case of configuring the stereoscopic image display device.

FIG. 43 is an explanatory drawing in case of configuring the stereoscopic image display device by using the directional illumination means 7-9. As shown in FIG. 43 (side view), the linear light source 7-10 is disposed at a focal position of the cylindrical lens 7-11, and the divergent light from the linear light source 7-10 is converted so that the vertical component of the light is parallel beam. At this time, since the horizontal component of the light is not optically operated, the characteristic of the divergent light is maintained.

Figure 44:
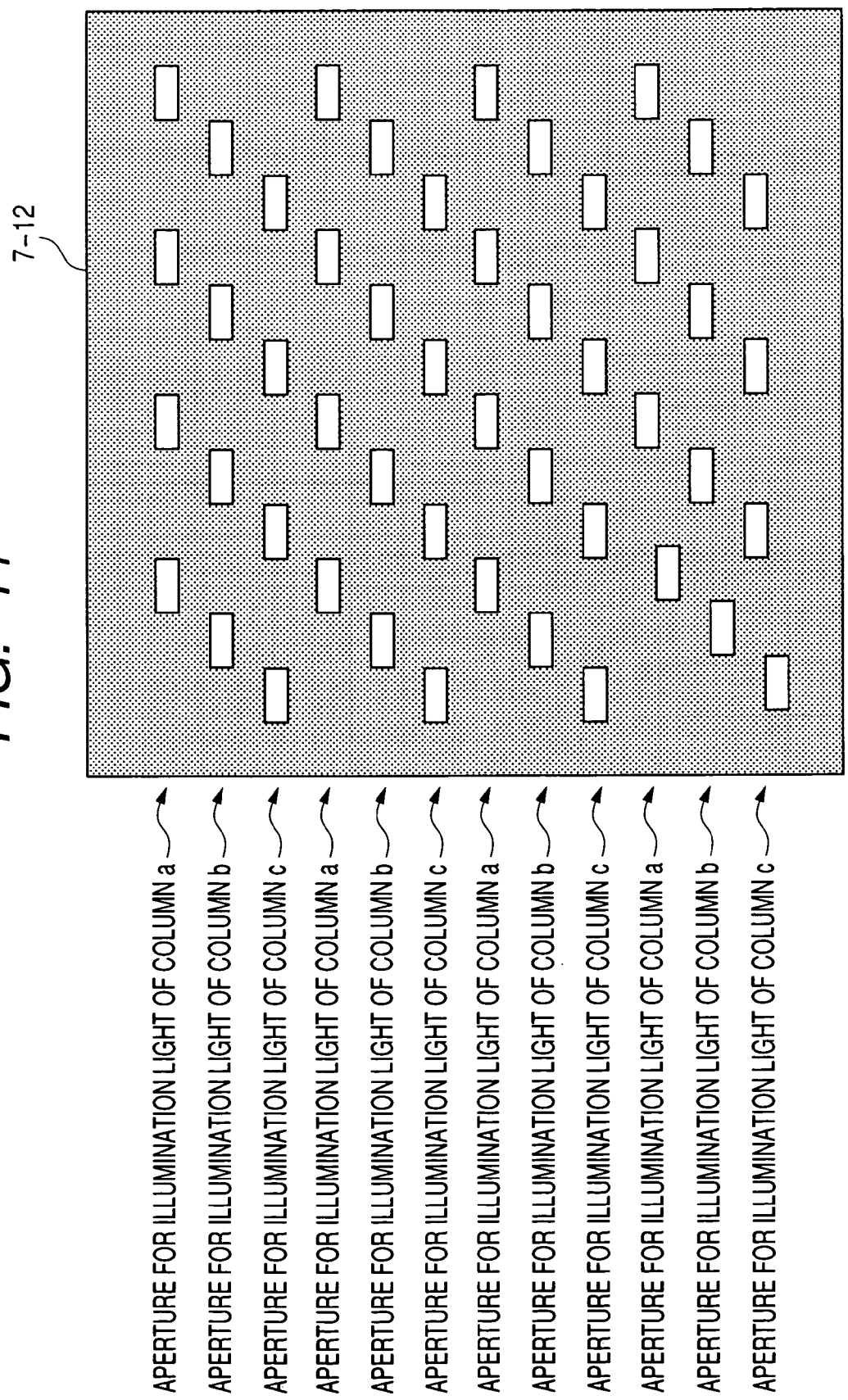
FIG. 44 is a view showing an aperture plate used in the stereoscopic image display device configured by using the directional illuminating means.
Figure 45:
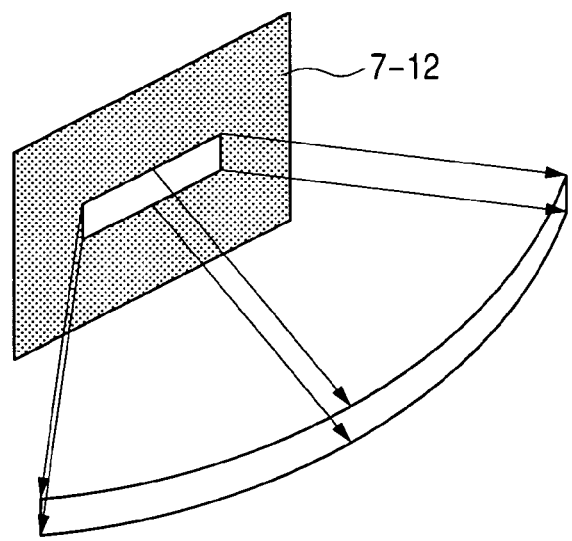
FIG. 45 is a view showing a state of the light diverging by passing through an aperture of the aperture plate.

FIG. 44 shows an aperture plate 7-12 used in the stereoscopic image display device of the configuration of FIG. 43. Further, FIG. 45 shows a state of the light, which passes and diverges through the aperture of the aperture plate 7-12. The aperture plate 7-12 where the apertures are arranged as with FIG. 44 is disposed in the optical path of one-dimensional collimate light in which the vertical component of the divergent light from the linear light source 7-10 is converted to a parallel beam. At this time, the light outgoing from each aperture on the aperture plate 7-12 as shown in FIG. 45, has the characteristic of the collimated light in its vertical component and the divergent light in its horizontal component as above-described characteristic of the light. This shows that it operates exactly same as the light source array 7-6 in FIGS. 38 and 39. That is, as shown in FIG. 43, by illuminating the image display means 1 by the connection of the aperture plate 7-12 and the cylindrical lens array 7-7, the operation such as an independent illumination of a desired image region and the enlargement of the apparent height of the pixel can be generated.

Figure 46:
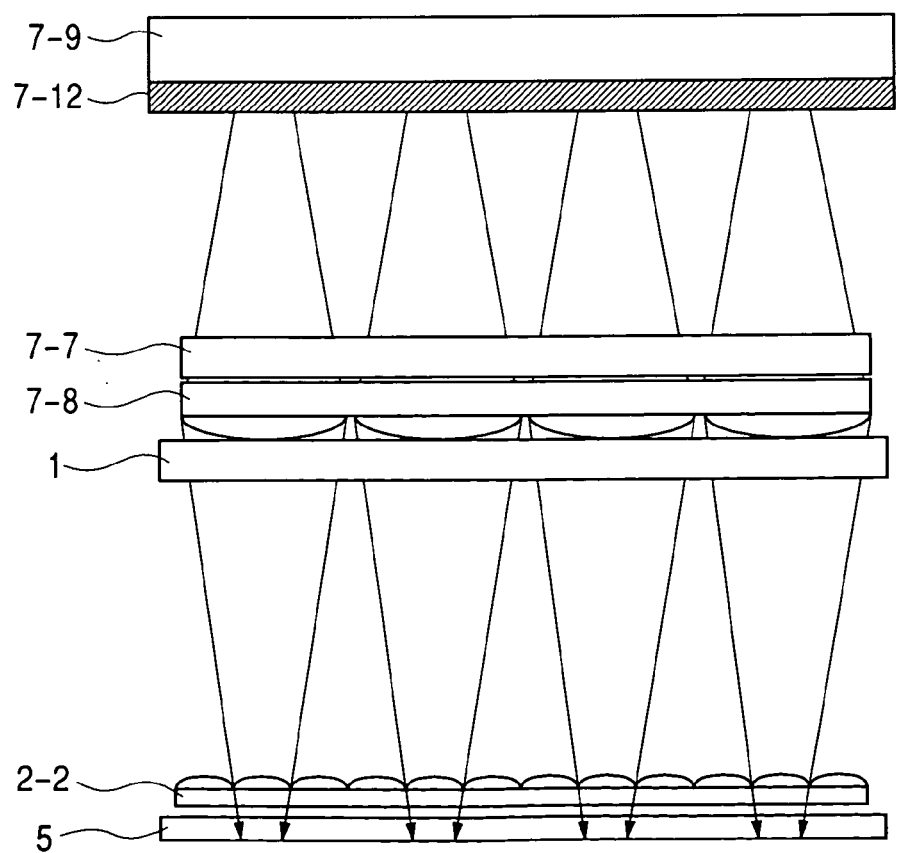
FIG. 46 is a view showing the configuration of the stereoscopic image display device using the cylindrical lens.

FIG. 46 shows a configuration of the stereoscopic image display device using also a cylindrical lens 7-8. As shown in FIG. 46, even a directivity, which allows the light from a desired image region to restrictively enter a desired region on the horizontal directional control means 2 (here, a cylindrical lens-array 2-2), can be generated by using the aperture plate 7-12 in connection with the cylindrical lens 7-8. In this way, by using the directional illumination means 7-9 of the configuration as described above, the stereoscopic image display of the present invention can be executed.

Figure 47:
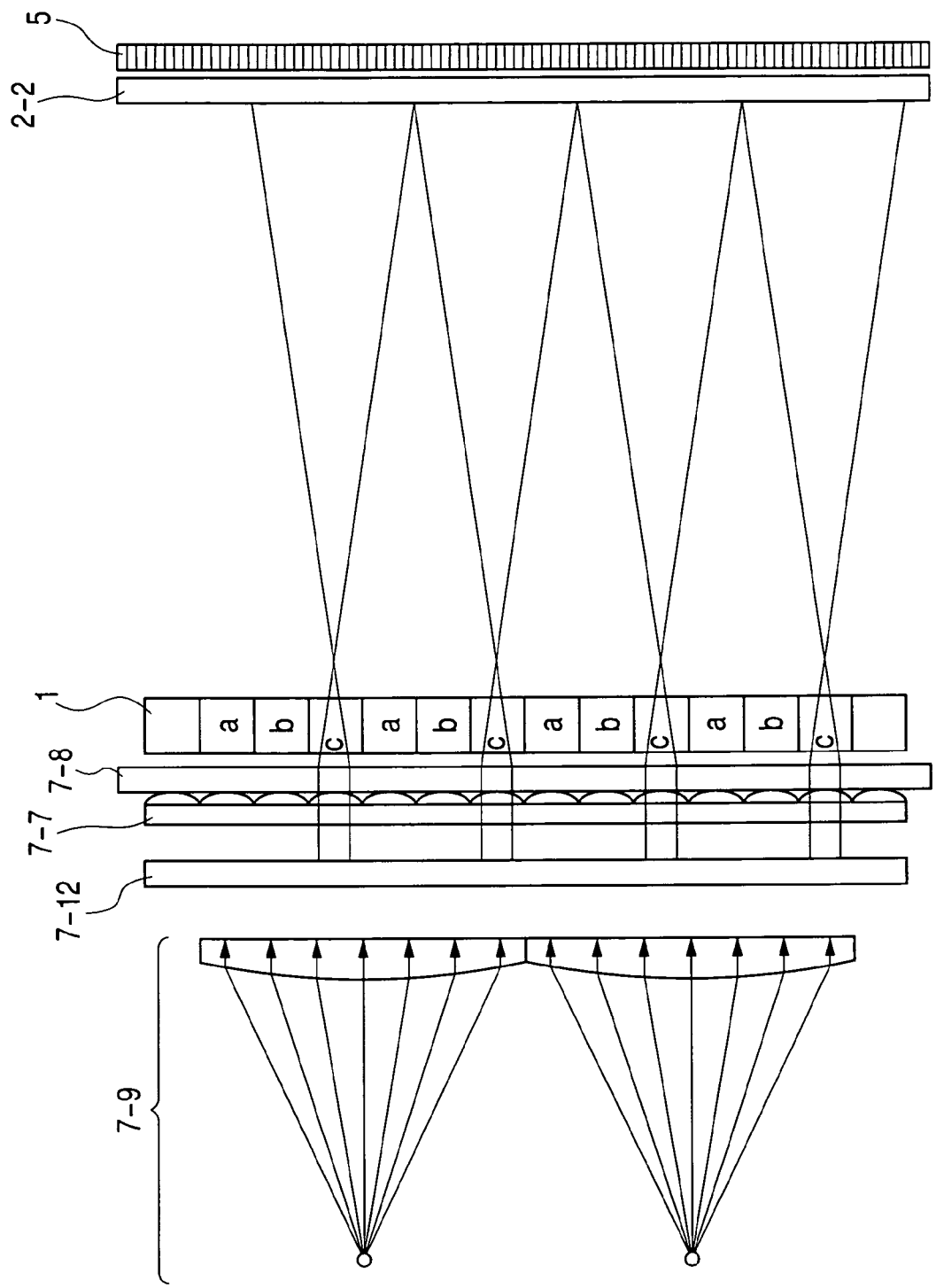
FIG. 47 is a view showing one example of the configuration of the stereoscopic image display device using a plurality of directional illuminating means.

When the directional illumination means 7-9 is configured by a single linear light source 7-10 and the simple cylindrical lens 7-11, a large diameter of the cylindrical lens and a long depth of the device are invited. However, when the configuration is such that the image display means 1 is divisionally illuminated by a plurality of directional illumination means 7-9 as shown in FIG. 47, the diameter of the cylindrical lens and the device depth can be suppressed. Here, FIG. 47 shows one example of the configuration of the stereoscopic image display device using a plurality of directional illumination means 7-9. The cylindrical lens 7-11 needs a diameter-large enough to cover the whole image display means 1, and to obtain such a large diameter lens at lower cost, it is possible also to use a linear Fresnel lens as the cylindrical lens 7-11.

Figure 48:
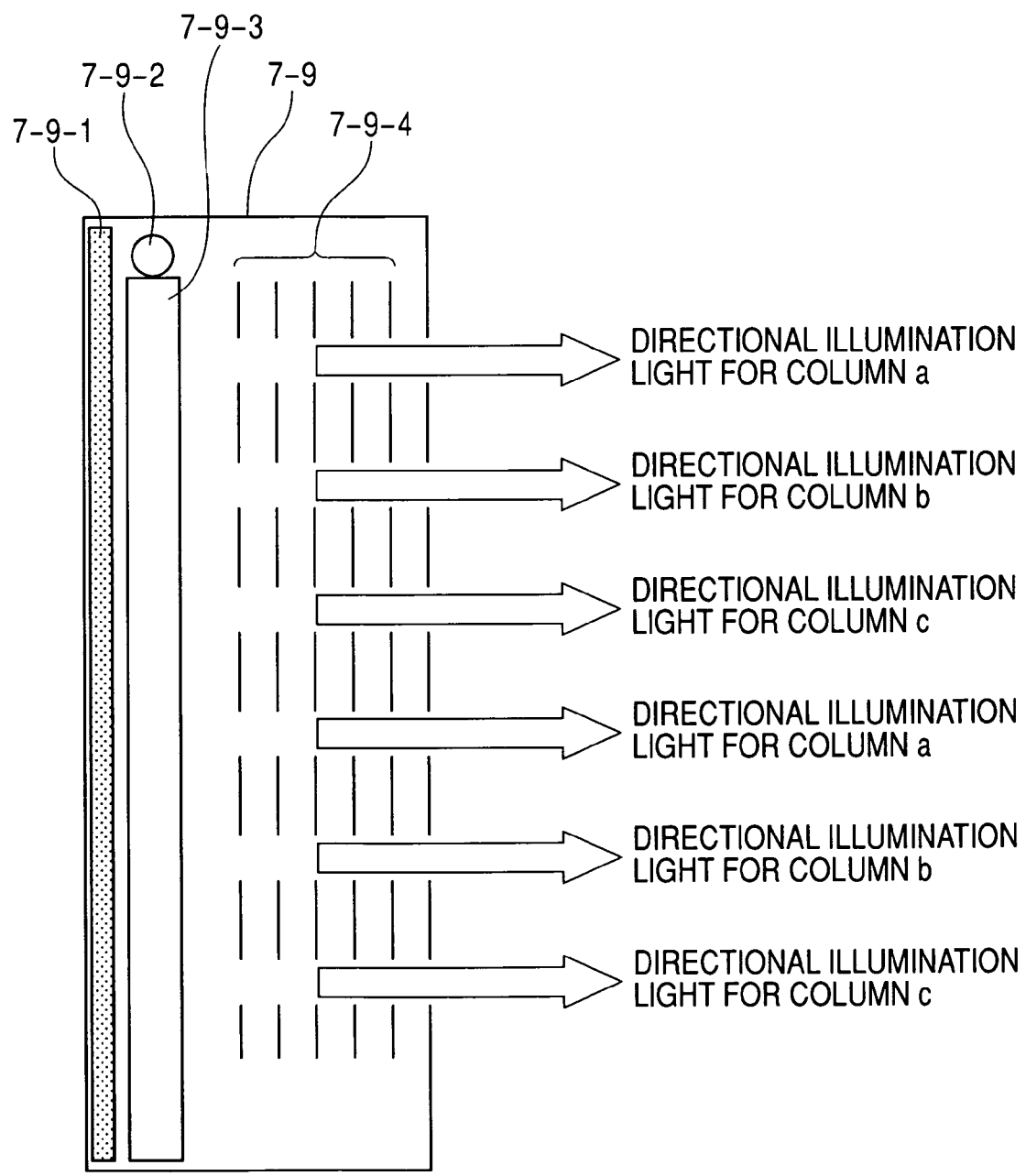
FIG. 48 is a view showing another configuration example (side view) of the directional illuminating means.
Figure 49:
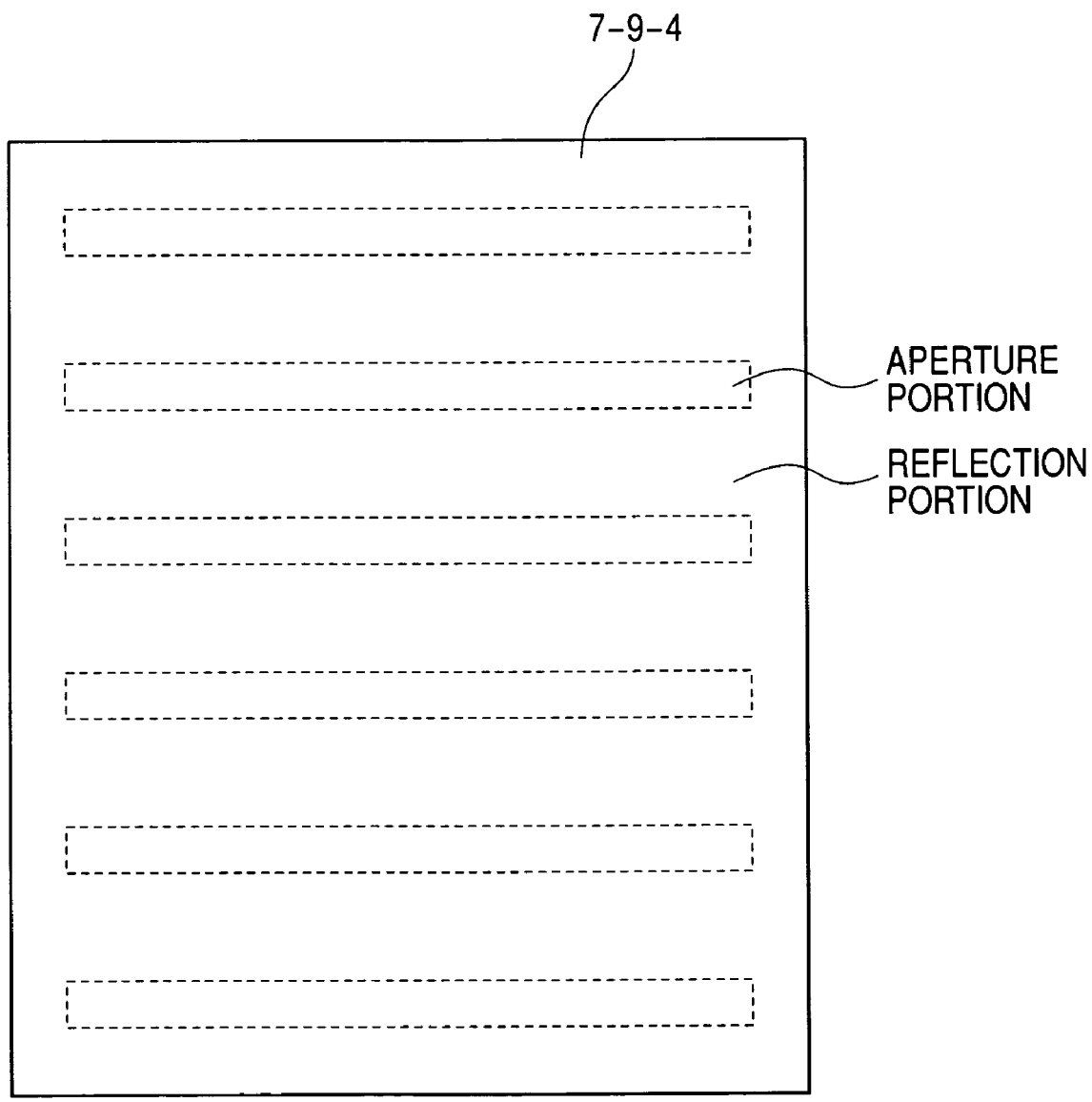
FIG. 49 is a front view of a reflecting plate configuring the directional illuminating means.

Further, it is possible also to make the above-described directional illumination means 7-9 much thinner by another method. FIG. 48 is a configuration example (side view) of the thin-made directional illumination means 7-9. Reference numeral 7-9-1 denotes a reflecting diffusion plate, 7-9-2-a horizontally long linear light source, 7-9-3 a light guide plate, and 7-9-4 a reflecting plate aggregation. FIG. 49 is a front view of the reflecting plate aggregation 7-9-4. As shown in FIG. 49 (front view), the individual reflecting plate of the reflecting plate aggregation 7-9-4 has a plurality of horizontally elongated apertures lined up in longitudinal direction, and the portions other than the apertures are all the reflecting surfaces. The reflecting plate aggregation 7-9-4 forms an aggregation in which the above-described reflecting plates are superposed and lined up in a plurality. Further, inner wall surfaces of the housing of the directional illumination means 7-9 are all the reflecting surfaces. The light radiated from the linear light source 7-9-2 is multi-reflected within the light guide plate 7-9-3, a part of which enters the reflecting diffuser 7-9-1 and becomes a diffused light, and the remainder of which travels toward the reflecting plate aggregation 7-9-4. The longitudinal position of the aperture of each reflecting plate of the reflecting plate aggregation. 7-9-4 is aligned so as to be all in the same height, and is spaced apart at appropriate intervals. Consequently, the light which obliquely enters the aperture is reflected by another reflecting plate, and the light (light of which the vertical component is a parallel beam) alone which vertically enters the aperture all passes through the aperture of the reflecting plate and outgoes toward the observer side. On the other hand, the light reflected by the reflecting plate repeats the reflection on another reflecting plate, the inner wall surfaces of the housing of the directional illumination means 7-9, and the like, and enters on the reflecting diffuser and diverges, and enters the aperture again at another angle. Such operations are repeated until the light passes through all the apertures of the reflecting plate aggregation 7-9-4 and outgoes, and therefore, a loss of light is few in this directional illumination means 7-9, and this becomes the illumination means having high usage efficiency of light. The light outgoing from the directional illumination means 7-9 has the characteristics necessary to execute the present invention in that the vertical component thereof is a collimated light and the horizontal component is a divergent light, and it is possible to configure the same stereoscopic image display device if the same parts as those of other embodiments described up to here are assembled.

Figure 50:
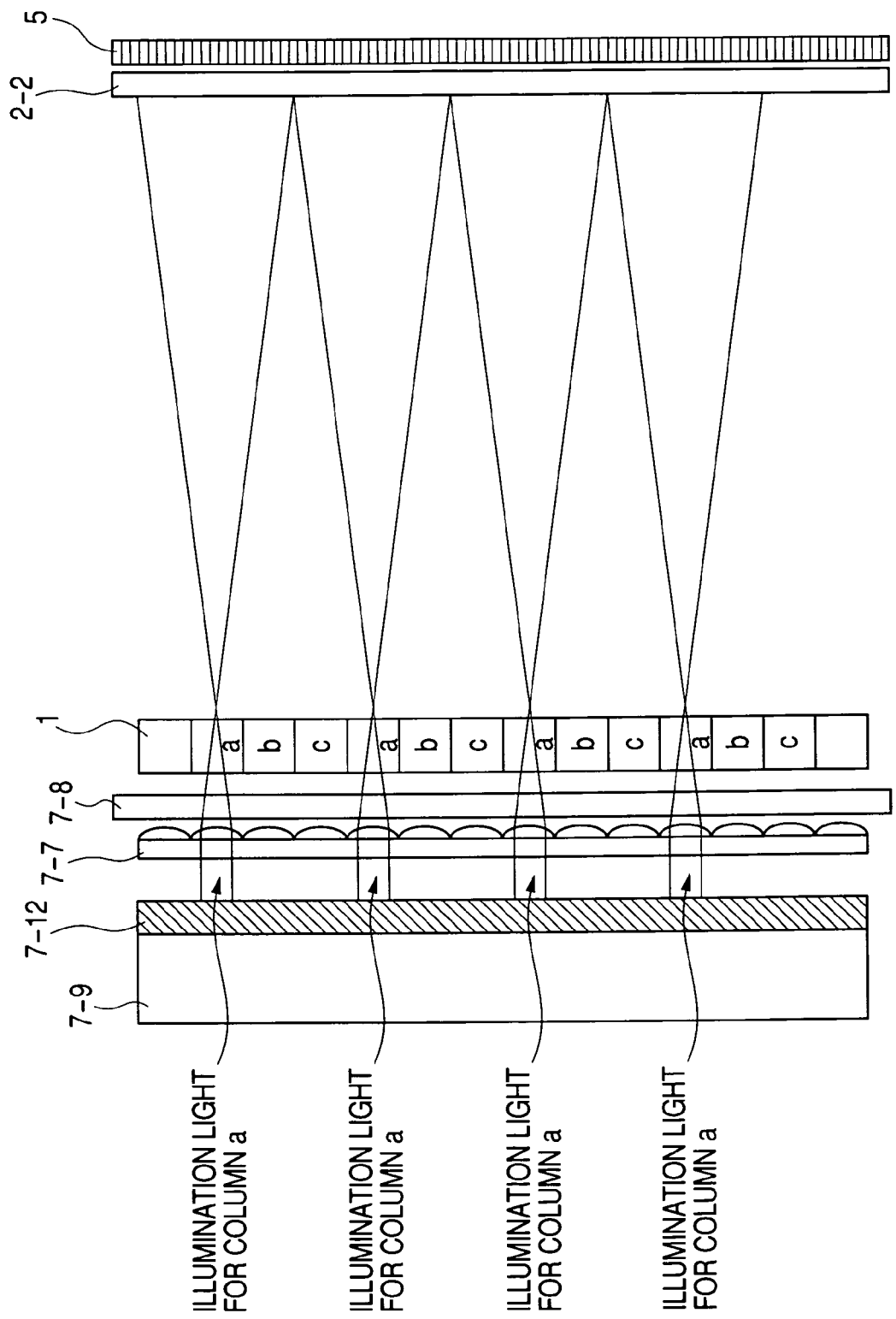
FIG. 50 is a view showing the embodiment (side view) of the present invention using the directional illuminating means.

FIG. 50 shows an embodiment (side view) of the present invention using the thin-made directional illumination means 7-9. Compared to FIG. 43, it is clear that the depth dimension of the device can be made small.

Figure 51:
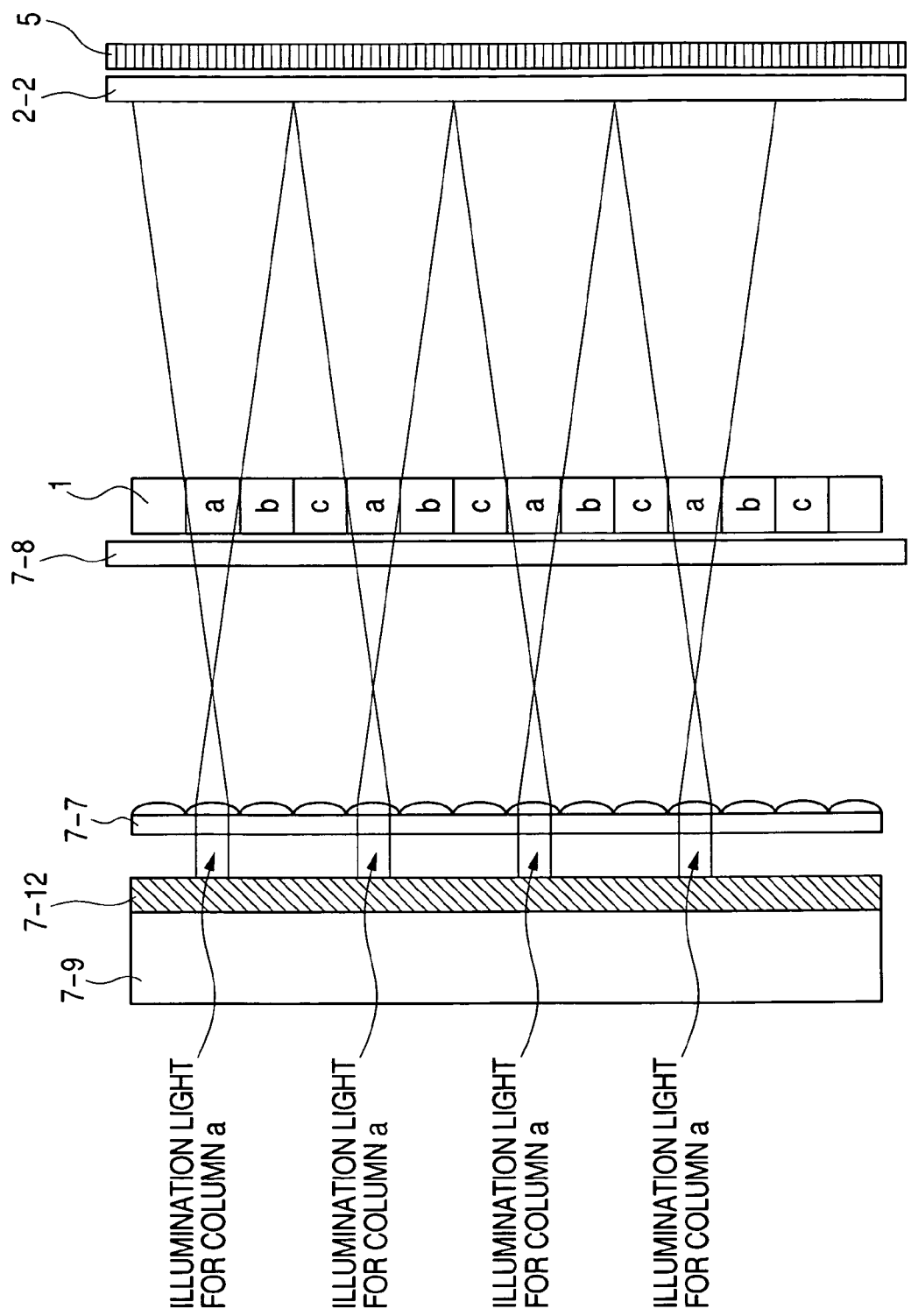
FIG. 51 is a view showing another embodiment (side view) of the present invention using the directional illuminating means.

In the configuration such as FIG. 50, there are some cases where the height of the light, which illuminates each column of the image display means 1, cannot be sufficiently obtained because the vertical component of the light which passes through the cylindrical lens array 7-7 ends up converging before reaching the image display means 1. Hence, as shown in FIG. 51, the image display means 1 is disposed at such a position that the vertical component of the illumination light for each column once converges and diverges again so that the whole height of each column is illuminated, thereby solving the above-described problem. This contrivance is not limited to the thin-made directional illumination means 7-9, but can be also adapted to the embodiments using other directional illumination means.

Figure 52:
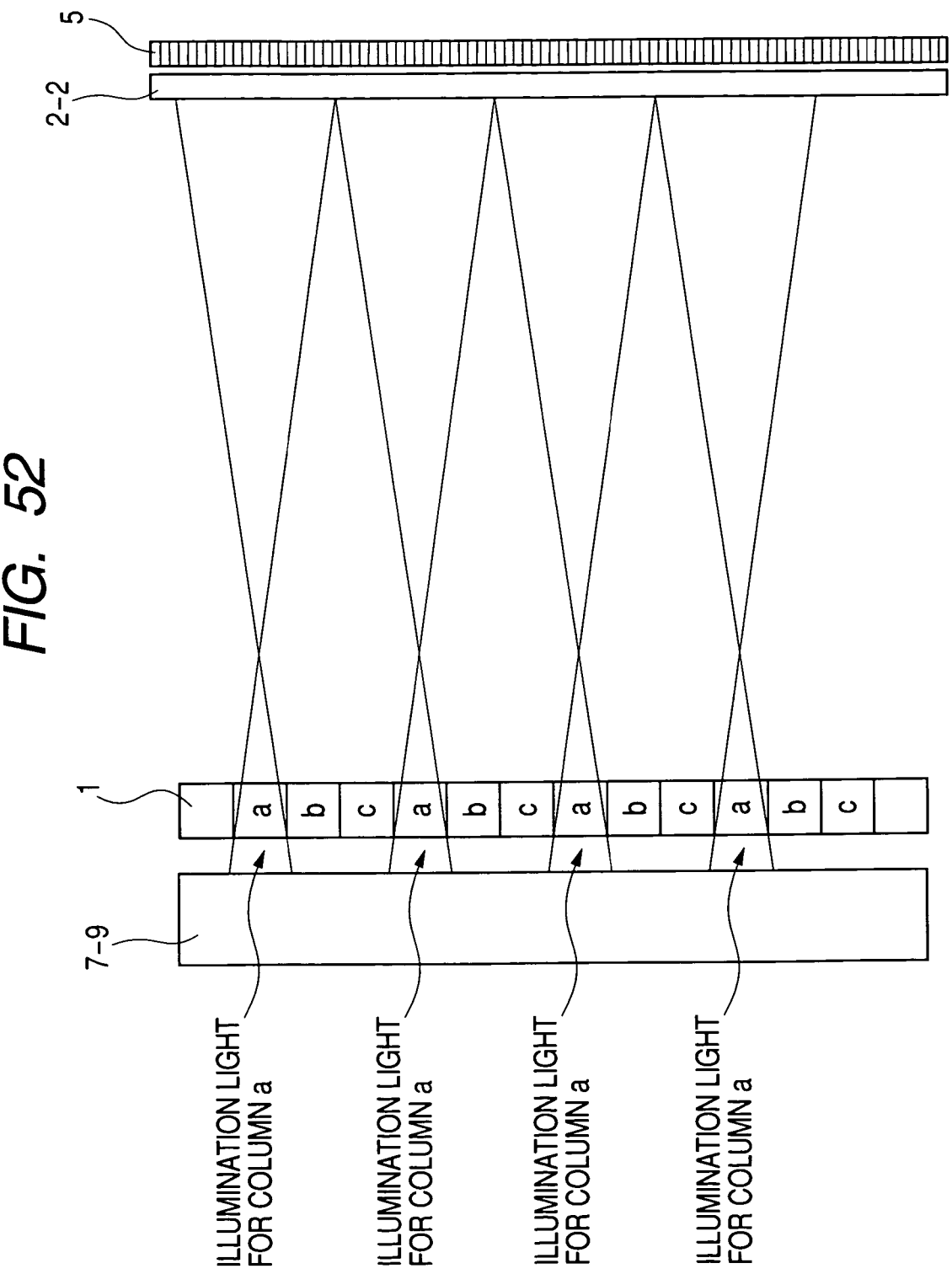
FIG. 52 is a side view showing still another embodiment of the present invention using the directional illuminating means.
Figure 53:
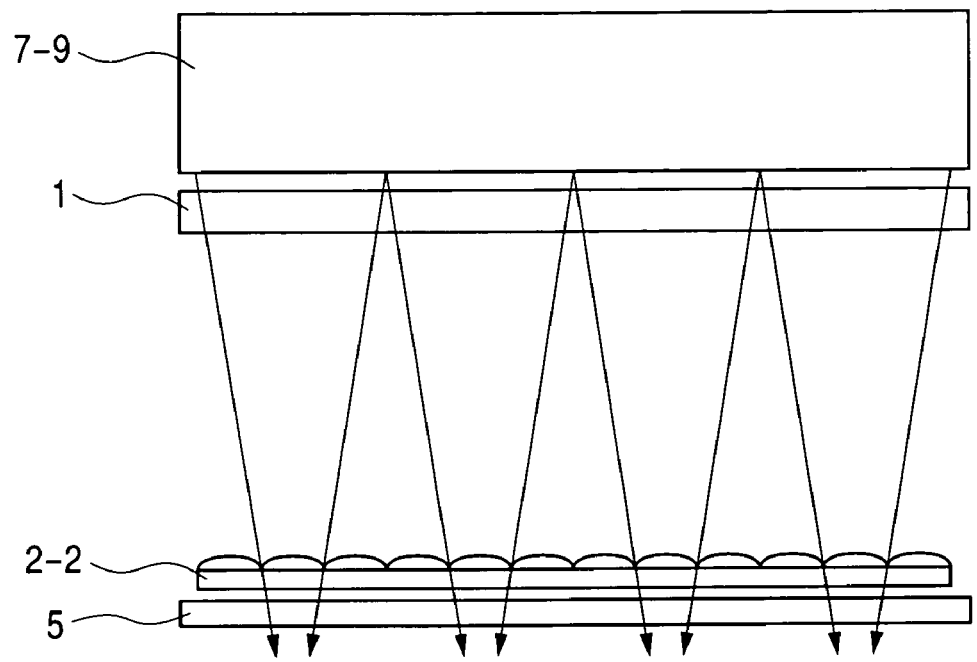
FIG. 53 is a top view of still another embodiment of the present invention using the directional illuminating means.

Further, when configuring the thin-made directional illumination means 7-9, it can be made as a display device having a few components as shown in FIG. 52 (side view) and FIG. 53 (top view) by assembling and integrating all other optical parts (the aperture plate 7-12, the cylindrical lenses 7-7 and 7-8), which control the directivity of the light, into the directional illumination means 7-9. In the case of this configuration, as shown in FIG. 41, the light having directivity to a desired region on the horizontal directional control means 2 from a desired region on the image display means 1 can be generated only by this directional illumination means 7-9, thereby achieving the effect to make the adjustment and the assembly of the device easy.

In the configuration of FIGS. 36 to 40 and 42 to 53, directivity is given to the image display light by elaboration of the illumination system and the like, thereby realizing the optical connecting as shown in FIG. 41. However, such an optical connecting means is not limited to an illumination optical system.

Fourth Embodiment

The present embodiment improves the stereoscopic image display device according to the above-described embodiment, and an embodiment for configuring a stereoscopic image display device having a better performance will be described.

As shown in FIG. 41, if there is a special optical element which optically connects a long horizontal region on the image display means 1 and a long vertical region on the horizontal directional control means 2, by using this element, the present invention can be executed simpler. As such a special optical element, a holographic can be cited.

Figure 54:
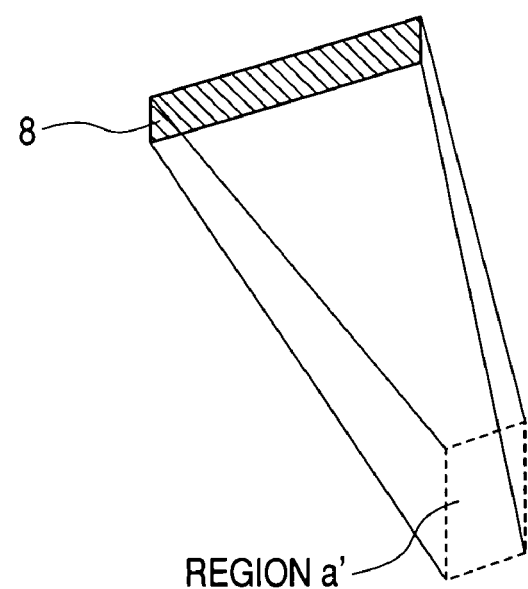
FIG. 54 is a view explaining the effect of the optical connecting means using a holographic optical element according to a fourth embodiment.

FIGS. 54 to 57 are explanatory drawings of a configuration using a holographic optical element 8 as the optical connecting means. To make the explanation easy, the following drawings all describe only the light from the pixel of the column a, however, with respect to the pixel of other columns, it is only natural that the holographic optical element 8 is similarly used. The holographic optical element 8 has the same size as the horizontal unit pattern (here, it is a series of pixel group consisting of 12 pixels equivalent to the visual point number 1 to 12), and is arranged in the vicinity of these pixel groups. The light passing through the holographic optical element 8, as shown in FIG. 54, is controlled in such a manner as to pass through a predetermined region of the space. In the case of the present configuration, since it is its object to optically connect the column a of the pixel and the region for the column a on the horizontal directional control means 2, the holographic optical element 8 is configured such that all the lights radiated from the column a pass through the region for the column a on the horizontal directional control means 2.

Figure 55:
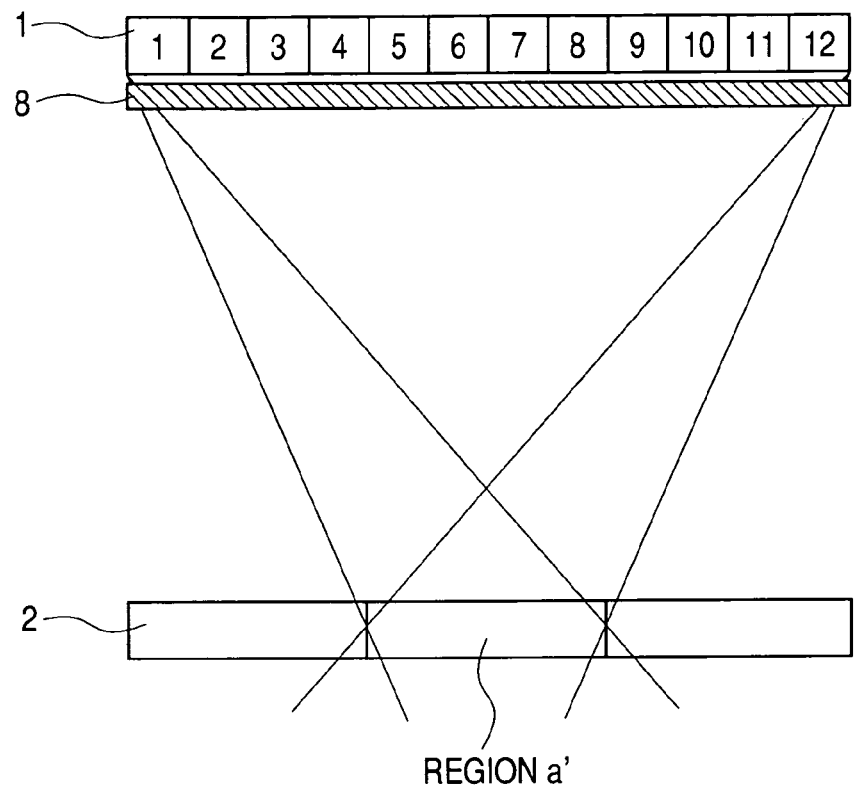
FIG. 55 is a top view explaining the optical path in case of using the holographic optical element as the optical connecting means.
Figure 56:
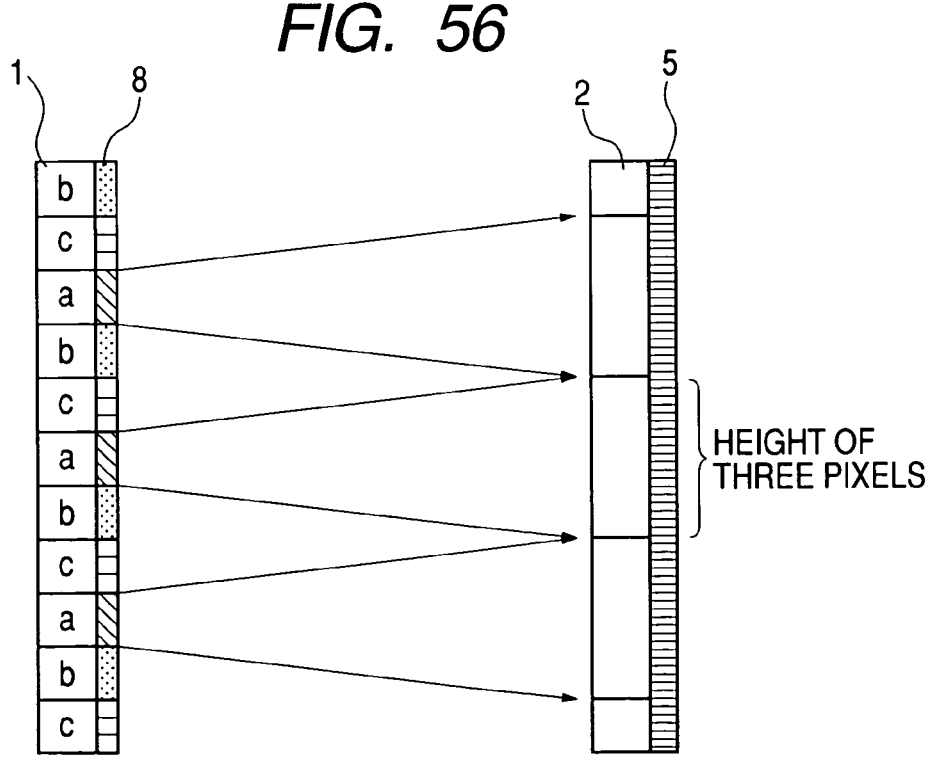
FIG. 56 is a top view explaining the optical path in case of using the holographic optical element as the optical connecting means.
Figure 57:
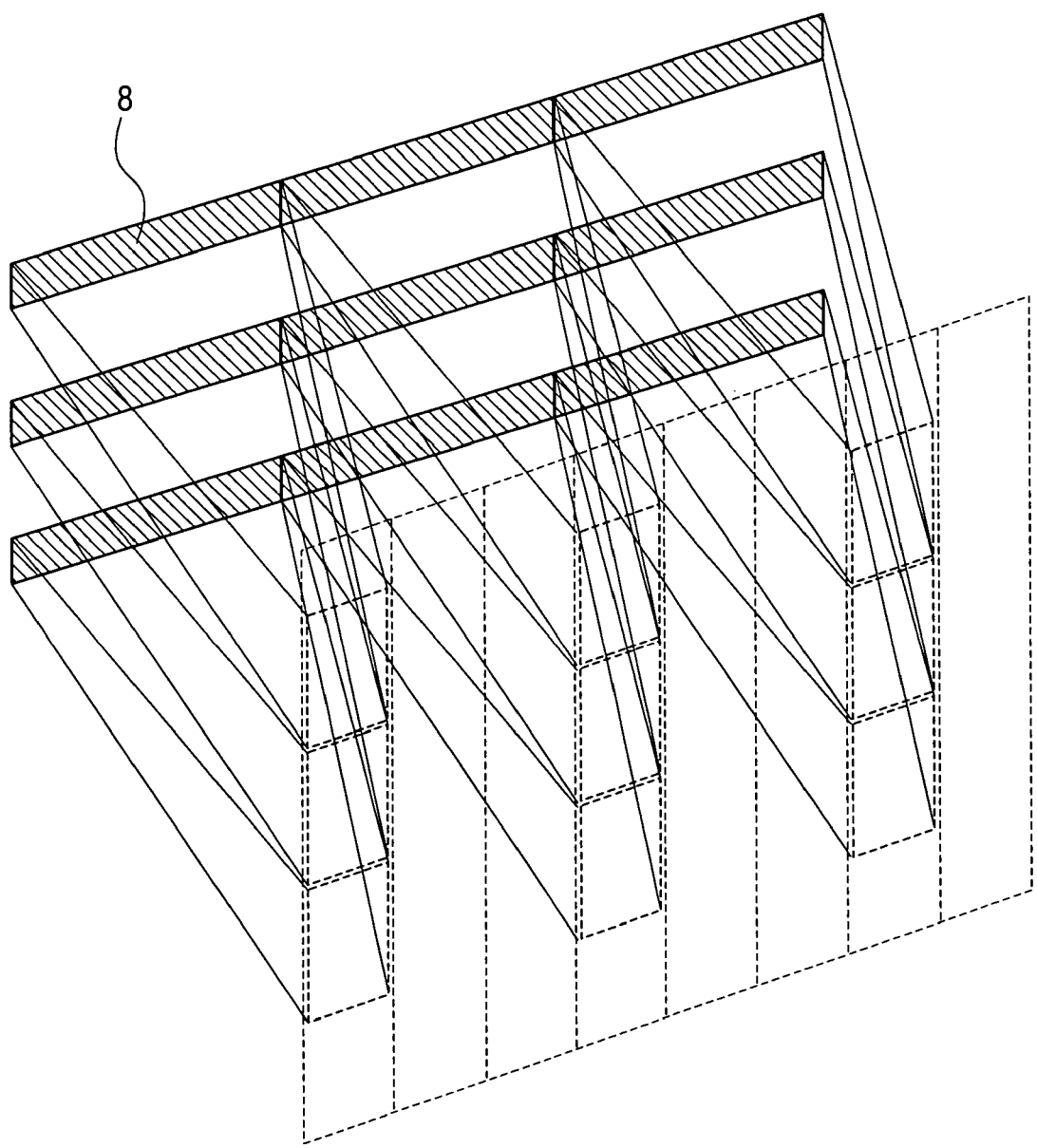
FIG. 57 is a perspective view explaining the optical path in case of using the holographic optical element as the optical connecting means.

FIG. 55 is an explanatory drawing of the behavior of the horizontal component of the light at this time. The holographic optical element 8 disposed in front of the image display means 1 covers the entire area of the horizontal unit pattern of the pixel. The light from this range all passes through a region a' for the column a on the horizontal directional control means 2. In the meantime, the vertical component of the light takes the behavior as shown in FIG. 56.

The light from the column a is diffracted by the holographic optical element 8 so as to pass through only the region of the height three times that of the column a on the horizontal directional control means 2. The observer can observe the pixel enlarged three times in the apparent height by the operation of the longitudinal diffusion plate 5. When the holographic optical element 8 operating in this way is arranged to match the horizontal unit pattern of the pixel similarly to FIG. 57, and configures the aggregation of the holographic element, it is possible to make the optical connecting as shown in FIG. 41 across the whole pixel.

It is desirable that the holographic optical element 8 is a transmission type as it is used almost integrally with the image display means 1. In case the image display means 1 is the transmission type, by arranged the holographic optical element 8 behind the image display means 1, a desired directivity can be give to the image information light emitted from the image display means 1 before entering the image display means 1. In the mean time, in case the image display means 1 is not the transmission type, but a self-light emitting type, the holographic optical element 8 is arranged in front of the image display means 1, so that a desired directivity can be given to the image information light outgoing from the image display means 1. That is, the present invention can take a configuration in which the holographic optical element 8 is arranged either in front or back of the image display means 1.

Figure 58A:
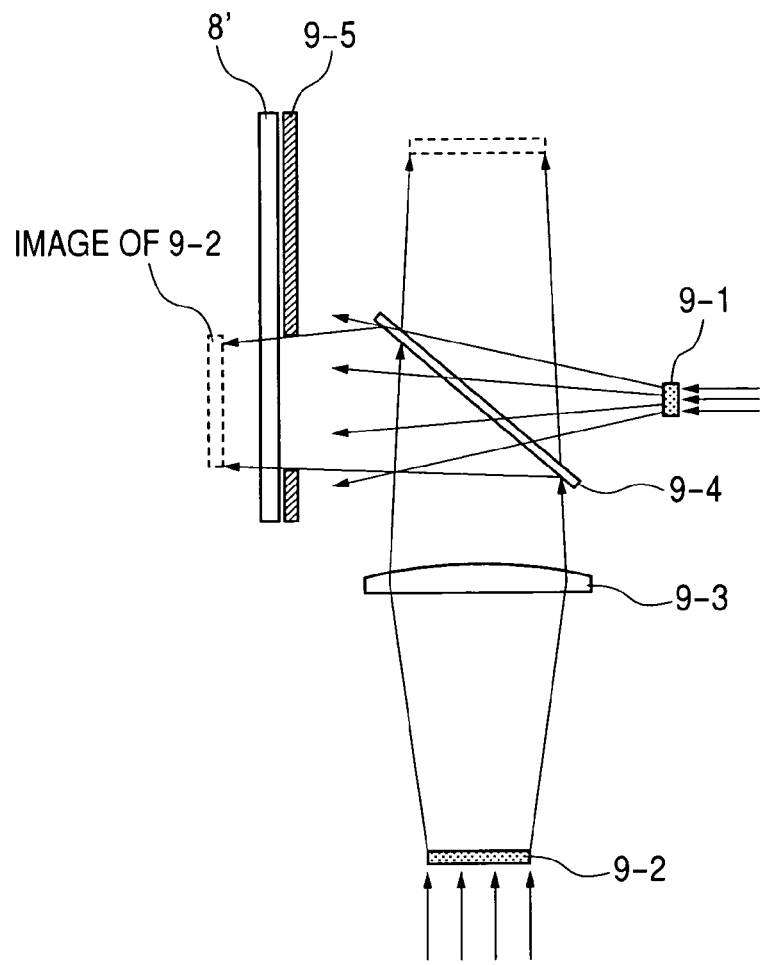
FIGS. 58A and 58B are views showing a manufacture method of the holographic optical element.
Figure 58B:
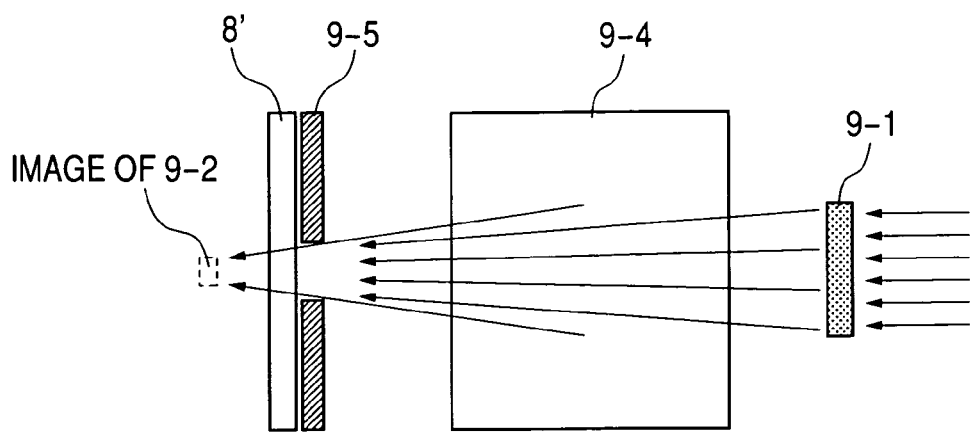

FIGS. 58A and 58B show a manufacture method of the holographic optical element having the operation as above-described. A diffuser 9-1 is installed at a position equivalent to the unit region on the horizontal directional control means 2, and is illuminated by a coherent light, and is turned into an object beam at the holographic recording time. While it is desirable that the other reference beam is allowed to simulate the light from the horizontal unit pattern region of the pixel corresponding to the above-described unit region, the converged light to this region are to enter a holographic photosensitive material from the same side as the object beam in order to make a transmission type holographic. To be more precise, as shown in FIGS. 58A (top view) and 58B (side view), the light from the diffusion plate 9-2, which is analogous to the horizontal unit pattern region of the pixel, illuminated by the coherent light is image-formed in the space by an image-forming lens 9-3, and, moreover, the light is synthesized so that interference fringes with the object beam are formed by a half mirror 9-4 on the holographic photosensitive material 8'. At this time, the configuration is made such that the horizontal unit pattern region of the pixel and the image of the diffusion plate 9-2 are matched. Reference numeral 9-5 denotes an aperture limiting an exposure region, which is provided so that unnecessary interference fringes are not formed in the region other than a desired region. Holographic interference fringe recording by such a configuration is repeated across the whole region of the image display means 1.

Figure 59:
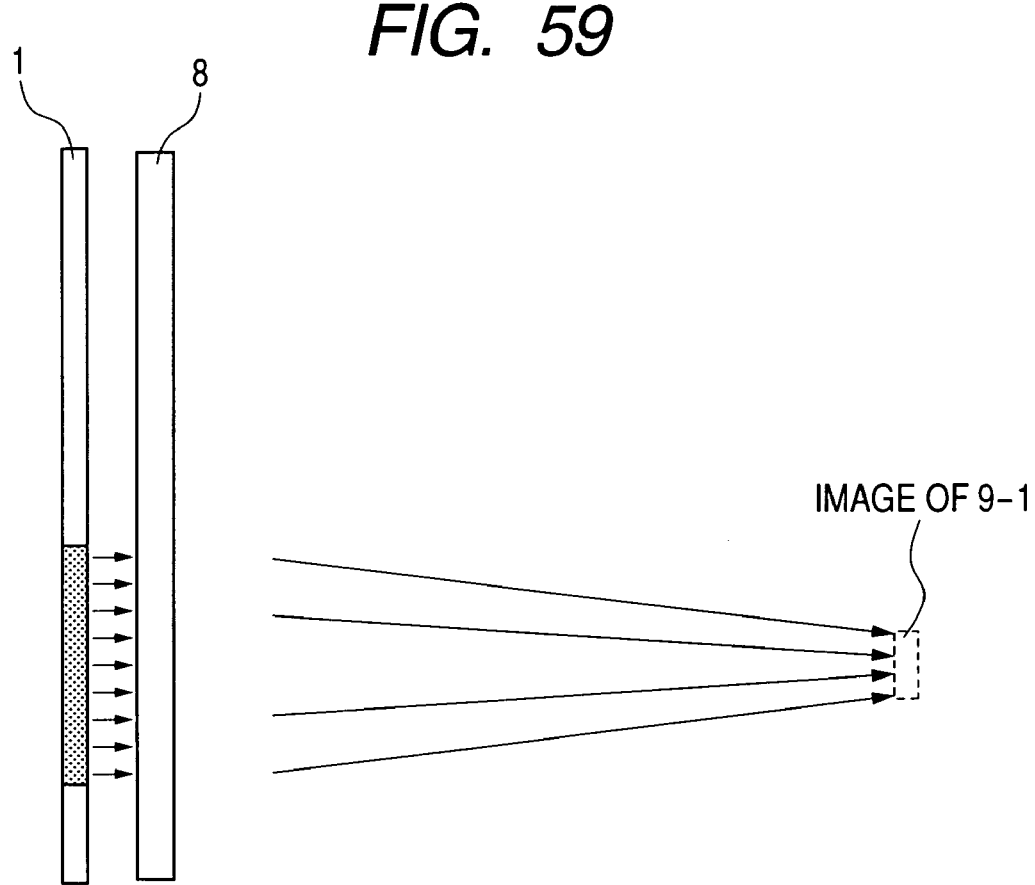
FIG. 59 is a top view of the state of an image reconstruction by the holographic optical element.
Figure 60:
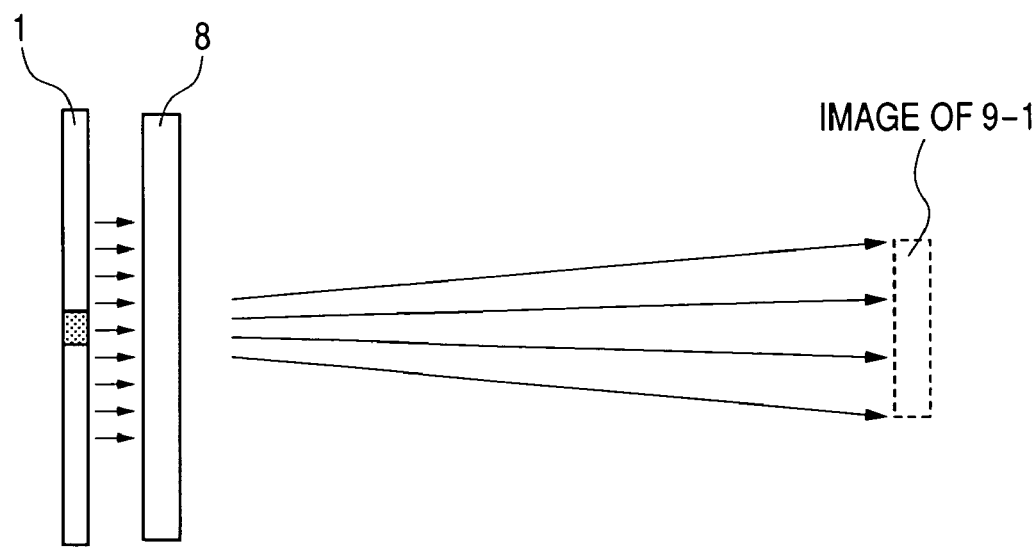
FIG. 60 is a side view of the state of an image reconstruction by the holographic optical element.

FIGS. 59 and 60 show a top view and a side view of the behavior of the image reconstruction by the holographic optical element 8 obtained by developing the interference fringes recorded by the above described method. When the light radiated from the region (half-tone dot lines in the drawings) which is equivalent to the horizontal unit pattern of the pixel on the image display means 1 enters the holographic optical element 8, it is converted into the light which reconstructs the image of the diffusion plate 9-1. The position and size of the diffusion plate 9-1 match to the unit region on the horizontal directional control means 2 to be passed through by the light from the horizontal unit pattern region of the pixel, and as a result, the optical connecting between the region determined on the image display means 1 by the holographic optical element 8 and the region determined on the horizontal directional control means 2 is established.

Figure 61:
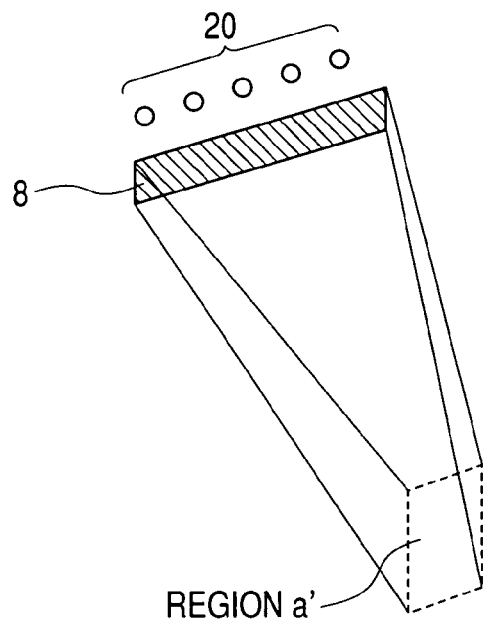
FIG. 61 is a perspective view showing the state of a light reconstruction by the holographic optical element using a point light source array.

While the present invention can be executed even by the holographic optical element 8 in this way, in the case of the above-described holographic manufacture method, since both of the object beam and the reference beam become the diffused light, there are some cases where the contrast of the interference fringes is reduced, and unnecessary light is generated so that the desired optical connecting is not obtained. To solve this problem, a method of improving the spatial coherence of the reference beam and using the illumination light having high spatial coherence for the illumination light at the time of reconstruction is effective. FIG. 61 shows the behavior of the light reconstruction by the holographic optical element by using a point light source array 20. For example, as shown in FIG. 61, when the horizontal unit pattern region of the holographic optical element 8 is illuminated by the point light source array 20 and the light having directivity toward the corresponding region a' is reconstructed, the above-described problem becomes difficult to occur.

Figure 62:
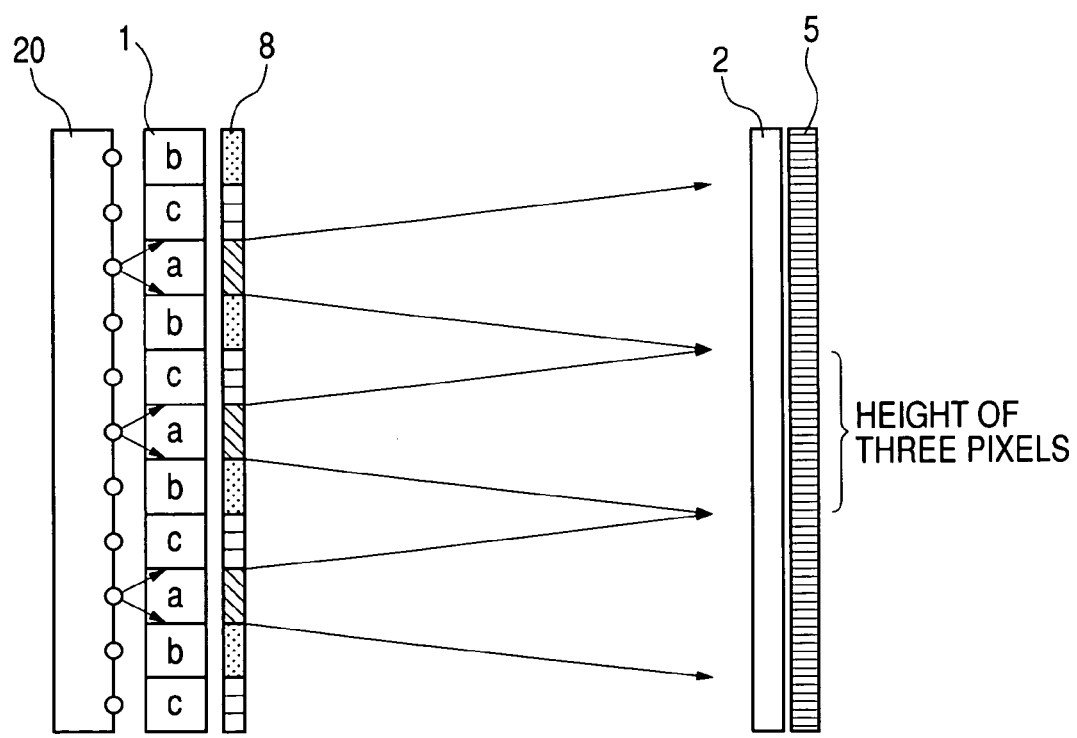
FIG. 62 is a side view of the stereoscopic image display device using the point light source array and the holographic optical element.

FIG. 62, similarly to FIG. 61, shows a side view in case of executing the stereoscopic image display device of the present invention by using the point light source array 20 and the holographic optical element 8. The individual point light source of the point light source array 20 illuminates the height of one column portion of the image display means 1, and the light is converted by the holographic optical element 8 into the light having the directivity so as to have a desired height (here it is the height of three pixels) on the longitudinal diffusion plate 5.

Figure 63:
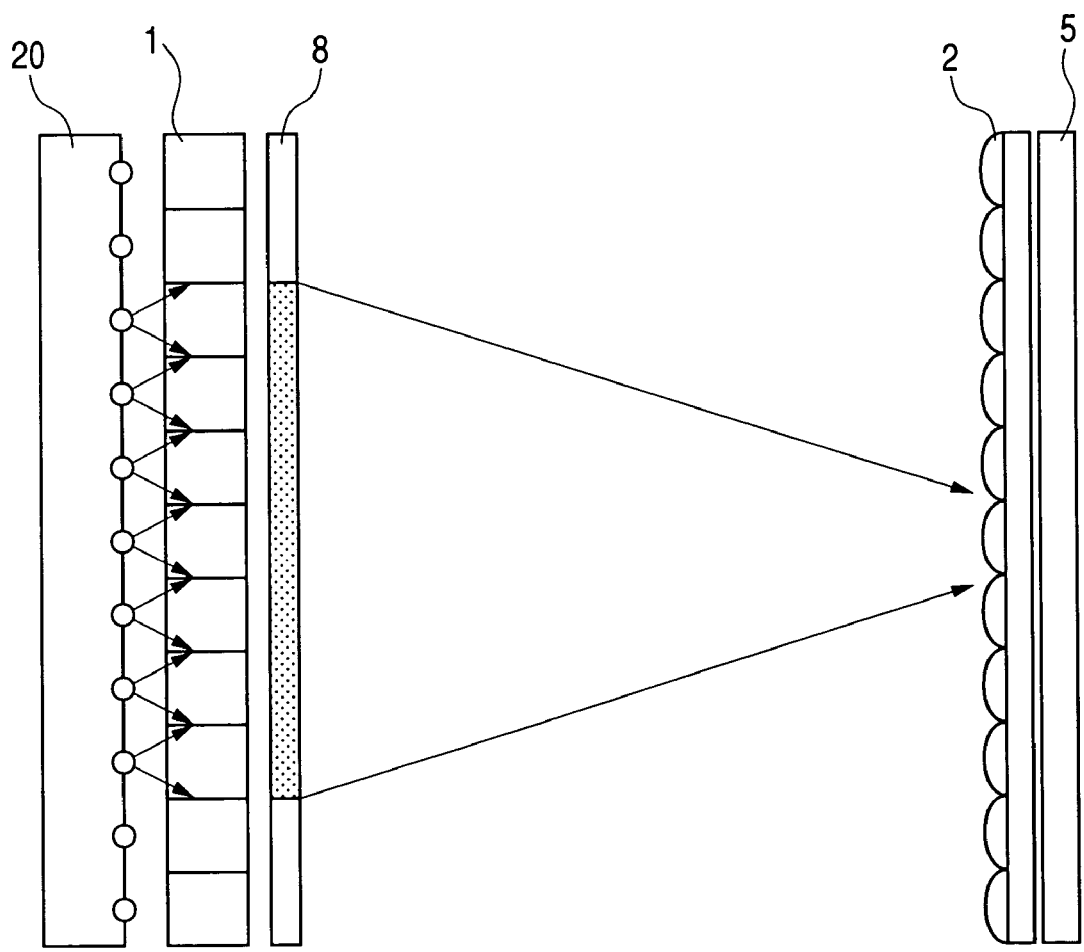
FIG. 63 is a top view of the stereoscopic image display device using the point light source array and the holographic optical element.

FIG. 63 shows a top view of the same embodiment. The individual point light source of the point light source array 20 illuminates one pixel each or every predetermined pixels of the image display means 1, and the light thereof is converted by the holographic optical element 8 into the light having the directivity so as to converge into the desired region on the horizontal directional control means 2. The point light source array 20 at this time may be configured by an independent light source such as LED, respectively, or may be a connection of a flat type back light and the shielding plate and the like, on which micro diameter aperture array is formed.

Figure 64A:
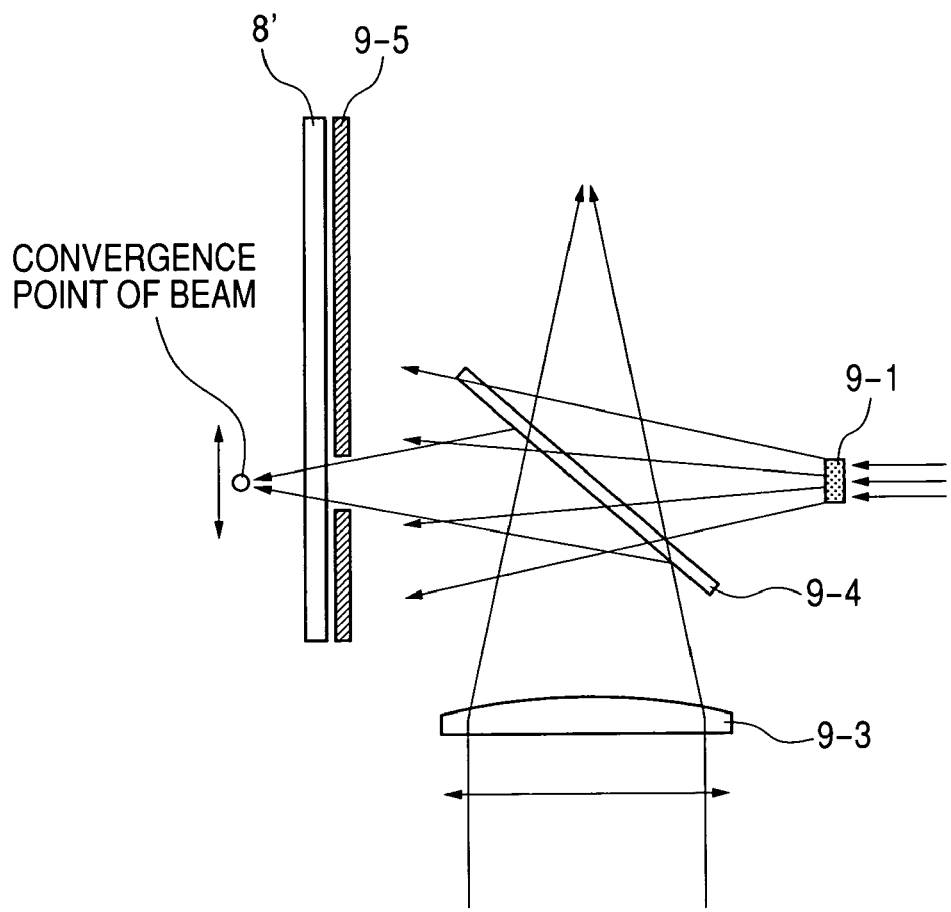
FIGS. 64A and 64B are views showing a manufacture method of the holographic optical element used by using the point light source.
Figure 64B:
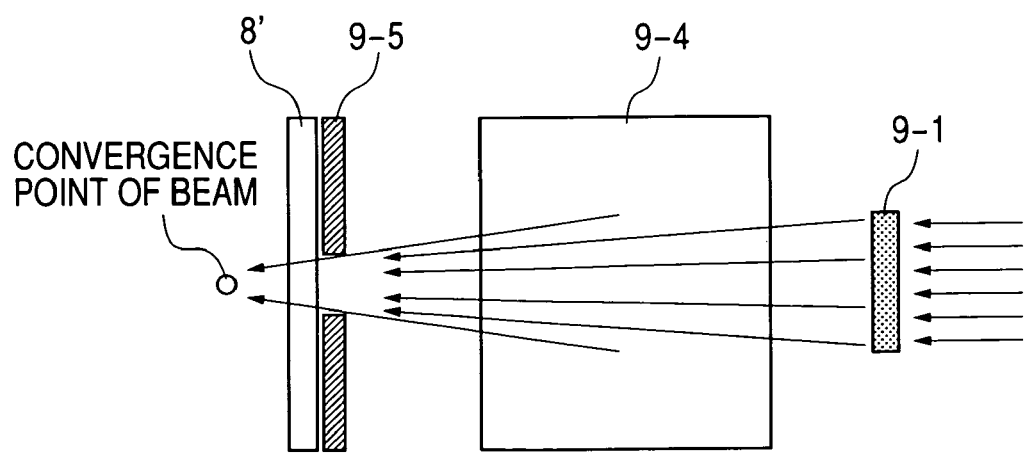

FIGS. 64A and 64B show a manufacture method of the holographic optical element used by using the point light source. The diffusion plate 9-1 is installed at a position equivalent to the unit region on the horizontal directional control means 2, and is illuminated by the coherent light so as to be turned into the object beam at the holographic recording time. Though it is desirable that a coherent point light source corresponding to an illumination point light source is arranged, in order that the other reference beam is turned into the transmission type holographic, the converged light toward the point light source position are to enter the holographic photosensitive material from the same side as the object beam. To be more precise, as shown in FIGS. 64A (top view) and 64B (side view), a spherical wave converged into the illumination point light source position is generated in the space by the lens 9-3, and moreover, the light is synthesized so that interference fringes with the object beam are formed by a half mirror 9-4 on the holographic photosensitive material 8'. Reference numeral 9-5 denotes an aperture limiting an exposure region, which is provided so that unnecessary interference fringes are not formed in the region other than a desired region. If a plurality of point light sources corresponding to a unit region on the horizontal directional control means 2 for the reconstruction time exist, the lens 9-3 is shifted toward the direction shown by a lateral arrow mark shown in FIG. 64A (the aperture 9-5 is also shifted together), and a plurality of reference beams are generated in order for an object beam, thereby recording the holographic fringes in order. This operation is repeated for the whole region of the image display means 1.

FIGS. 65A and 65B show a top view and a side view, respectively, of the behavior of the image reconstruction by the holographic optical element 8 obtained by developing the interference fringes recorded by the above-described method. When the light radiated from the region (half-tone dot line region in the drawing) equivalent to the horizontal unit pattern of the pixel on the image display means 1 enters the holographic optical element 8, it is converted into the light for reproduction of the image of the diffusion plate 9-1. The position and size of the diffusion plate 9-1 match to the unit region on the horizontal directional control means 2 through which the light from the horizontal unit pattern region of the pixel passes, and as a result, the optical connection between the region determined on the image display means 1 and the region determined on the horizontal directional control means 2 is established by the holographic optical element 8.

While the above-described holographic manufacture method utilizes a holographic manufacturing technology by an exposure process using the holographic photosensitive material, it is possible to obtain the desired holographic optical element 8 by applying a CGH (Computer Generated Holographic) technology used actively in recent years. This is a method, where the interference fringes of the holographic to reconstruct a desired wave surface under the established reconstruction condition are obtained in advance by computer calculation, and these fringes are depicted by EB (electronic beam) depicting device and the like, thereby obtaining the desired holographic element. Since the wave surface to be reconstructed and illumination conditions of the holographic optical element 8 necessary for the execution of the present invention are known in advance, it can be easily achieved to obtain the holographic optical element 8 by the application of the above-described CGH technology.

As evident from FIG. 54, while the holographic optical element 8 optically connected the region determined on the image display means 1 and the region determined on the horizontal directional control means 2, the horizontal directivity of the light from the pixel is not enhanced more than necessary. Because, since the diffused light is used as the object beam for the recording, the directivity of the reconstructed light at the reconstruction time is suppressed. Consequently, the horizontal emitting direction of the light after having passed the region determined on the horizontal directional control means 2 is uniquely defined depending on the horizontal position of the pixel on the image display means 1 as previously shown in FIGS. 8 and 18, and therefore, similarly to other embodiments, by considering which parallax image information is stored into which pixel, it is possible to set-up a configuration where a desired parallax image can be observed from a desired visual point. According to the above-described configuration, it is possible to realize the stereoscopic image display device having few crosstalk and being inconspicuous for the reduction of the image quality.

Fifth Embodiment

The present embodiment improves the stereoscopic image display device according to the above-described embodiment, and an embodiment for configuring a stereoscopic image display device having a better performance by giving an optical connecting function to the image display means itself will be described.

Figure 66:
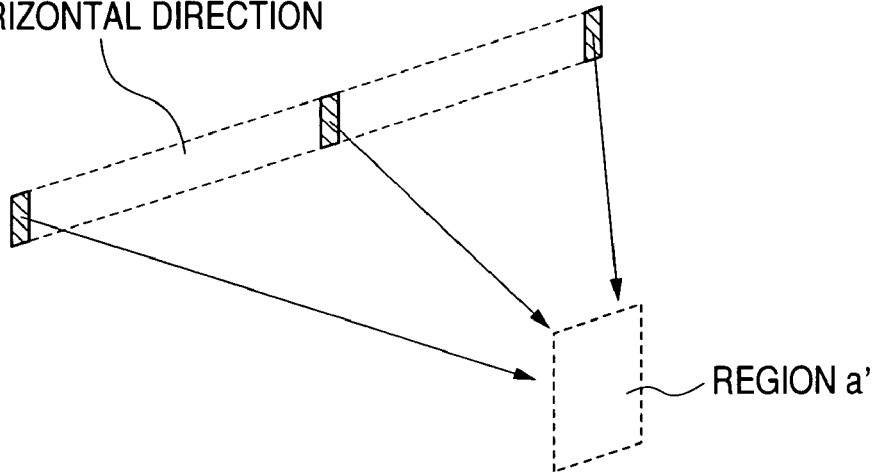
FIG. 66 is an explanatory drawing about image display means having the optical connecting function according to a fifth embodiment.

FIG. 66 is a conceptual illustration of an image display means 1 having an optical connecting function. To make the explanation easy, the following drawings all describe only the light from a pixel of a column a, however, with respect to the pixel of other columns, it is only natural that the same optical connecting operation is generated. Usually, the light radiated from each pixel of the image display means is configured such that the radiating angle of the light becomes large so as to realize a wide view angle characteristic. In contrast to this, in the configuration shown in FIG. 66, by radiating the light having directivity from each pixel, the light radiated from a certain region is configured so as to pass through only the region determined on horizontal directional control means 2. As the pixel (light source) radiating the light having such directivity, an element such as a LED and a laser can be cited. For example, surface emission type semiconductor laser elements (VCSEL), for radiating a light in a high directivity, arranged in one-dimensional or two-dimensional array shape has been developed in recent years, it is possible to configure the image display means achieving the above-described object by using such a device on the image display means.

In the case of the present configuration, since its object is to optically connect the column a of the pixel and the region for the column a on the horizontal directional control means 2, as shown in FIG. 66, the directivity of the radiated light from each pixel (light source) is determined so that the light radiated from the horizontal unit pattern region of the column a all passes through the region a' for the column a on the horizontal directional control means 2.

Figure 67:
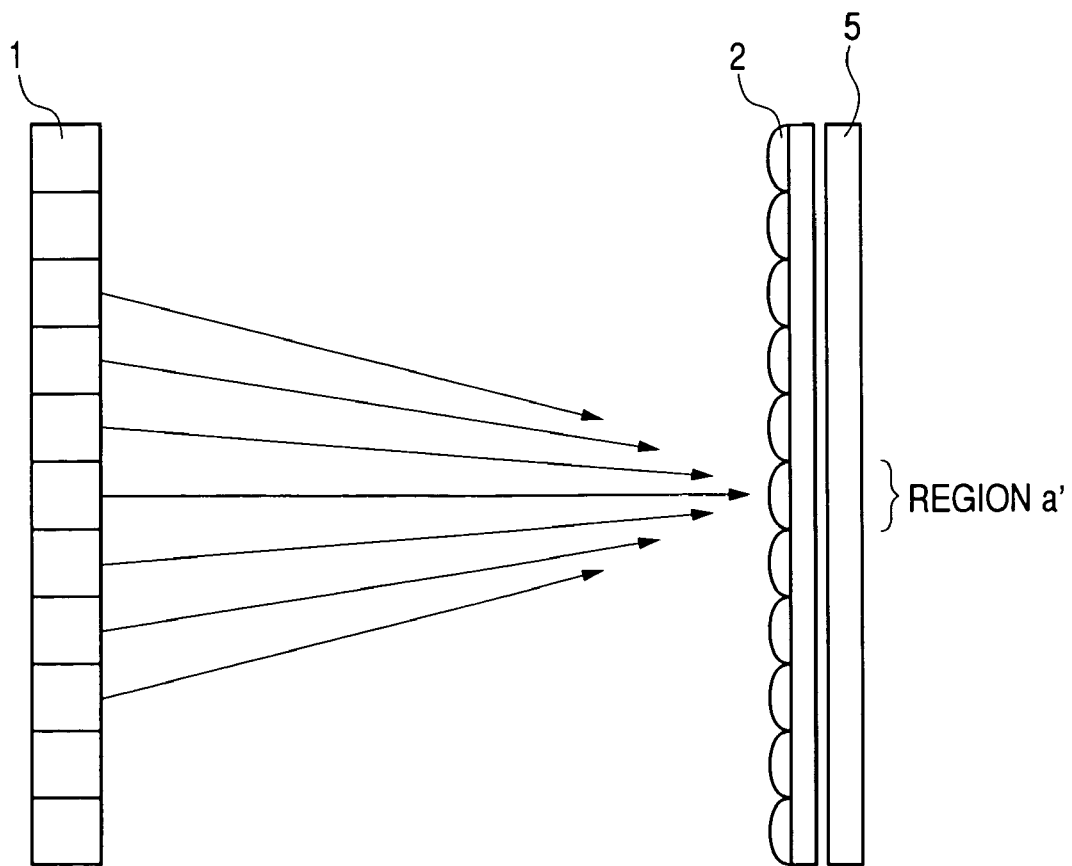
FIG. 67 is an explanatory drawing of the behavior of a horizontal direction component of the light in case of using the image display means having the optical connecting function.

FIG. 67 is an explanatory drawing of the behavior of the horizontal component of the light in case of using the image display means 1 having the optical connecting function. The pixel in the half-tone dotted line portion within the image display means 1 shows a horizontal unit pattern region. The light from each pixel all has directivity so that it passes through the region a' for the column a on the horizontal directional control means 2.

Figure 68:
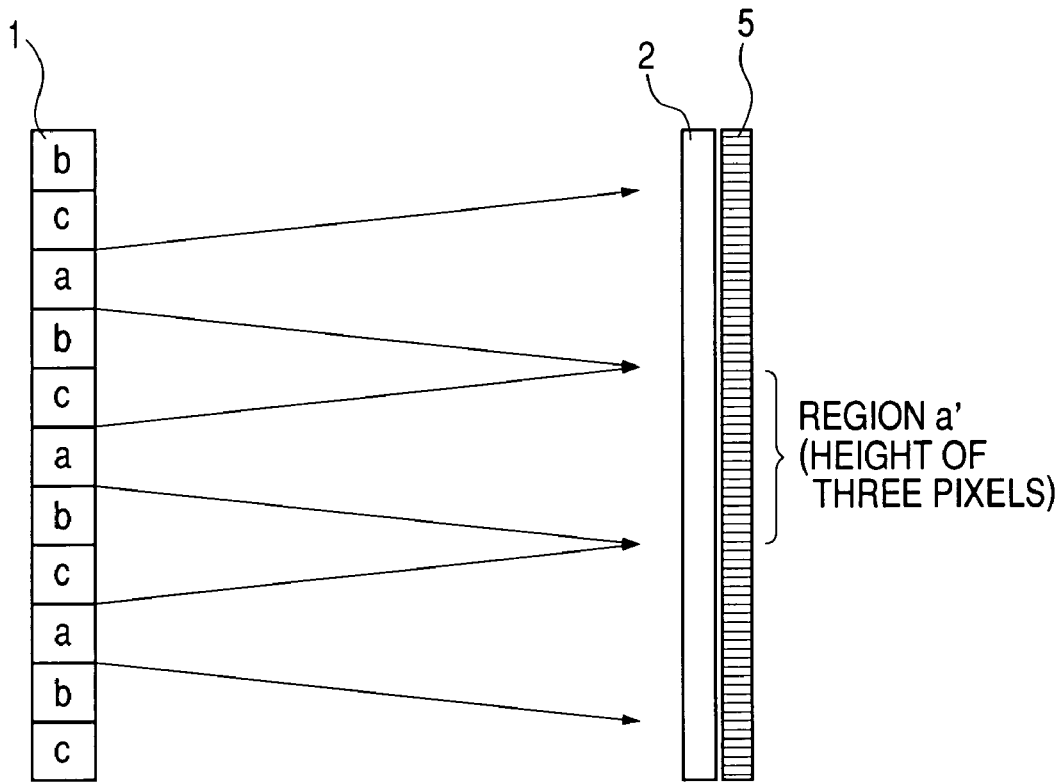
FIG. 68 is an explanatory drawing of the behavior of a vertical direction component of the light in case of using the image display means having the optical connecting function.

FIG. 68 is an explanatory drawing of the behavior of the vertical component of the light in case of using the image display means 1 having the optical connecting function. The light from the pixel on the column a all has directivity as shown in the drawing, and is configured so as to pass through only the region a' having the height three times the column a on the horizontal directional control means 2. The observer can observe the pixel, of which the apparent height is enlarged three times by the operation of the longitudinal diffusion plate 5. If the aggregation of the pixel radiating the light having such directivity is aligned and arranged across the whole surface of the image display surface, the optical connection for enabling the desired stereoscopic image reconstruction can be made possible for the whole pixel.

Figure 69:
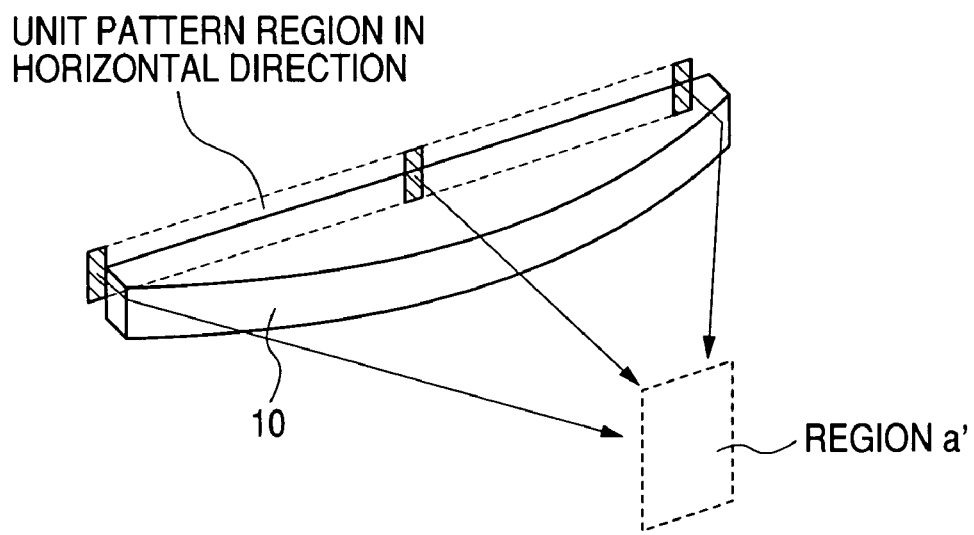
FIG. 69 is a conceptual illustration of one example of the embodiment of the image display means having the optical connecting function.

FIG. 69 shows a conceptual illustration of the embodiment of the image display means 1 having the optical connecting function. As shown in FIGS. 66 to 68, it is not easy to set different directivity independently to all the pixels to give the optical connecting function to the image display means 1. In contrast to this, as shown in FIG. 69, by the connection of the image display means 1, in which all pixels have the same directivity, and the pixel radiated light directional control means 10 which changes the directivity of the radiated light from the pixel according to its incident position, it is possible to execute the present invention easier.

In FIG. 69, the radiated light from each pixel having the same directivity is modulated by the pixel radiated light directional control means 10, so that the column a of the pixel and the region for the column a on the horizontal directional control means 2 are optically connected. For example, the light radiated from the horizontal unit pattern of the column a all passes through the region a' for the column a on the horizontal directional control means 2.

Figure 70:
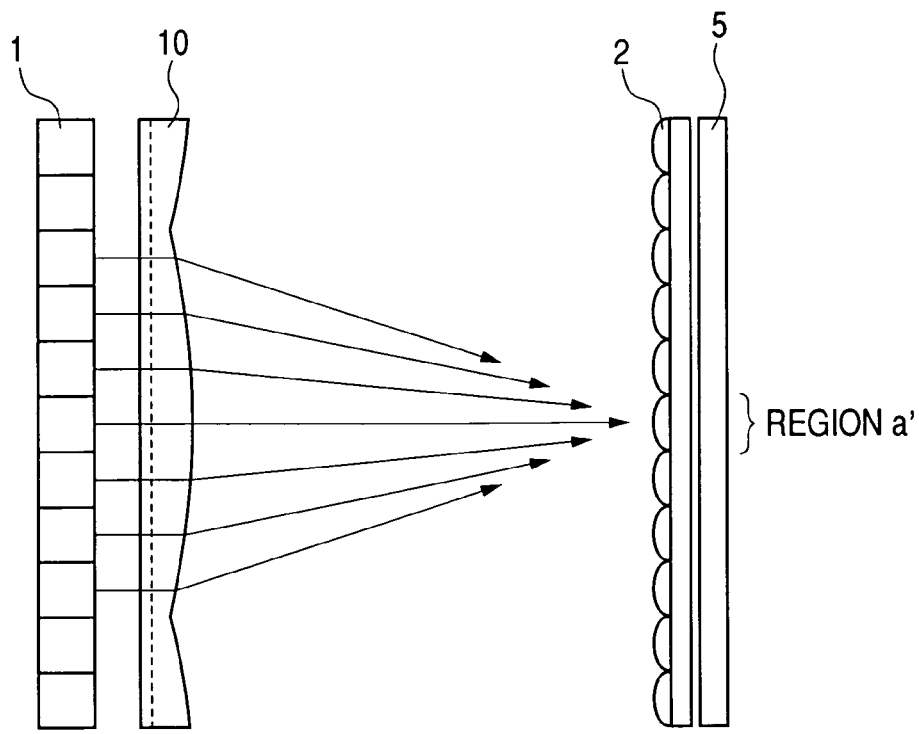
FIG. 70 is an explanatory drawing of the behavior of the horizontal direction component of the light in the image display means of FIG. 69.

FIG. 70 is an explanatory drawing of the behavior of the horizontal component of the light in the configuration of FIG. 69. The light from each pixel all becomes a parallel radiated light collimated vertically to the screen. That is, the radiated lights from the whole pixel have the same directivity. The pixel radiated light directional control means 10 arranged to cover the image display means 1 modulates the directivity of the horizontal component of these collimated radiated lights, and all the lights radiated from the above-described unit pattern region generate the directivity such as passing through the-region a' for the column a of the horizontal directional control means 2. In this case, since the modulation to reduce the passage region of the light is required, an optical element such as operating as, for example, a convex cylindrical lens array for the horizontal component of the light can be used for the pixel radiated light directional control means 10.

Figure 71:
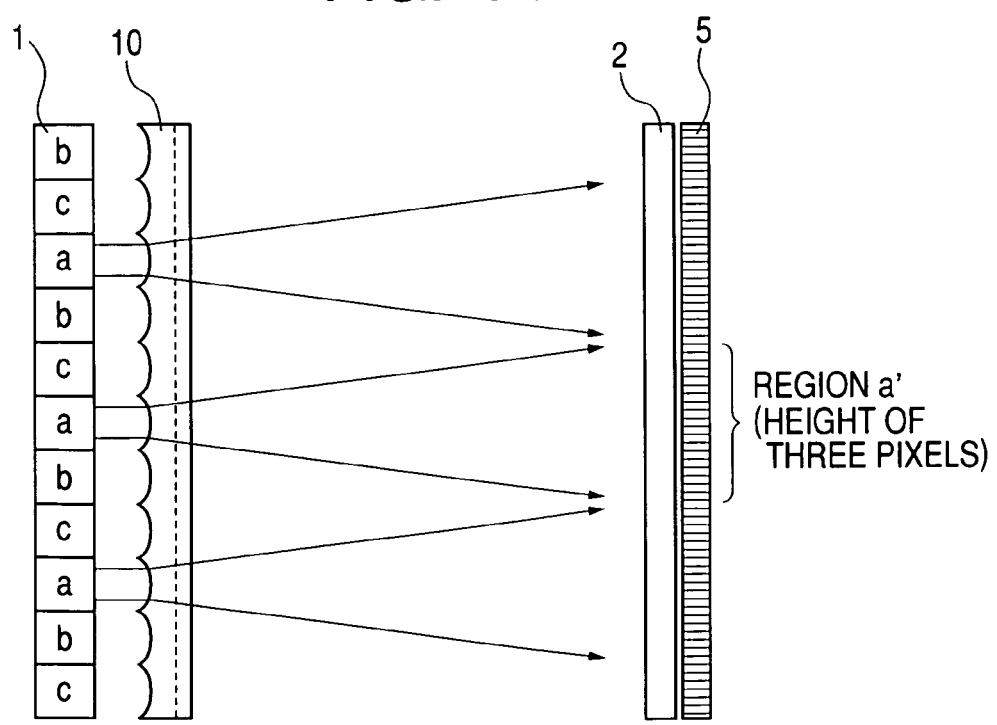
FIG. 71 is an explanatory drawing of the behavior of the vertical direction component of the light in the image display means of FIG. 69.

FIG. 71 is an explanatory drawing of the behavior of the vertical component of the light in the configuration of FIG. 69. The light from each pixel all becomes a parallel radiated light collimated also vertical to the screen. Further, the radiated light from the whole pixel has same directivity. The pixel radiated light directional control means 10 arranged to cover the image display means 1 modulates the directivity of the vertical component of these collimated radiated lights, and is configured so that all the lights radiated from the pixel on the column a pass through only the region a' of the height three times the column a of the horizontal directional control means 2. In the case of the present configuration, since the modulation to enlarge the passage region of the light is required, an optical element such as operating as, for example, a concave cylindrical lens array for the horizontal component of the light can be used for the pixel radiated light directional control means 10.

If the pixel radiated light directional control means 10 having the above-described characteristics is aligned and arranged across the-whole surface of the image display surface, an optical connection for enabling the desired stereoscopic image reconstruction can be made'possible for the whole pixel.

Figure 72:
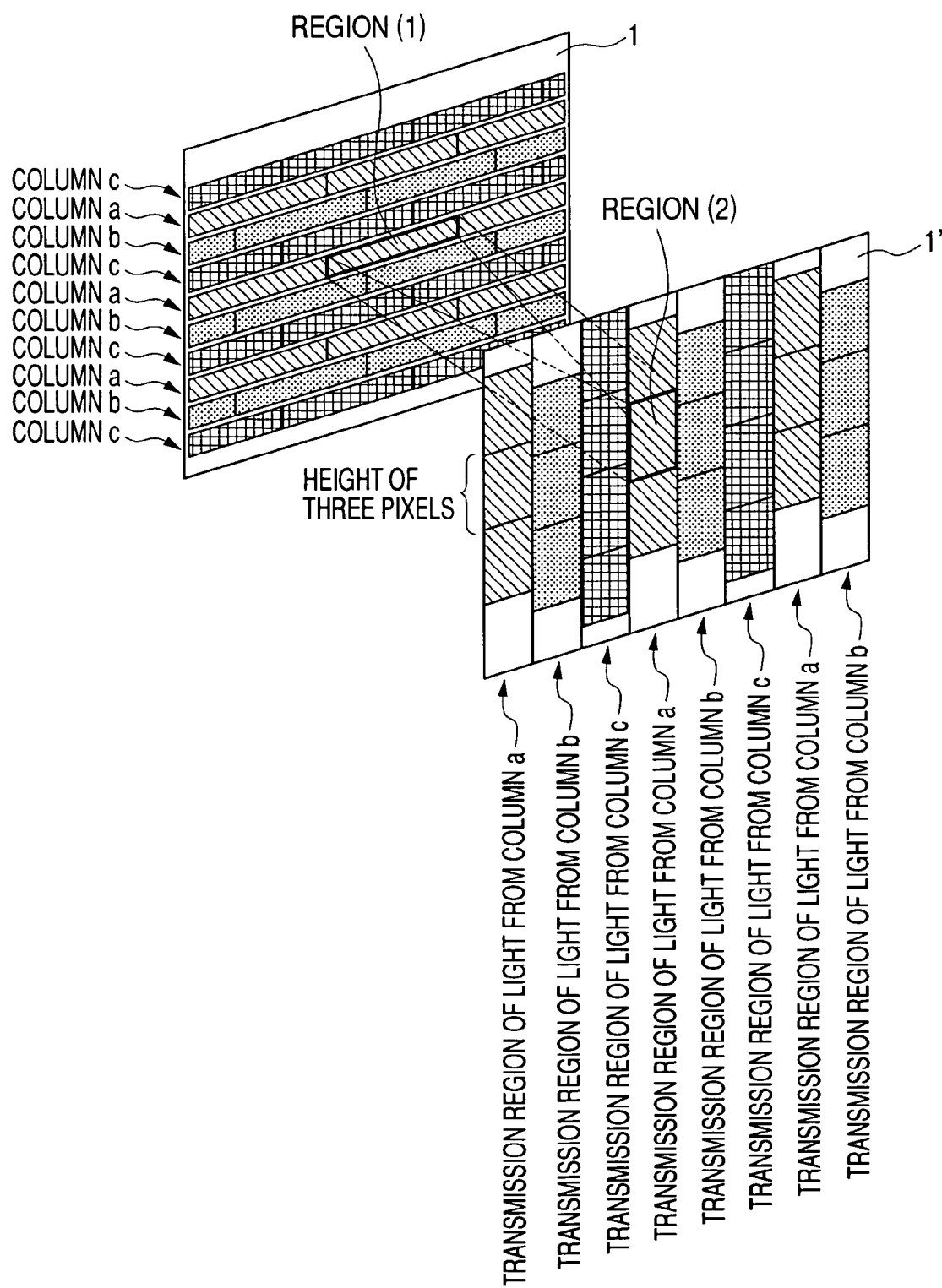
FIG. 72 is a conceptual illustration for explaining a role of the optical connecting means used in the stereoscopic image display means according to the present invention.
Figure 73:
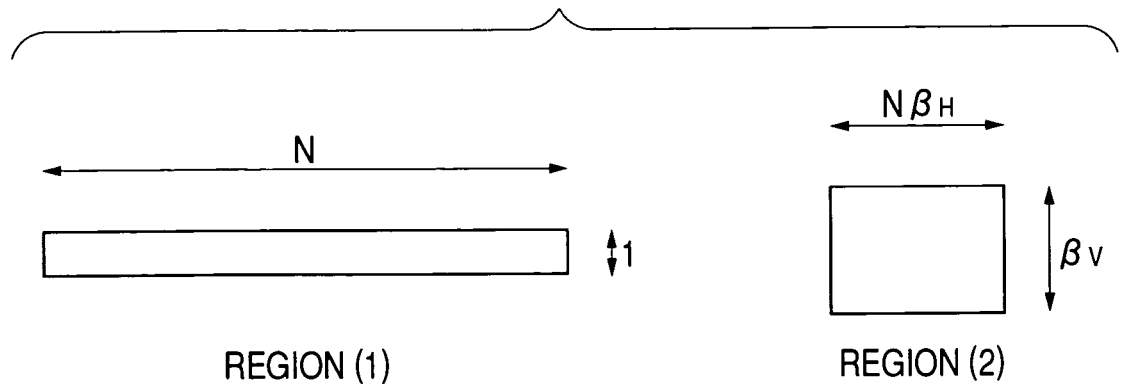
FIG. 73 shows shapes of the regions on the screen and a surface to be projected, coupled by the optical connecting means.
Figure 74:
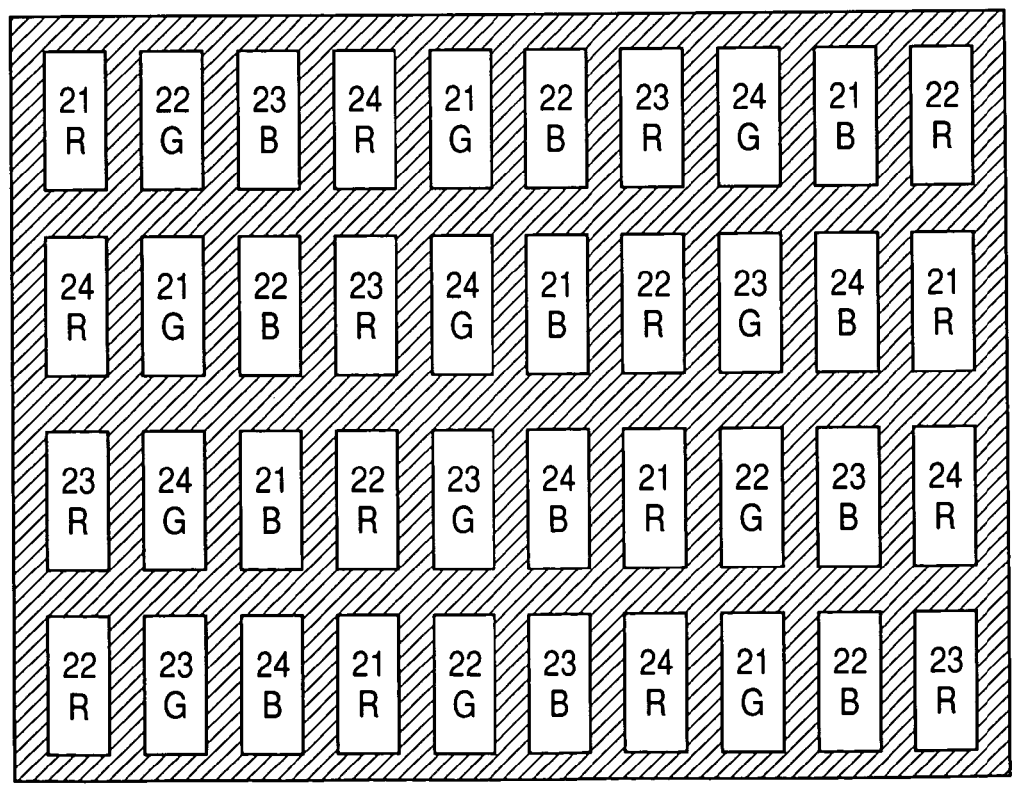
FIG. 74 is an explanatory drawing of a conventional pixel arrangement.
Figure 75:
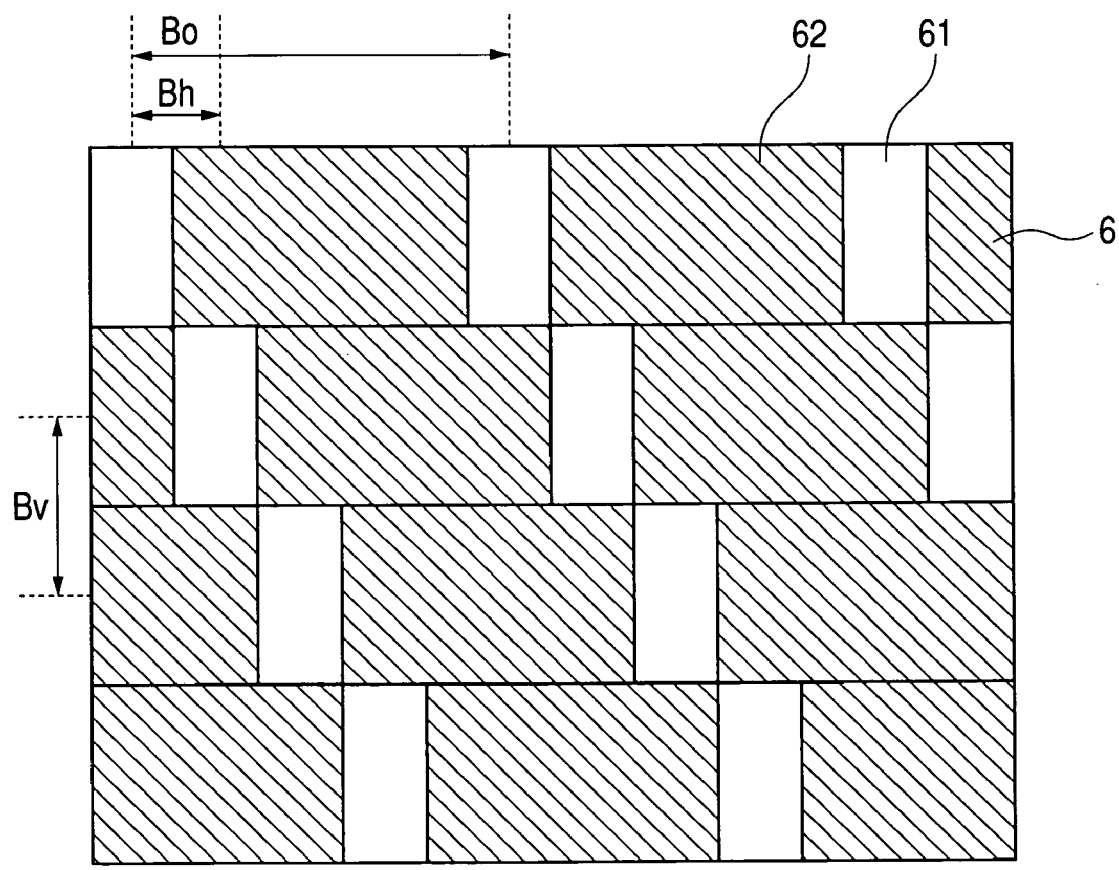
FIG. 75 is an explanatory drawing of the arrangement of a conventional parallax barrier aperture portion.
Figure 76:
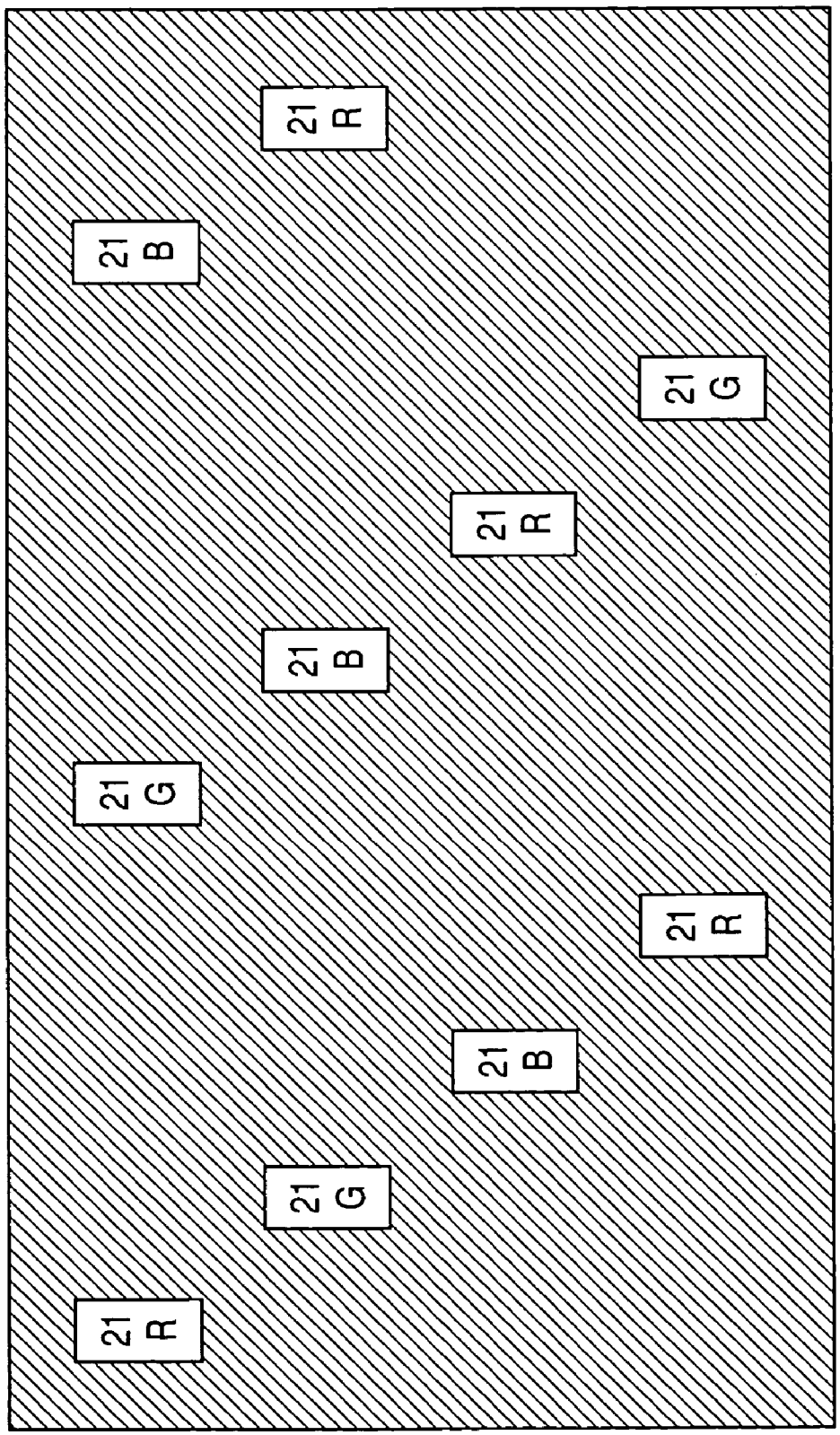
FIG. 76 is a view (1) showing an example of how the parallax image looks like in the conventional stereoscopic image display device.
Figure 77:
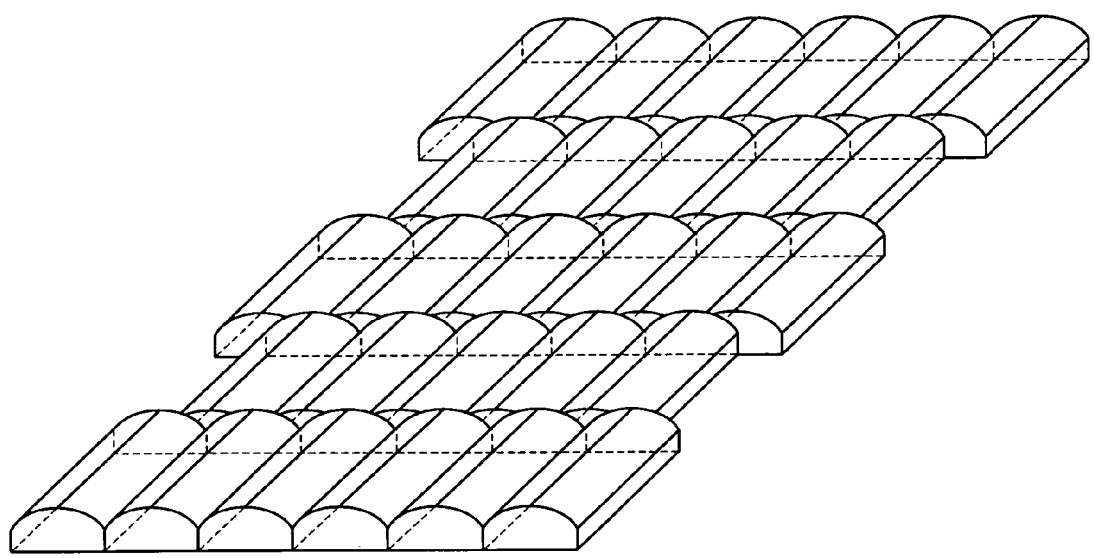
FIG. 77 is a view showing an example of a conventional horizontal directional control means (modified lenticular lens)
Figure 78:
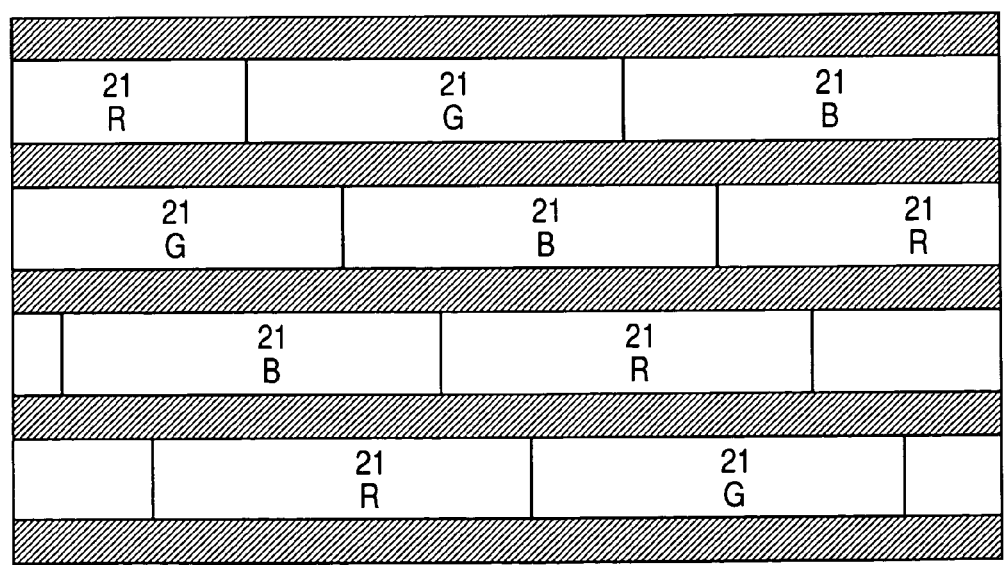
FIG. 78 is a view (2) showing an example of how the parallax image looks like in the conventional stereoscopic image display device.

FIG. 72 is a conceptual illustration for explaining the role of the optical connecting means using the stereoscopic image display device according to the present invention. Further, FIG. 73 is a view showing the shape of the regions to be connected by the optical connecting means. The summing up of the role of the optical connecting means as shown in FIG. 72 is as follows.

1. Guide the light outgoing from a predetermined region 1 on the image display means 1 so as to enter a predetermined region 2 on a virtual image display means 1' different from the image display means 1.

2. When generating the above-described operation, the operation is made so that the horizontal component of the light is converged and the longitudinal component is diverged, and an aspect ratio of light of the region through which the light passes is converted.

3. The horizontal directivity of the light outgoing from the region 1 is not higher than necessary, and the horizontal component of the light outgoing from one point on the region 1 enters the region 2 with spreading across a whole horizontal width of the region 2.

The above-described operation 1 is to achieve the original object of the optical connecting means, and the operations 2 and 3 have also important meanings in the execution of the present invention. In the present embodiment, what the observer observes is not the pixel on the image display means 1, but an apparent pixel reconstructed in each region 2 on the image display surface 1' (here, it matches the horizontal directional control means 2). Consequently, as described previously by using FIGS. 20 to 22, by eliminating the non-display region on the horizontal directional control means 2 and adjusting the aspect ratio of the region 2 shown in FIG. 73 within natural ranges (approximately 1:6 to 6:1) for the observer, the impression of the image to be observed is sharply improved. The above-mentioned operation 2 can achieve such an object. For example, when the number of parallax images presentable to the observer is N, the region 1 becomes a horizontally long rectangular region of N in width×1 in height. At this time, assuming that a horizontal magnification by the optical connecting means is βH, and a longitudinal magnification is βV, the region 2 becomes a region of NβH in width×βV in height. In case the aspect ratio of the region 2 is adjusted within the natural ranges for the observer, it is necessary to satisfy the condition of the following equation (1):

$$1/6 \leq N\beta H/\beta V \leq 6 \quad (1)$$

Further, to make the whole region 2 observed luminous from the observer, it is necessary that the light be deflected toward the observer after spreading and entering across the whole region 2. At this time, if the longitudinal diffusion plate 5 as shown in FIG. 13 is arranged with respect to the longitudinal component of the light, it is possible to allow the observer to recognize the whole image, however, since it is necessary to hold-a horizontal directivity, it is not possible to utilize the diffusion member with respect to the horizontal component of the light. Consequently, as described in operation 3, it is effective to spread the horizontal component of the light outgoing from one point on the region 1 across the whole horizontal width of the region 2 and allow it to enter therein.

Figure 19:
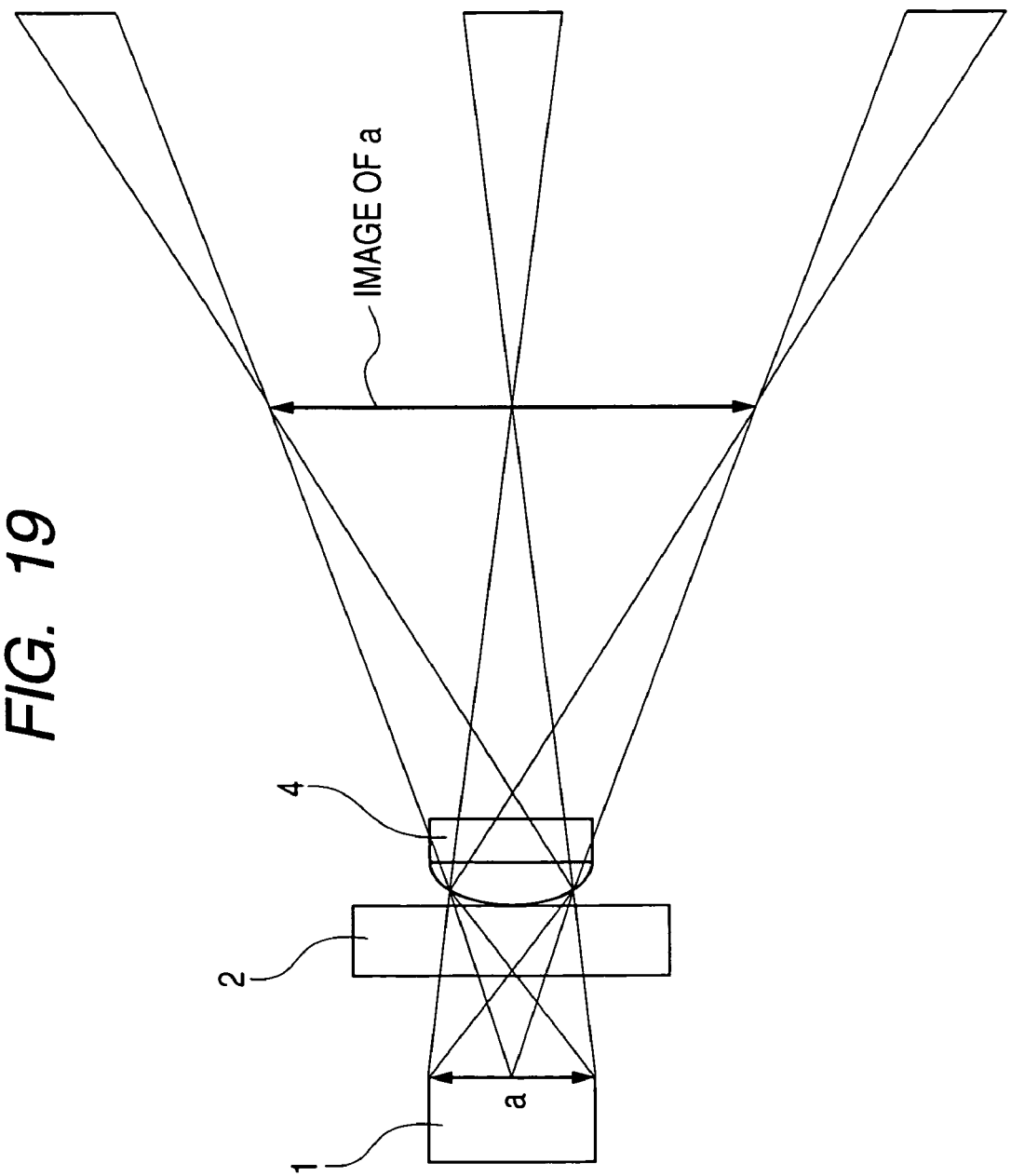
FIG. 19 is a view showing the behavior of the light in an enlarged image formation of a real image by the cylindrical lens array.

The image display surface 1' described in the operation 1 is strictly referred togas a surface as if displaying the image seen from the observer. For example, in the embodiment shown in FIG. 19, a image forming surface of the image corresponds to this surface, and the longitudinal diffusion plate 5 shown in FIG. 12 and the cylindrical lens array 6 in FIG. 14 corresponds to the image display surface 1'. Further, in each embodiment shown in FIGS. 38, 43, 47, 50, 51 and 62, the horizontal directional control means 2 and the longitudinal diffusion plate 5 corresponds to the image display surface 1'.

Particularly, in case the horizontal directional control means 2 is configured by horizontal periodic arrangement of unit optical members (in this case, a cylindrical lens) such as the cylindrical lens array 2-2, the above-described region 2 is configured so as to be a region included in one of the unit optical members.

According to the present embodiment, it is possible to configure the stereoscopic image display device inconspicuous for the reduction of the image quality in case the stereoscopic image is constructed from many visual points.

This application claims priority from Japanese Patent Application Nos. 2003-311450 filed on Sep. 3, 2003 and 2004-121449 filed on Apr. 16, 2004, which are hereby incorporated by reference herein.

What is claimed is:

1. A stereoscopic image display device, comprising:
an image display means composed of a plurality of pixels arranged in a matrix pixel arrangement, the matrix pixel arrangement being subdivided into a repeating group of pixels in a predetermined order, each pixel in the repeating group of pixels corresponding to one of a plurality of parallax images that together form a stereoscopic image;
a horizontal directional control means, which is arranged at a predetermined distance away from the image display means, the horizontal directional control means having one or more aperture portions corresponding to the matrix pixel arrangement formed within a shielding portion, the aperture portions giving a horizontal directivity so that image information light emitted from each pixel forming each parallax image is presented independently to each of different places of observation;
a vertical enlarging means, which is arranged in front of the horizontal directional control means in vertical alignment with the matrix pixel arrangement so that the image information light from an aperture of the horizontal directional control means does not superpose, and enlarges a vertical view angle by giving a vertical optical action to the image information light having passed the aperture of the horizontal directional control means; and
a cylindrical lens array, which is provided between the image display means and the vertical enlarging means, having a horizontal axis meridian for enlarging the height of an image generated for each pixel of the image display means and projecting the image generated for each pixel of the image display means to the vertical enlarging means.

2. The stereoscopic image display device according to claim 1, wherein the one or more aperture portions of the horizontal directional control means is a plurality of apertures in a positional arrangement shifted by a predetermined amount on each horizontal column so that only pixels in each repeating group of pixels that correspond to the same parallax image are visible when viewing the stereoscopic image display device.

3. The stereoscopic image display device according to claim 1, wherein the cylindrical lens array is provided between the horizontal directional control means and the vertical enlarging means.

4. The stereoscopic image display device according to claim 1, wherein the cylindrical lens array is provided between the image display means and the horizontal directional control means.

5. The stereoscopic image display device according to claim 1, wherein a cylindrical lens, having an axis meridian in a horizontal direction in order to enlarge the information display light emitted from each pixel of the image display means and to project it to the vertical enlarging means, is placed in front of the aperture of the horizontal directional control means.

6. The stereoscopic image display device according to claim 1, wherein a width of each aperture portion of the horizontal directional control means is identical to or less than a width of a pixel on the image display means; and
   a height of each aperture portion of the horizontal directional control means is identical to or more than a height of a pixel on the image display means.

7. The stereoscopic image display device according to claim 1, wherein the vertical enlarging means is a vertical light diffusion plate for only diffusing the light vertically.

8. The stereoscopic image display device according to claim 1, wherein the vertical enlarging means is a lenticular lens composed of the cylindrical lens having an axis meridian in a horizontal direction for vertically converging the information display light having passed the horizontal directional control means toward an observing position.

9. The stereoscopic image display device according to claim 1, wherein the vertical enlarging means is disposed adjacent to the horizontal directional control means.

10. A stereoscopic image display device, comprising:
   an image display means composed of a plurality of pixels matrix pixel arrangement, the matrix pixel arrangement being subdivided into repeating groups of pixels in a predetermined order, each pixel in the repeating group of pixels corresponding to one of a plurality of parallax images that together form a stereoscopic image;
   a horizontal directional control means, which is arranged at a predetermined distance away from the image display means, the horizontal directional control means having periodical structure corresponding to the matrix pixel arrangement for giving a horizontal directivity so that image information light emitted from each pixel forming each parallax image is presented independently to each of different places of observation;
   an optical connecting means for optically conjugating each of the regions of the image display means with the region corresponding to the horizontal directional control means, wherein the optical connecting means is a cylindrical lens array composed of cylindrical lenses for converging the image information light emitted from each of the regions of the image display means into the region of the horizontal directional control means corresponding to the each of the regions of the image display means; and
   a vertical enlarging means, which is arranged in front of the horizontal directional control means in vertical alignment with the matrix pixel arrangement, that enlarges a vertical view angle by giving a vertical optical action to the image information light having passed the horizontal directional control means.

11. A stereoscopic image display device, comprising:
   an image display means composed of a plurality of pixels matrix pixel arrangement, the matrix pixel arrangement being subdivided into repeating groups of pixels in a predetermined order, each pixel in the repeating group of pixels corresponding to one of a plurality of parallax images that together form a stereoscopic image;
   a horizontal directional control means, which is arranged at a predetermined distance away from the image display means, the horizontal directional control means having periodical structure corresponding to the matrix pixel arrangement for giving a horizontal directivity so that image information light emitted from each pixel forming each parallax image is presented independently to each of different places of observation;
   an optical connecting means for optically conjugating each of the regions of the image display means with the region corresponding to the horizontal directional control means, wherein the optical connecting means includes a holographic optical element; and
   a vertical enlarging means, which is arranged in front of the horizontal directional control means in vertical alignment with the matrix pixel arrangement, that enlarges a vertical view angle by giving a vertical optical action to the image information light having passed the horizontal directional control means.

* * * * *